(12) United States Patent
Kim et al.

(10) Patent No.: US 10,057,043 B2
(45) Date of Patent: Aug. 21, 2018

(54) METHOD AND APPARATUS FOR TRANSCEIVING DATA USING PLURALITY OF CARRIERS IN MOBILE COMMUNICATION SYSTEM

(71) Applicant: Samsung Electronics Co., Ltd., Suwon-si, Gyeonggi-do (KR)

(72) Inventors: Soeng Hun Kim, Suwon-si (KR); Gert Jan Van Lieshout, Staines (GB); Jae Hyuk Jang, Suwon-si (KR); JongSoo Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/259,888

(22) Filed: Sep. 8, 2016

(65) Prior Publication Data

US 2017/0006587 A1    Jan. 5, 2017

Related U.S. Application Data

(62) Division of application No. 14/399,723, filed as application No. PCT/KR2013/004113 on May 9, 2013.

(Continued)

(51) Int. Cl.
*H04W 4/08* (2009.01)
*H04L 5/00* (2006.01)
(Continued)

(52) U.S. Cl.
CPC .......... *H04L 5/0098* (2013.01); *H04L 5/0032* (2013.01); *H04W 4/18* (2013.01);
(Continued)

(58) Field of Classification Search
CPC .......... H04W 72/042; H04W 72/0426; H04W 76/022; H04W 76/025
See application file for complete search history.

(56) References Cited

U.S. PATENT DOCUMENTS

8,203,987 B2    6/2012 Ishii et al.
8,649,288 B2    2/2014 He et al.
(Continued)

FOREIGN PATENT DOCUMENTS

CN    1760836 A    4/2006
CN    101496309 A    7/2009
(Continued)

OTHER PUBLICATIONS

Thien-Toan Tran et al., Overview of Enabling Technologies for 3GPP LTE-Advanced, EURASIP Journal on Wireless Communications and Networking, Feb. 20, 2012, pp. 1-12, 2012:54.

(Continued)

*Primary Examiner* — Paul H Masur
(74) *Attorney, Agent, or Firm* — Jefferson IP Law, LLP

(57) ABSTRACT

The present specification relates to a communication method and apparatus. The communication method for a base station (P-ENB) that controls a primary cell (PCell) of user equipment (UE) according to one embodiment of the present specification comprises the steps of: receiving a packet from a serving gateway through a non-primary (NP)-evolved packet system (EPS) bearer for a serving cell of a non-P-ENB base station (NP-ENB); generating a first radio link control packet data unit (RLC PDU) using the received packet; and transmitting the generated first RLC PDU to the NP-ENB.

28 Claims, 33 Drawing Sheets

Related U.S. Application Data

(60) Provisional application No. 61/644,645, filed on May 9, 2012, provisional application No. 61/645,591, filed on May 10, 2012, provisional application No. 61/646,888, filed on May 14, 2012, provisional application No. 61/649,910, filed on May 21, 2012, provisional application No. 61/653,026, filed on May 30, 2012, provisional application No. 61/658,617, filed on Jun. 12, 2012.

(51) Int. Cl.
*H04W 52/02* (2009.01)
*H04W 76/04* (2009.01)
*H04W 56/00* (2009.01)
*H04W 24/02* (2009.01)
*H04W 4/18* (2009.01)
*H04W 72/04* (2009.01)
*H04W 76/02* (2009.01)

(52) U.S. Cl.
CPC ....... *H04W 24/02* (2013.01); *H04W 52/0216* (2013.01); *H04W 52/0241* (2013.01); *H04W 56/0005* (2013.01); *H04W 56/0045* (2013.01); *H04W 72/042* (2013.01); *H04W 72/0426* (2013.01); *H04W 72/0453* (2013.01); *H04W 76/022* (2013.01); *H04W 76/025* (2013.01); *H04W 76/048* (2013.01); *Y02B 60/50* (2013.01); *Y02D 70/1264* (2018.01)

(56) References Cited

U.S. PATENT DOCUMENTS

| | | | |
|---|---|---|---|
| 9,237,419 | B2 | 1/2016 | Jung et al. |
| 2004/0053623 | A1 | 3/2004 | Hoff et al. |
| 2006/0085794 | A1 | 4/2006 | Yokoyama |
| 2006/0281466 | A1 | 12/2006 | Gholmieh et al. |
| 2007/0066329 | A1 | 3/2007 | Laroia et al. |
| 2007/0268877 | A1 | 11/2007 | Buckley et al. |
| 2008/0240439 | A1 | 10/2008 | Mukherjee et al. |
| 2009/0238098 | A1 | 9/2009 | Cai et al. |
| 2010/0093386 | A1 | 4/2010 | Damnjanovic et al. |
| 2010/0317356 | A1 | 12/2010 | Roessel et al. |
| 2011/0002253 | A1 | 1/2011 | Cha et al. |
| 2011/0051609 | A1 | 3/2011 | Ishii et al. |
| 2011/0194505 | A1 | 8/2011 | Faccin et al. |
| 2011/0195668 | A1 | 8/2011 | Lee et al. |
| 2011/0201307 | A1 | 8/2011 | Segura |
| 2011/0250910 | A1 | 10/2011 | Lee et al. |
| 2011/0299415 | A1 | 12/2011 | He et al. |
| 2012/0051297 | A1 | 3/2012 | Lee et al. |
| 2012/0057560 | A1 | 3/2012 | Park et al. |
| 2012/0108199 | A1 | 5/2012 | Wang et al. |
| 2013/0045735 | A1 | 2/2013 | Kim et al. |
| 2013/0070682 | A1 | 3/2013 | Kim et al. |
| 2013/0176988 | A1* | 7/2013 | Wang .................. H04W 28/08 370/331 |
| 2013/0215822 | A1* | 8/2013 | Worrall ................ H04W 36/02 370/315 |
| 2014/0023032 | A1 | 1/2014 | Kim et al. |
| 2014/0078989 | A1 | 3/2014 | Guo et al. |
| 2014/0220974 | A1 | 8/2014 | Hsu |
| 2014/0242974 | A1 | 8/2014 | Lee et al. |
| 2015/0055620 | A1* | 2/2015 | Vesterinen ............ H04W 36/18 370/331 |
| 2015/0181479 | A1 | 6/2015 | Lin et al. |

FOREIGN PATENT DOCUMENTS

| | | |
|---|---|---|
| CN | 101682896 A | 3/2010 |
| CN | 101841889 A | 9/2010 |
| EP | 1 973 355 A1 | 9/2008 |
| EP | 2 265 077 A1 | 12/2010 |
| EP | 2 582 076 A2 | 4/2013 |
| JP | 2011-515043 A | 5/2011 |
| KR | 10-2010-0122054 A | 11/2010 |
| KR | 10-2011-0093642 A | 8/2011 |
| RU | 2 411 697 C2 | 2/2011 |
| RU | 2426251 C2 | 8/2011 |
| WO | 1998/01004 A2 | 1/1998 |
| WO | 1998/26625 A2 | 6/1998 |
| WO | 2010/111194 A1 | 9/2010 |
| WO | 2010/121662 A1 | 10/2010 |
| WO | 2011/020002 A1 | 2/2011 |
| WO | 2011/038272 A1 | 3/2011 |
| WO | 2011/093666 A2 | 8/2011 |
| WO | 2011/099725 A2 | 8/2011 |
| WO | 2011/100492 A1 | 8/2011 |
| WO | 2011/139069 A2 | 11/2011 |
| WO | 2011/139088 A2 | 11/2011 |
| WO | 2011/155784 A2 | 12/2011 |
| WO | 2011/157292 A1 | 12/2011 |
| WO | 2012/008691 A2 | 1/2012 |
| WO | 2012/141483 A2 | 10/2012 |
| WO | 2013/051836 A1 | 4/2013 |
| WO | 2013/051912 A2 | 4/2013 |
| WO | 2013/065995 A2 | 5/2013 |

OTHER PUBLICATIONS

Nokia Siemens Networks et al., Data Split Options and Considerations on U-Plane Protocol Architecture for Dual-Connectivity, Agenda Item 7.2, 3GPP TSG-RAN WG2 Meeting #81bis, Chicago, USA, Apr. 15-19, 2013, R2-131054.

3rd Generation Partnership Project; Technical Specification Group Radio Access Network; Study on Minimization of drive-tests in Next Generation Networks; (Release 9), 3GPP TR 36.805, V9.0.0, Dec. 2009, pp. 1-24.

23.1 RRC Connection Establishment, published on Aug. 12, 2011 as per WayBack Machine. [retrieved from Internet on Mar. 9, 2017], Aug. 12, 2011.

3rd Generation Partnership Project; Technical Specification Group Radio Access Network Extending 850MHz Study Item Technical Report (Release 9), 3GPP TR 37.806 v1.1.0 change bars, R4-114382, Aug. 17, 2011.

Ericsson et al., Multiple frequency band indicators per cell, 3GPP TSG-RAN WG2 #75, R2-114299, Aug. 16, 2011.

Huawei et al., The MDT applicability of EPLMN, 3GPP Change Request 36.331 CR CRNum, 10.2.0, 3GPP TSG-WG2 #75, R2-114011, Athens, Greece, Aug. 22 to 26, 2011, pp. 1-16.

3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10), 3GPP TS 37.320, V10. 4.0, Dec. 2011, pp. 1-18.

Intel Corporation, Support for UE Assistance Information for eDDA, 3GPP TSG RAN WG2 Meeting #77bis, R2-121746, Mar. 30, 2012, Jeju, Korea.

Ericsson et al., About DRX configuration and UE assistance,3GPP TSG-RAN WG2 #78, R2-122587, May 25, 2012, Prague, Czech Republic.

"Ericsson", ST-Ericsson, "Accessibility measurements for MDT", 3GPP TSG-RAN WG2 #76 Tdoc R2-116148, San Francisco, CA, U.S.A, Oct. 14-18, 2011.

"InterDigital Communications", Handling of SCell Activation/Deactivation RF Retuning Interruptions, 3GPP TSG RAN WG2 #78, R2-122289, May 14, 2012, Prague, Czech Republic.

"Renesas Mobile Europe Ltd", Considerations on retuning interruptions, 3GPP TSG-RAN WG4 Meeting #63, R4-123056, May 14, 2012, Prague, Czech Republic.

"3rd Generation Partnership Project; Technical Specification Group Radio Access Network; Evolved Universal Terrestrial Radio Access (E-UTRA); User Equipment (UE) radio transmission and reception (Release 10)", 3GPP Standard, 3GPP TS 36.101, V10.3.0, 21 Jun. 21, 2011, pp. 1-237, XP050553331.

(56) References Cited

OTHER PUBLICATIONS

Ericsson et al., Multiple frequency band indicators per cell, 3GPP TSG-RAN2 Meeting #75, R2-114301, Aug. 26, 2011.

* cited by examiner

METHOD AND APPARATUS FOR TRANSCEIVING DATA USING PLURALITY OF CARRIERS IN MOBILE COMMUNICATION SYSTEM

CROSS-REFERENCE TO RELATED APPLICATION(S)

This application is a divisional application of prior application Ser. No. 14/399,723, filed on Nov. 7, 2014, which is a U.S. National Stage application under 35 U.S.C. § 371 of an International application filed on May 9, 2013 and assigned application number PCT/KR2013/004113, which claimed the benefit of a U.S. Provisional application filed on May 9, 2012 in the U.S. Patent and Trademark Office and assigned Ser. No. 61/644,645, of a U.S. Provisional application filed on May 10, 2012 in the U.S. Patent and Trademark Office and assigned Ser. No. 61/645,591, of a U.S. Provisional application filed on May 14, 2012 in the U.S. Patent and Trademark Office and assigned Ser. No. 61/646,888, of a U.S. Provisional application filed on May 21, 2012 in the U.S. Patent and Trademark Office and assigned Ser. No. 61/649,910, of a U.S. Provisional application filed on May 30, 2012 in the U.S. Patent and Trademark Office and assigned Ser. No. 61/653,026, and of a U.S. Provisional application filed on Jun. 12, 2012 in the U.S. Patent and Trademark Office and assigned Ser. No. 61/658,617, the entire disclosure of each of which is hereby incorporated by reference.

TECHNICAL FIELD

The present invention relates to a data multicarrier-based data communication method and apparatus for use in a mobile communication system.

BACKGROUND ART

Mobile communication systems were developed to provide mobile users with communication services. With the rapid advance of technologies, the mobile communication systems have evolved to the level capable of providing high speed data communication service beyond the early voice-oriented services.

Recently, standardization for a Long Term Evolution (LTE) system, as one of the next-generation mobile communication systems, is underway in the 3rd Generation Partnership Project (3GPP). LTE is a technology for realizing high-speed packet-based communications with the data rate of up to 100 Mbps, which is higher than the currently available data rate, and its standardization is almost complete.

In line with the completion of the LTE standardization, an LTE-Advanced (LTE-A) system is now under discussion, which improves a transfer rate by combining the LTE communication system with several new technologies. One of such technologies is Carrier Aggregation. The Carrier Aggregation is a technology allowing a terminal to use multiple downlink carriers and multiple uplink carriers unlike the conventional technology of using one downlink carrier and one uplink carrier for data communication.

Currently, the LTE-A is featured with the intra-eNB carrier aggregation only. This restricts applicability of the carrier aggregation function so as to a problem of failing aggregation of macro and pico cells in a scenario where a plurality of pico cells and a macro cell operate in an overlapped manner.

DISCLOSURE OF INVENTION

Technical Problem

The present invention has been conceived to solve at least part of the above problem and aims to provide an inter-eNB carrier aggregation method and apparatus.

Solution to Problem

In accordance with an aspect of the present invention, a communication method of an evolved Node B of controlling a primary cell (P-ENB) of a User Equipment (UE) includes receiving a packet from a serving gateway through a non-primary Evolved Packet System (NP-EPS) bearer for serving cells of an eNB (NP-ENB) other than the P-eNB, generating a first Radio Link Control Packet Data Unit (RLC PDU) using the received packet, and transmitting the first RLC PDU to the NP-ENB.

In accordance with another aspect of the present invention, a communication method of a non-primary evolved node B (NP-ENB) other than a primary eNB (P-ENB) controlling a primary cell (PCell) of a User Equipment (UE) includes receiving a Radio Link Control Packet Data Unit (RLC PDU) from the P-ENB, re-segmenting the RLC PDU into re-segmented RLC PDUs, and transmitting the re-segmented RLC PDUs, which are converted to signals, to the UE.

In accordance with another aspect of the present invention, a communication apparatus of a primary evolved node B (P-ENB) controlling a primary cell (PCell) of user equipment (UE) includes a communication unit which receives a packet from a serving gateway through a non-primary Evolved Packet System (NP-EPS) bearer for serving cells of an eNB (NP-ENB) other than the P-eNB and a control unit which generates a first Radio Link Control Packet Data Unit (RLC PDU) using the received packet, wherein the communication unit transmits the first RLC PDU to the NP-ENB.

In accordance with still another aspect of the present invention, a communication apparatus of a non-primary evolved node B (NP-ENB) other than a primary eNB (P-ENB) controlling a primary cell (PCell) of a User Equipment (UE) includes a communication unit which receives a Radio Link Control Packet Data Unit (RLC PDU) from the P-ENB and a control unit which re-segments the RLC PDU into re-segmented RLC PDUs, the communication unit transmits the re-segmented RLC PDUs, which are converted to signals, to the UE.

Advantageous Effects of Invention

The present invention is advantageous in terms of reducing battery consumption of the UE by applying discontinuous reception in the inter-eNB carrier aggregation mode.

MODE FOR THE INVENTION

Detailed description of well-known functions and structures incorporated herein may be omitted to avoid obscuring the subject matter of the present invention. Exemplary embodiments of the present invention are described with reference to the accompanying drawings in detail. Prior to the description of the present invention, the LTE system and the carrier aggregation are explained briefly.

Figure 1:
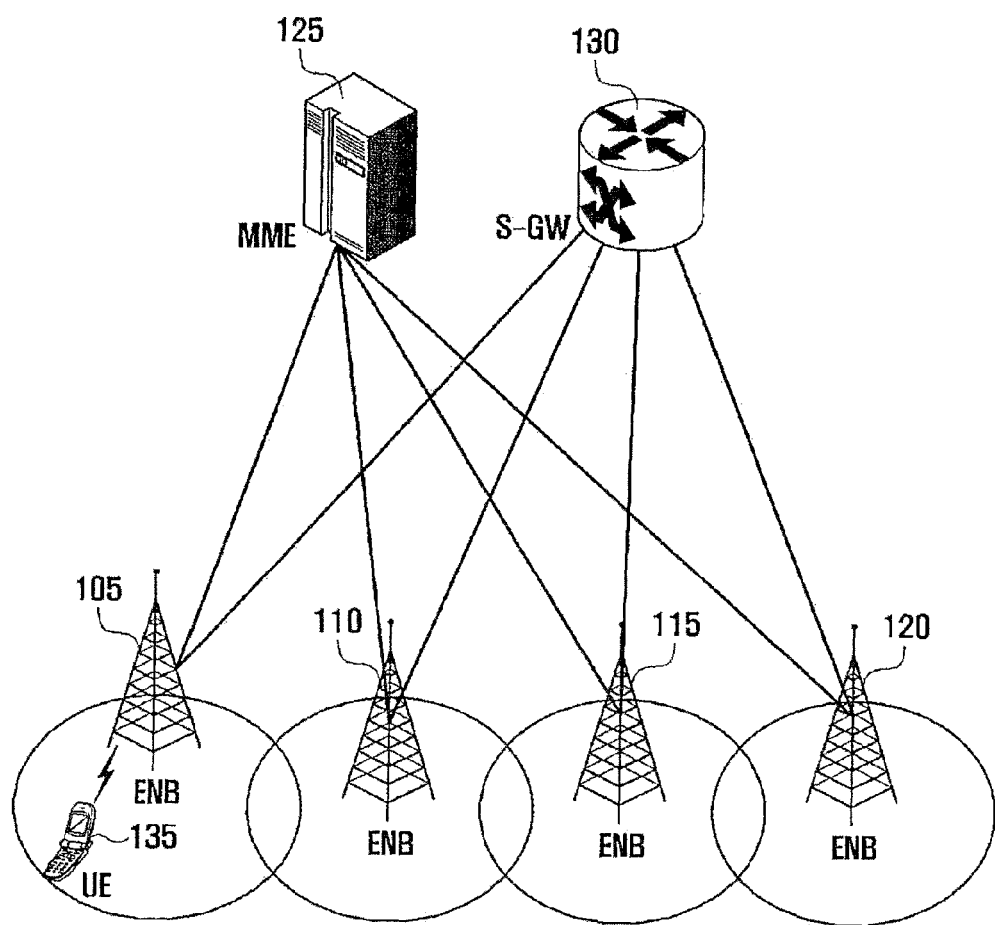
FIG. 1 is a diagram illustrating the architecture of an LTE system to which some embodiments of the present invention are applied.

FIG. 1 is a diagram illustrating the architecture of an LTE system to which some embodiments of the present invention are applied.

Referring to FIG. 1, the radio access network of the mobile communication system includes evolved Node Bs (eNBs) 105, 110, 115, and 120, a Mobility Management Entity (MME) 125, and a Serving-Gateway (S-GW) 130. The User Equipment (hereinafter, referred to as UE) 135 connects to an external network via eNBs 105, 110, 115, and 120 and the S-GW 130.

In FIG. 1, the eNBs 105, 110, 115, and 120 correspond to the legacy node Bs of the UMTS system. The eNBs allow the UE 135 to establish a radio channel and are responsible for complicated functions as compared to the legacy node B. In the LTE system, all the user traffic including real time services such as Voice over IP (VoIP) are provided through a shared channel and thus there is a need of a device to schedule data based on the state information such as buffer states, power headroom states, and channel states of the UEs; and the eNBs 110, 115, and 120 are responsible for this. Typically, one eNB controls a plurality of cells. In order to secure the data rate of up to 100 Mbps, the LTE system adopts Orthogonal Frequency Division Multiplexing (OFDM) as a radio access technology. Also, the LTE system adopts Adaptive Modulation and Coding (AMC) to determine the modulation scheme and channel coding rate in adaptation to the channel condition of the UE. The S-GW 130 is an entity to provide data bearers so as to establish and release data bearers under the control of the MME 125. The MME 125 is responsible for mobility management of UEs and various control functions and may be connected to a plurality of eNBs.

Figure 2:
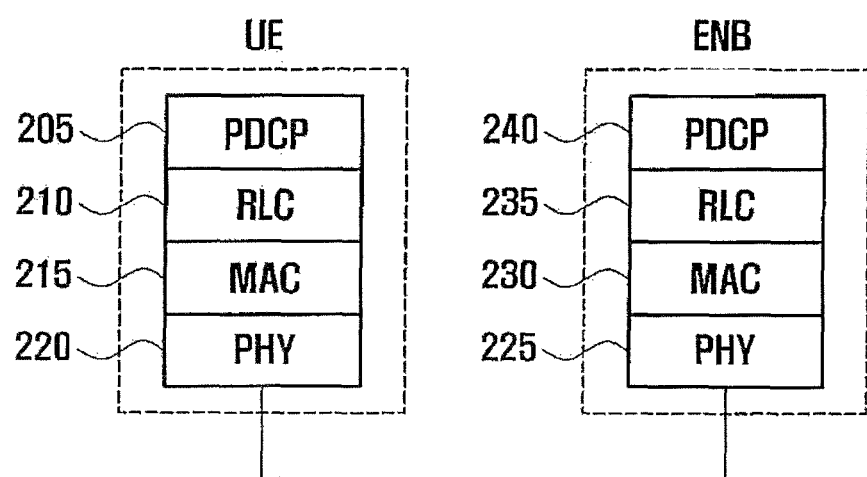
FIG. 2 is a diagram illustrating a protocol stack of the LTE system to which some embodiments of the present invention are applied.

FIG. 2 is a diagram illustrating a protocol stack of the LTE system to which some embodiments of the present invention are applied.

Referring to FIG. 2, the protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225. The PDCP 205 and 240 is responsible for IP header compression/decompression, and the RLC 210 and 235 is responsible for segmenting the PDCP Protocol Data Unit (PDU) into segments in appropriate size for Automatic Repeat Request (ARQ) operation. The MAC 215 and 230 is responsible for establishing connection to a plurality of RLC entities so as to multiplex the RLC PDUs into MAC PDUs and demultiplex the MAC PDUs into RLC PDUs. The PHY 220 and 225 performs channel coding on the MAC PDU and modulates the MAC PDU into OFDM symbols to transmit over radio channel or performs demodulating and channel-decoding on the received OFDM symbols and delivers the decoded data to the higher layer.

Figure 3:
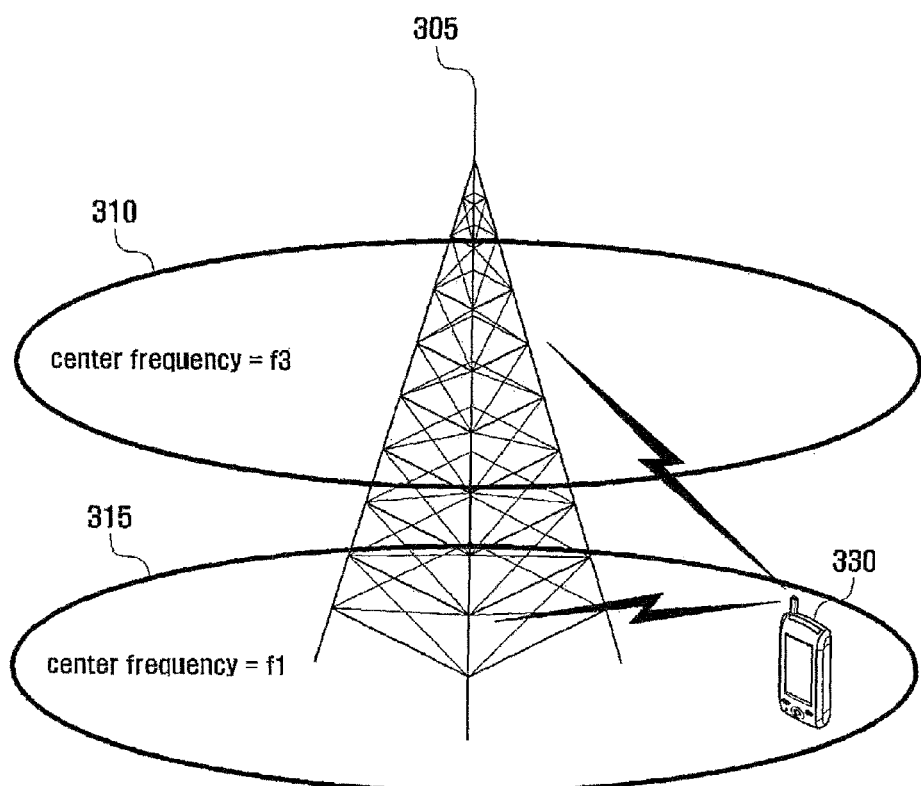
FIG. 3 is a diagram illustrating the concept of typical intra-eNB carrier aggregation.

FIG. 3 is a diagram illustrating the concept of typical intra-eNB carrier aggregation.

Referring to FIG. 3, an eNB transmits and receives signals through multiple carriers across a plurality of frequency bands. For example, the eNB 305 can be configured to use the carrier 315 with center frequency f1 and the carrier 310 with center frequency f3. If carrier aggregation is not supported, the UE 330 has to transmit/receive data using one of the carriers 310 and 315. However, the UE 330 having the carrier aggregation capability can transmit/receive data using both the carriers 310 and 315. The eNB can increase the amount of the resource to be allocated to the UE having the carrier aggregation capability in adaptation to the channel condition of the UE so as to improve the data rate of the UE 330. The technique of aggregating the downlink and uplink carriers respectively for transmission and reception at one eNB is referred to as intra-eNB carrier aggregation. In any case, however, there may be a need of aggregating the downlink/uplink carriers of different eNBs unlike the situation depicted in FIG. 3.

Figure 4:
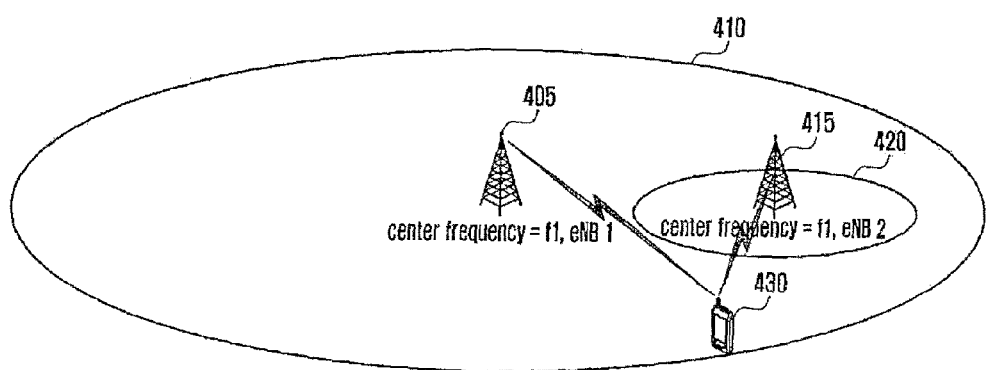
FIG. 4 is a diagram illustrating the concept of inter-eNB carrier aggregation according to an embodiment of the present invention.

FIG. 4 is a diagram illustrating the concept of inter-eNB carrier aggregation according to an embodiment of the present invention.

Referring to FIG. 4, an inter-eNB carrier aggregation includes a UE 430 has to transmit/receive data using one of the carriers 410 and 415. Assuming that the eNB 1 405 uses the carrier with center frequency f1 for transmission/reception and the eNB 2 420 the carrier with center frequency f2 for transmission/reception, if the downlink carrier with the center frequency f1 and the downlink carrier with the center frequency f2 are aggregated, this means that the carriers transmitted by two or more eNBs are aggregated for one UE and thus such a carrier aggregation is referred to as inter-eNB Carrier Aggregation (CA) in the present invention.

The terms to be used frequently in the present invention are described hereinafter.

Assuming that a cell is configured with one downlink carrier and one uplink carrier in the conventional concept, the carrier aggregation can be understood as if the UE communicates data via multiple cells. With the use of carrier aggregation, the peak data rate increases in proportion to the number of aggregated carriers.

In the following description, if a UE receives data through a certain downlink carrier or transmits data through a certain uplink carrier, this means to receive or transmit data through control and data channels provided in cells corresponding to center frequencies and frequency bands characterizing the carriers. In the present Invention, carrier aggregation may be expressed as configuring a plurality of serving cells with the use of terms such as primary cell (PCell), secondary cell (SCell), and activated serving cell. These terms are used as they are in the LTE mobile communication system.

In the present invention, a group of the serving cells controlled by an eNB is defined as set. The set is classified into one of primary set and non-primary set. The primary set is a set of serving cells controlled by the eNB controlling the PCell (primary eNB), and the non-primary set is a set of serving cells controlled by the eNB not controlling the PCell (non-primary eNB). The eNB notifies the UE whether a serving cell belongs to the primary set or non-primary set in the process of configuring the corresponding serving cell. One UE can be configured with one primary set and one or more non-primary sets.

In the following description, other terms may be used interchangeable with the terms 'primary set' and 'non-primary set' to help understanding. For example, the terms 'primary set' and 'secondary set' or 'primary carrier group' and 'secondary carrier group' may be used. However, it is noted that different terms are used interchangeably but in the same meanings. The main purpose of using these terms is to distinguish between the cells under control of the eNB controlling the PCell of a specific UE and other cells, and the UE and the corresponding cell operate distinctly depending on whether the cell is controlled by the eNB controlling the PCell of the specific UE.

Figure 5:
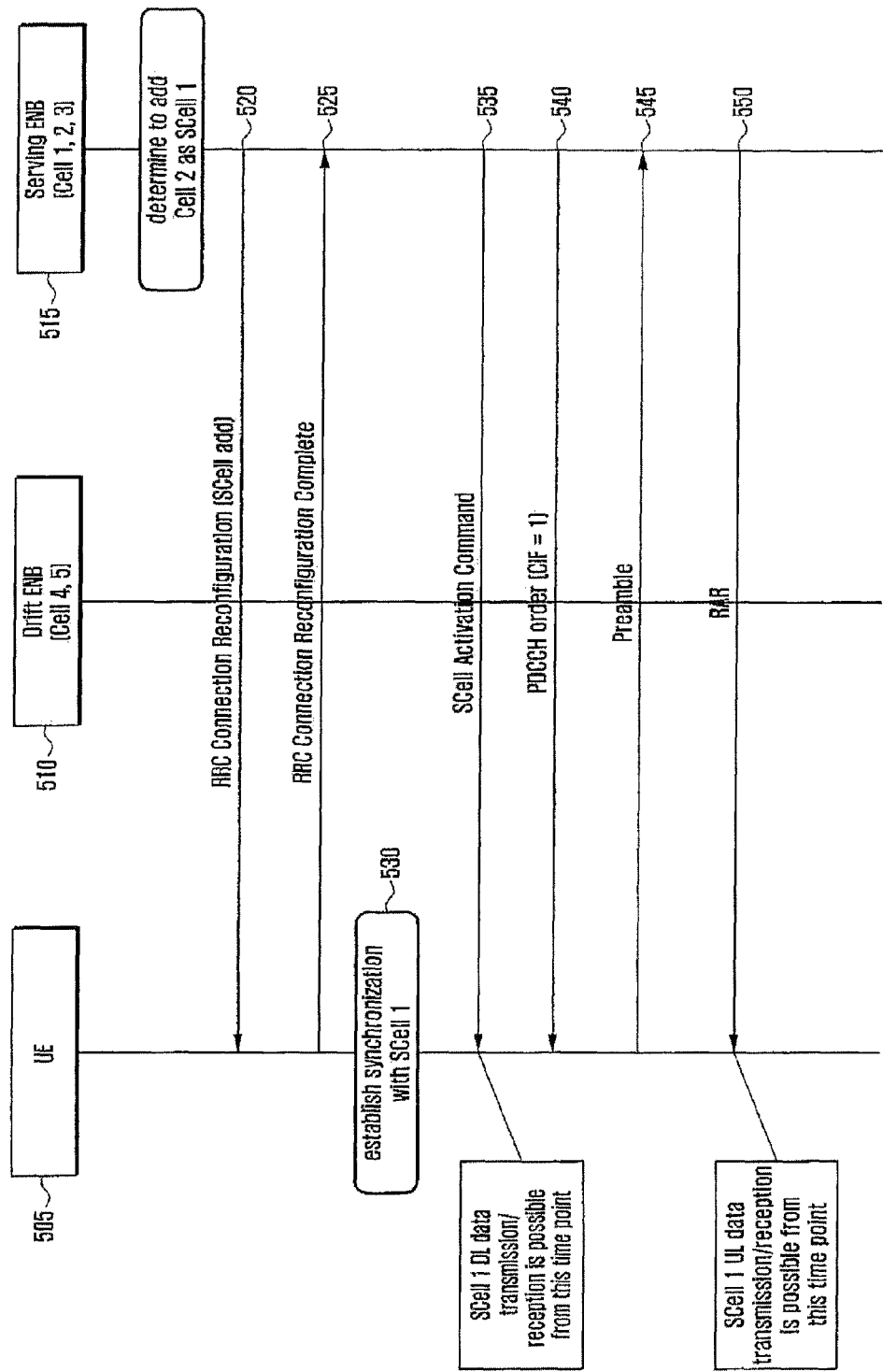
FIG. 5 is a signal flow diagram illustrating the operations of the UE and the eNB for configuring a SCell belonging to the primary set according to an embodiment of the present invention.

FIG. 5 is a signal flow diagram illustrating the operations of the UE and the eNB for configuring a SCell belonging to the primary set according to an embodiment of the present invention.

Referring to FIG. 5, the mobile communication system includes a UE 505, eNB 1 515, and eNB 2 510. The cells 1, 2, and 3 are controlled by the eNB 1, and the cells 4 and 4 are control by the eNB 2 510. Suppose that the PCell of the UE is the cell 1 and the eNB 1. According to the definition of the primary eNB, the eNB 1 515 is the primary eNB. The eNB 1 515 as the primary eNB attempts to configure cell 2 as an additional SCell to the UE. In the present invention, the eNB controlling the PCell, i.e. controlling the primary set, is referred to as a serving eNB. The eNB which is not the serving eNB of the UE and controls the serving cell of the UE is referred to as the drift eNB. The eNB controlling the serving cells of the primary set is the serving eNB, and the eNB controlling the serving cells of the non-primary set is the drift eNB. The terms 'primary eNB' and 'non-primary eNB' may be used substitutionally. The primary eNB corresponds to the serving eNB, and the non-primary eNB corresponds to the drift eNB.

The serving eNB 515 sends the UE 505 a Radio Resource Control (RRC) Connection Reconfiguration control message including the information on the SCell to be added newly at step 520. The SCell to be added newly is the cell managed by the serving eNB directly. The control message may include some of the information as listed in table 1 depending on the serving cell.

TABLE 1

| Name | Description |
|---|---|
| sCellIndex-r10 | Identifier of serving cell. An integer having a predetermined size. Used in updating information on the corresponding serving cell in the future. |

TABLE 1-continued

| Name | Description |
| --- | --- |
| cellIdentification-r10 | Information for use in identifying the serving cell physically. Composed of downlink center frequency and Physical Cell ID (PCI). |
| radioResourceConfig CommonSCell-r10 | Information on radio resource of service cell. For example, this includes downlink bandwidth, downlink Hybrid ARQ (HARQ) feedback channel configuration information, uplink center frequency information, uplink bandwidth information. etc. |
| radioResourceConfig DedicatedSCell-r10 | Information on UE-specific resource allocated in the serving cell. For example, this includes channel quality measurement reference signal structure information, inter-carrier scheduling configuration information, etc. |
| TAG(Timing Advance Group) information | Information indicating TAG to which UE belongs. For example, this may include TAG id and Timing Advance (TA) timer. If the UE belongs to P-TAG, this information may not be signaled. |

The TAG is a set of the serving cells sharing the same uplink transmission timing. A TAG is classified into one of Primary TAG (P-TAG) and Secondary TAG (S-TAG): the P-TAG is of including the PCell and the S-TAG is of including only SCells with the exception of PCell. If a certain serving cell belongs to a certain TAG, this means that the uplink transmission timing of the serving cell is identical with those of the other serving cells belonging to the TAG and whether the uplink synchronization is acquired is determined by means of the TA timer of the TAG. The uplink transmission timing of a certain TAG is set through a random access process in a serving cell belonging to the TAG and maintained with the receipt of TA command. The UE starts or restart the TA timer of the corresponding TAG whenever the TA command for the corresponding TAG is received. If the TA timer expires, the UE determines that the uplink transmission synchronization of the corresponding TAG has broken and thus suspends uplink transmission until the next random access occurs.

The UE 505 transmits a response message (RRC Connection Reconfiguration Complete) in response to the control message at step 525. The UE 505 establishes DL/UL synchronization with the cell 2, i.e. serving cell 1, at step 530. The forward/downlink is of transmitting at the eNB and receiving at the UE, and reverse/uplink is of transmitting at the UE and receiving at the eNB. In the present invention, the terms 'forward' and 'downlink' are used interchangeably. Also, the terms 'reverse' and 'uplink' are used interchangeably. Establishing downlink synchronization with a certain cell is acquiring the synchronization channel of the cell to check the downlink frame boundary. The serving eNB 515 sends the UE an Activate/Deactivate MAC Control Element (A/D MAC CE) as a MAC layer control command to instruct activating the SCell 1 at step 535. The control command is structured in the form of a bitmap. The first bit may correspond to the SCell 1, the second bit to SCell 2, and the $n^{th}$ bit to SCell n. Each bit indicates activation/deactivation of the corresponding SCell. The bitmap may be 1-byte long. Since 7 SCell indices, i.e. from 1 to 7, exist, the second Least Significant Bit (LSB) is mapped to the SCell 1, the third LSB to SCell 2, and the last LSB or the Most Significant Bit (MSB) to SCell 7, without use of the first LSB.

The UE 505 starts monitoring Physical Downlink Control Channel (PDCCH) of SCell 1 after a lapse from the time when the activation command for the SCell 1 is received. The PDCCH is the channel of carrying DL/UL transmission resource allocation information. If the SCell 1 belongs to the TAG with which the synchronization has been established already, the UE 505 starts DL/UL communication from the monitoring start time. If the SCell 1 belongs to the TAG with which synchronization has not been established, the UE 505 starts receiving downlink signal at the monitoring start time but not transmitting uplink signals. That is, if the downlink transmission resource allocation information is received on the PDCCH, the UE receives downlink data but ignores the uplink transmission resource information although it has been received. If the SCell 1 belongs to a non-synchronized TAG, the UE waits for the receipt of 'random access command' on PDCCH in a SCell belonging to the TAG. The random access command is a value of a predetermined field of the uplink transmission resource allocation information to instruct the UE to transmit a preamble in a serving cell. The Carrier Indicator Field of the random access command may carry the identifier of the serving cell for preamble transmission.

The UE 505 receives a random access command instructing to transmit the random access preamble in the serving cell 1 at step 540. The UE monitors PDCCH of the PCell to receive Random Access Response (RAR) in reply to the preamble after transmitting the preamble through the SCell 1 at step 545. The RAR may include TA command and other control information. If the preamble is transmitted by the serving eNB, it is likely to be efficient to send the response in replay to the preamble through the PCell in various aspects. For example, since the RAR is received only through the PCell, it is possible to reduce the PDCCH monitoring load of the UE 505. Accordingly, the UE monitors the PDCCH of the PCell to receiving RAR at step 550. If a valid response message is received in reply to the preamble, the UE 505 assumes that it is possible to transmit uplink signal transmission after the elapse of a predetermined period from that time point. For example, if the valid RAR is received at the subframe n, it is determined that the uplink transmission is possible from the subframe (n+m).

Figure 6:
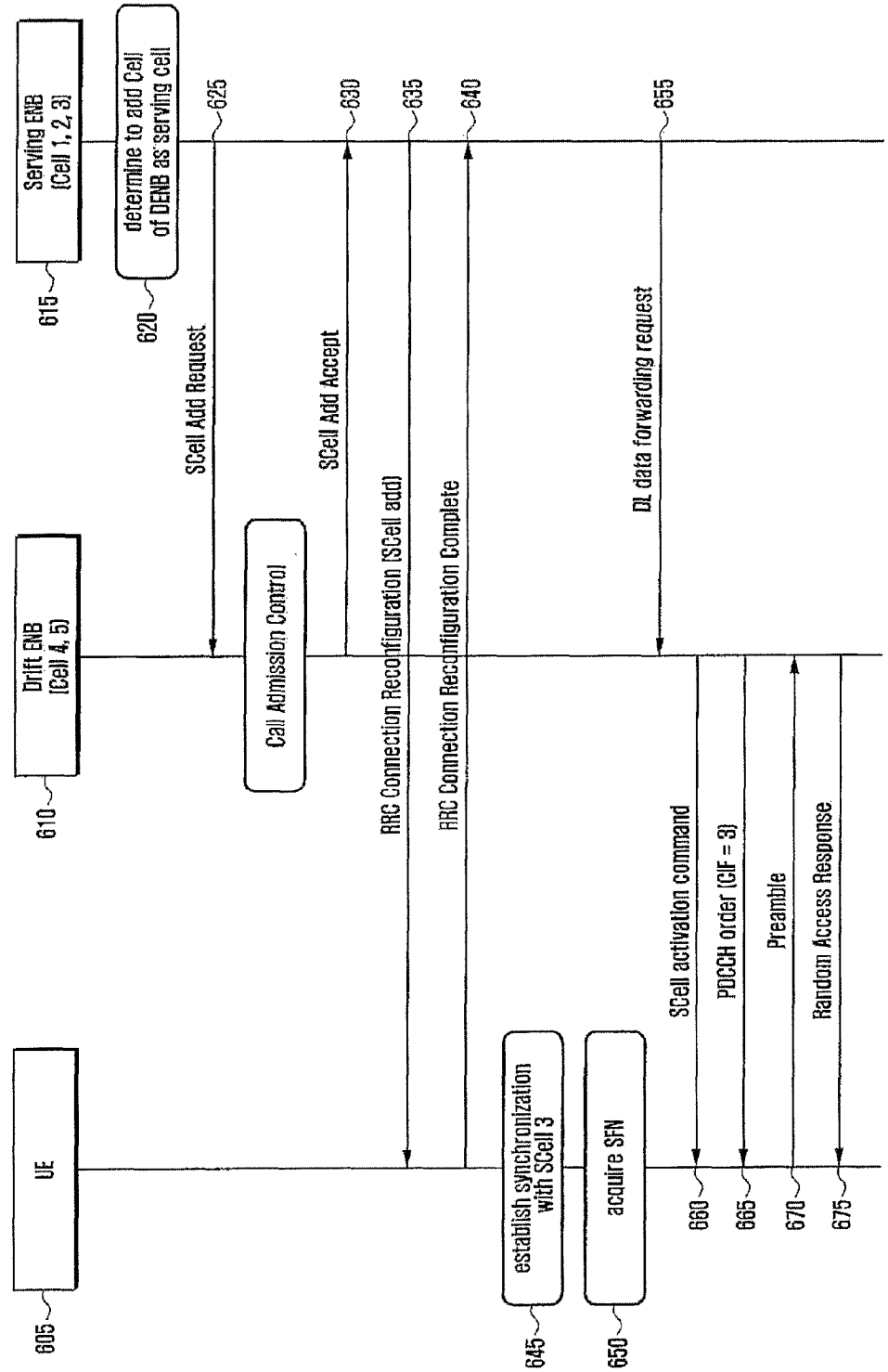
FIG. 6 is a signal flow diagram illustrating the procedure of configuring a SCell belonging to a non-primary set.

FIG. 6 is a signal flow diagram illustrating the procedure of configuring a SCell belonging to a non-primary set.

The serving eNB 615 determines to add a SCell to the UE 605 at a certain time point. Particularly if the UE 605 is located in the area of a cell controlled by the eNB 2 610, the serving eNB determines to add the cell controlled by the eNB 2 as a SCell at step 620. Next, the serving eNB 615 sends the eNB 2 610 a control message requesting to add the SCell at step 625. The control message includes at least part of the informations listed in table 2.

TABLE 2

| Name | Description |
|---|---|
| SCell id info. | Information related to the identifiers of SCells to be configured by the drift eNB. Formed with one or more sCellIndex-r10. Determined by the serving cell and notified to the drift eNB to prevent the identifier in use by the serving eNB from being reused. Or the regions for SCell id used by the serving eNB and SCell id used by the drift eNB may be defined separately. For example, the SCell ids 1 to SCell id 3 are reserved for use by the serving eNB and the SCell id 4 to SCell id 7 for use by the drift eNB. |
| TAG id info. | Information related to identifier of TAG to be configured by the drift eNB. Defined by the serving eNB and notified to the drift eNB to prevent the identifier in used by the serving eNB from being reused. |
| UL scheduling info. | Include priority informations of logical channels and logical channel group information configured to the UE. The drift information interprets the UE buffer state report information and performs uplink scheduling using this information. |
| Offload bearer info. | It is preferred for the EDNB to process the service requiring burst data transmission/reception, e.g. FTP. The serving eNB determines the bearer to offload to the drift eNB among the bearers configured to the UE and sends the drift eNB the information on the bearer to be offloaded, e.g. DRB identifier, PDCP configuration information, RLC configuration information, and required QoS information. |
| Call Admission Control info. | The serving eNB provides reference information in order for the drift eNB to accept or reject the SCell Add Request. e.g., required data rate, estimated UL data amount, and estimated DL data amount. |

If the SCell Add Request control message is received, the drift eNB 610 determines whether to accept the request in consideration of the current load status. If it is determined to accept the request, the drift eNB 610 sends the serving eNB a control message including at least part of the informations listed in table 3 at step 630.

TABLE 3

| Name | Description |
|---|---|
| SCellToAddMod | This is the information on the SCells configured by the drift eNB and includes the information as follows. sCellIndex-r10, cellIdentification-r10, radioResourceConfigCommonSCell-r10, adioResourceConfigDedicatedSCell-r10, TAG information |
| PUCCH configuration information for PUCCH SCell | At least one of SCells belonging to the non-primary set is configured with Physical Uplink Control Channel (PUCCH). Uplink control information such as HARQ feedback, Channel Status Information (CSI), Sounding Reference Signal (SRS), and Scheduling Request (SR) is transmitted. Hereinafter, the SCell in which PUCCH is transmitted is referred to as PUCCH SCell. The PUCCH SCell identifier and PUCCH configuration information are the sub-informations of this information. |
| Data forwarding info. | Information on Logical channel (or logical tunnel) for use in data exchange between the serving eNB and drift eNB: including GPRS Tunnel Protocol (GTP) tunnel identifier for downlink data exchange and GTP tunnel identifier for uplink data exchange. |
| UE identifier | C-RNTI to be used by UE in SCells of non-primary set. Hereinafter, referred to as C-RNTI_NP |
| Bearer configuration info. | Configuration information on the bearer to be offloaded. This includes a list of bearers accepted to be offloaded. If the bearer configurations are identical with each other, this information may include only the list of the accepted bearers. |

If the control message is received, the serving eNB 615 sends the UE 605 an RRC control message instructing to add the serving cell at step 635. The RRC control message includes at least part of the informations listed in table 4.

TABLE 4

| Name | Description |
|---|---|
| SCellAddMod | This includes the information transmitted by the drift eNB without modification. That is, this is identical with SCellAddMod in table 3. This includes SCellAddMod per SCell and is sub-information of SCellAddModList. |
| PUCCH configuration info. for PUCCH SCell | This includes the information transmitted by the drift eNB without modification. That is, this is identical with PUCCH information for PUCCH SCell in table 3. |
| Non-primary set serving cell info. | This is the information on the SCells belonging to the non-primary set among the SCells to be configured. This may be the identifiers of the SCells or the TAGs belonging to the non-primary set. |
| UE identifier | C-RNTI to be used by UE in SCells of non-primary set, i.e. C-RNTI + NP. |

TABLE 4-continued

| Name | Description |
| --- | --- |
| Offload bearer info. | Information about barriers to be processed by the drift eNB. This is the information about the bearer for transmission/reception through serving cells of the non-primary set in view of the UE and includes the bearer list and, if they are different from each other, the bearer configuration informations. |

The RRC control message may include the configuration information of a plurality of SCells. The serving cells of the primary and non-primary sets may be configured together. For example, if the cells 2, 3, 4, and 5 are configured to the UE having the cell 1 as its PCell, the informations thereon may be arranged in the RRC control message in various orders.

Figure 7:
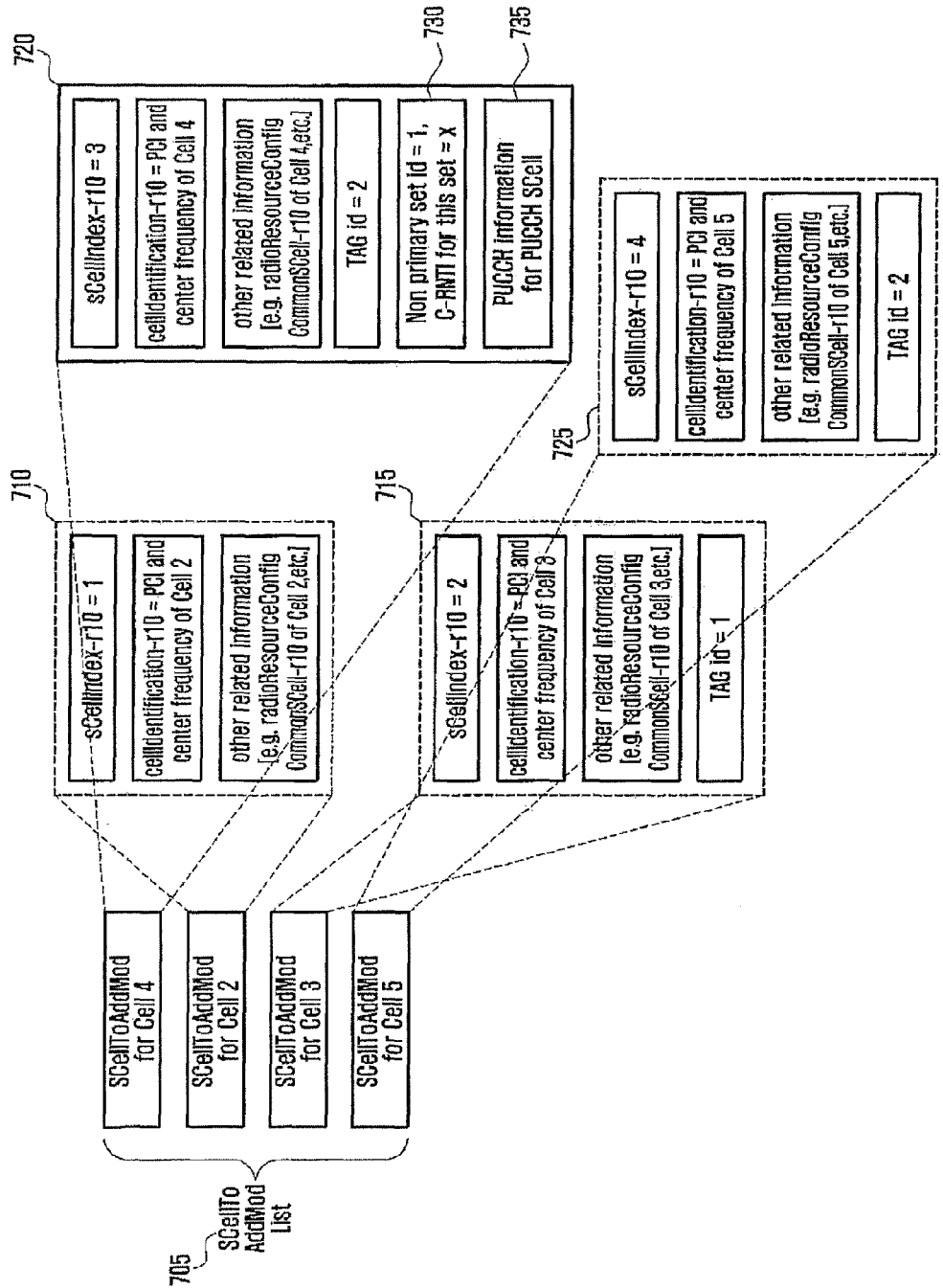
FIG. 7 is a diagram illustrating the structure of the RRC control message according to an embodiment of the present invention.

FIG. 7 is a diagram illustrating the structure of the RRC control message according to an embodiment of the present invention. In this embodiment, the Cell 1 and Cell 2 have the same uplink transmission timing to form the P-TAG, the Cell 3 forms the S-TAG 1, and the Cell 4 and Cell 5 form the S-TAG 2.

The RRC control message contains SCellToAddModList 705 including SCellToAddMod 710 for Cell 2, SCellToAddMod 715 for Cell 3, SCellToAddMod 720 for Cell 4, and SCellToAddMod 725 for Cell 5.

The SCellToAddMod 710, 715, 720, and 725 may include specific information or not depending on the characteristic of the corresponding S Cell. If the SCell belongs to the P-TAG, i.e. if the SCell has the same uplink transmission timing as the PCell, the corresponding SCellToAddMod does not include the information related to the TAG. For example, the SCellToAddMod 710 for the Cell 2 does not include the information about TAG. The SCellToAddMod 715, 720, and 725 for the SCells of the rest non-P-TAGs may include the TAG identifiers and TA timer values of the TAGs to which the corresponding SCells belong.

The information on at least one of the cells belonging to the non-primary set may include the non-primary set information 730, e.g. non-primary set identifier and C-RNTI for use by the UE in the non-primary set. In the example of FIG. 7, the SCellToAddMod 715 for the cell 4 includes the non-primary set information 730. The information on one of the cells belonging to the non-primary set includes PUCCH configuration information 735. In the example of FIG. 7, the SCellToAddMod 715 for the cell 4 includes this information. To the SCell which belongs to the non-primary set but has no non-primary set information, the non-primary set information of the SCell having the same TAG id is applied. For example, although the information on the cell 5 includes no non-primary set information, the UE can check that the cell 5 belongs to the non-primary set based on the non-primary set information of the cell 4 which has the same TAG id and use the non-primary set identifier and C-RNTI of the cell 4 for identifying the cell 5.

Figure 8:
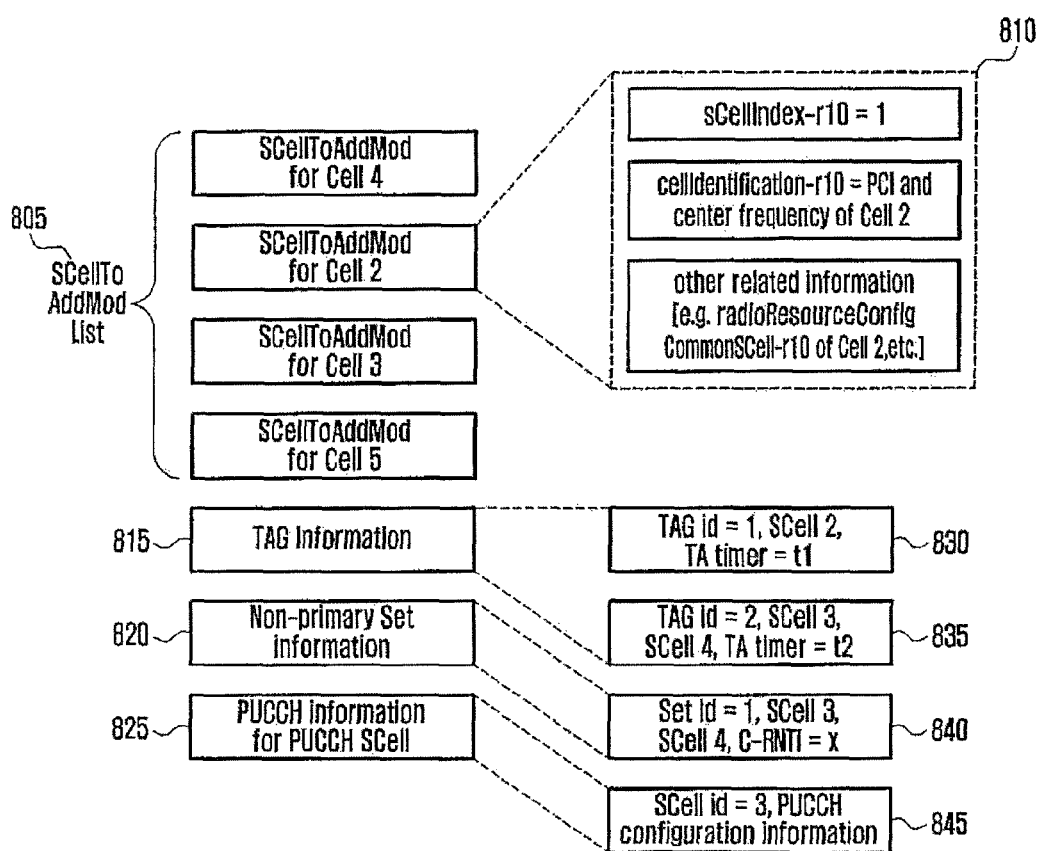
FIG. 8 is a diagram illustrating the structure of the RRC control message according to another embodiment of the present invention.

FIG. 8 is a diagram illustrating the structure of the RRC control message according to another embodiment of the present invention.

FIG. 8 shows another example of arranging the TAG-related information and the non-primary set-related information in separate regions other than SCellToAddMod.

The RRC control message includes SCellToAddModList 805 containing SCellToAddMod 810 for cell 2, SCellToAddMod for cell 3, SCellToAddMod for cell 4, and SCellToAddMod for cell 5. The SCellToAddMod may include the same type of informations. That is, every SCellToAddMod includes the information such as sCellIndex-r10, cellIdentification-r10, and radioResourceConfigCommonSCell-r10.

The TAG information 815, the non-primary set information 820, and the PUCCH configuration information of PUCCH SCell 825 may be included separately. The TAG information 815 includes the TAG identifiers, identifiers of the SCells forming the TAG, and TA timer value. For example, the TAG information 815 includes the information 830 indicating that the TAG having the TAG identifier 1 includes the SCell 2 and that the TA timer is set to the value t1 and the information 835 indicating that the TAG having the TAG identifier 2 includes the SCell 3 and SCell 4 and that the TA timer is set to the value t2.

The non-primary set information 820 includes the per-non-primary set identifiers, identifiers of the serving cells included in the set, and C-RNTI for use in the corresponding set. For example, the information 840 indicating that the non-primary set having the set identifier 1 includes the SCell 3 and SCell 4 and uses the C-RNTI x. Information 845 includes PUCCH configuration information of the SCell 3. The primary set information is determined according to the following rule without explicit signaling.

<Primary Set Information Determination Rule>

Serving cell belonging to primary set: PCell and SCells not belonging to any non-primary set.

C-RNTI to be used in primary set: C-RNTI in use currently in Pcell.

The non-primary set information may include the TAG identifier other than the SCell identifier. This is possible under the assumption that the set and TAG are formed such that one TAG is not formed across multiple sets. For example, the non-primary set configuration information 820 may include the information indicating the TAG id 2 instead of the information indicating the SCell 3 and SCell 4 in order for the UE to determine that the SCell 3 and SCell 4 having the TAG id 2 belong to the non-primary set.

The PUCCH SCell's PUCCH configuration information is made up of non-primary set identifier, PUCCH SCell identifier, and PUCCH configuration information. Each non-primary set has one PUCCH SCell, and the CSI information for the serving cells belonging to the non-primary set and HARQ feedback information may be transmitted on the PUCCH configured to the PUCCH SCell.

The PUCCH SCell can be determined according to a predetermined rule without signaling PUCCH SCell identifier explicitly. For example, the SCell corresponding to the first SCellToAddMod of the SCellToAddModList may be assumed as the PUCCH SCell. Also, the SCell having the highest or lowest SCell identifier among the SCells of which information includes the SCellToAddMod information in the corresponding RRC control message may be determined as the PUCCH SCell. Such an implicit determination method can be used under the assumption that only one non-primary set exists.

Returning to FIG. 6, the UE 605 sends the serving eNB 615 a response message at step 640 and establishes downlink synchronization with the newly configured SCells at step 645. The UE 605 acquires System Frame Number (SFN) of the PUCCH SCell among the newly configured SCells at step 650. The SFN is acquired in the process of receiving the system information, i.e. Master Information Block (MIB). The SFN is an integer incrementing by 1 every 10 ms in the range of 0 to 1023. The UE 605 checks the PUCCH transmission timing of the PUCCH SCell based on the SFN and PUCCH configuration information.

Afterward, the UE 605 waits until the SCells are activated. If downlink data or a predetermined control message instructing to activate SCell is received from the serving eNB 615 at step 655, the drift eNB 610 starts a procedure of activating the SCells.

The drift eNB 610 sends the UE 605 the A/D MAC CE instructing to activate the SCell, e.g. SCell 3, at step 660. If the MAC CE is received at the subframe n, the UE 605 activates the SCell at subframe (n+m1). However, since the uplink synchronization of the PUCCH SCell is not acquired yet at the subframe (n+m1), both the downlink and uplink transmission/reception are not possible although the SCell has been activated. That is, the UE 605 monitors PDCCH of the SCell but ignores the downlink/uplink resource allocation signal although it is received. The drift eNB 610 sends the UE 605 a random access command to establish uplink synchronization with the PUCCH SCell at step 665. The UE 605 initiates random access procedure in the PUCCH SCell using a dedicated preamble indicated in the random access command. That is, the UE 605 sends a preamble through the SCell at step 670 and monitors PDCCH to receive RAR in response thereto in step 675. If the UE 605 transmits the preamble in the primary set, the RAR is transmitted through the PCell. Otherwise if the preamble is transmitted in the non-primary set, the UE 605 monitors PDCCH of the SCell in which the preamble has been transmitted or the PUCCH SCell to receive RAR. This is because there is a need of extra information exchange between the drift eNB 610 and the serving eNB 615 to process the RAR in the PCell. The RAR may be received with the C-RNTI_NP to be used by the UE 605 in the non-primary set. It is more efficient to transmit the response message with the C-RNTI_NP because the UE 605 also has been allocated the C-RNTI_NP and there is no probability of malfunctioning caused by collision due to the use of the dedicated preamble (if the dedicated preamble is received, this means that the eNB knows the UE 605 to which the RAR has to be transmitted). If the valid response message is received through the SCell in which the preamble has been transmitted or the PUCCH SCell, the UE 605 adjusts the uplink transmission timing of the PUCCH SCell and the TAG to which the PUCCH SCell based on the TA command of the response message and activates uplink at a predetermined time point. If the valid TA command or the valid random access response message is received at the subframe n, the predetermined timing becomes the subframe (n+m2) Here, m2 is a predetermined integer.

Typically one user service is served on one Evolved Packet System (EPS) bearer, and one EPS bearer is linked to one Radio Bearer. The radio bearer is made up of PDCP and RLC and, in the inter-eNB CA, it is possible to improve the data transmission efficiency by placing the PDCP and RLC entities of one radio bearer at different eNBs. In the following, the description is made under the assumption that the serving eNB controls a macro cell and the drift eNB a pico cell. The term 'pico cell' is used in the similar meaning of non-primary set serving cell and the term 'macro cell' in the similar meaning of primary set serving cell.

It is possible to consider two schemes: One in which an S-GW discriminates between the EPS bearer to be processed by a macro cell (P-EPS bearer) and the EPS bearer to be processed by a pico cell (NP-EPS bearer) and the other in which all the EPS bearer traffic is transferred to the primary eNB first and then the primary eNB sends the drift eNB the data of the NP-EPS bearer. In the following description, the former is referred to as Core Network (CN) split and the latter is referred to as Radio Access Network (RAN) split for explanation convenience.

Figure 9:
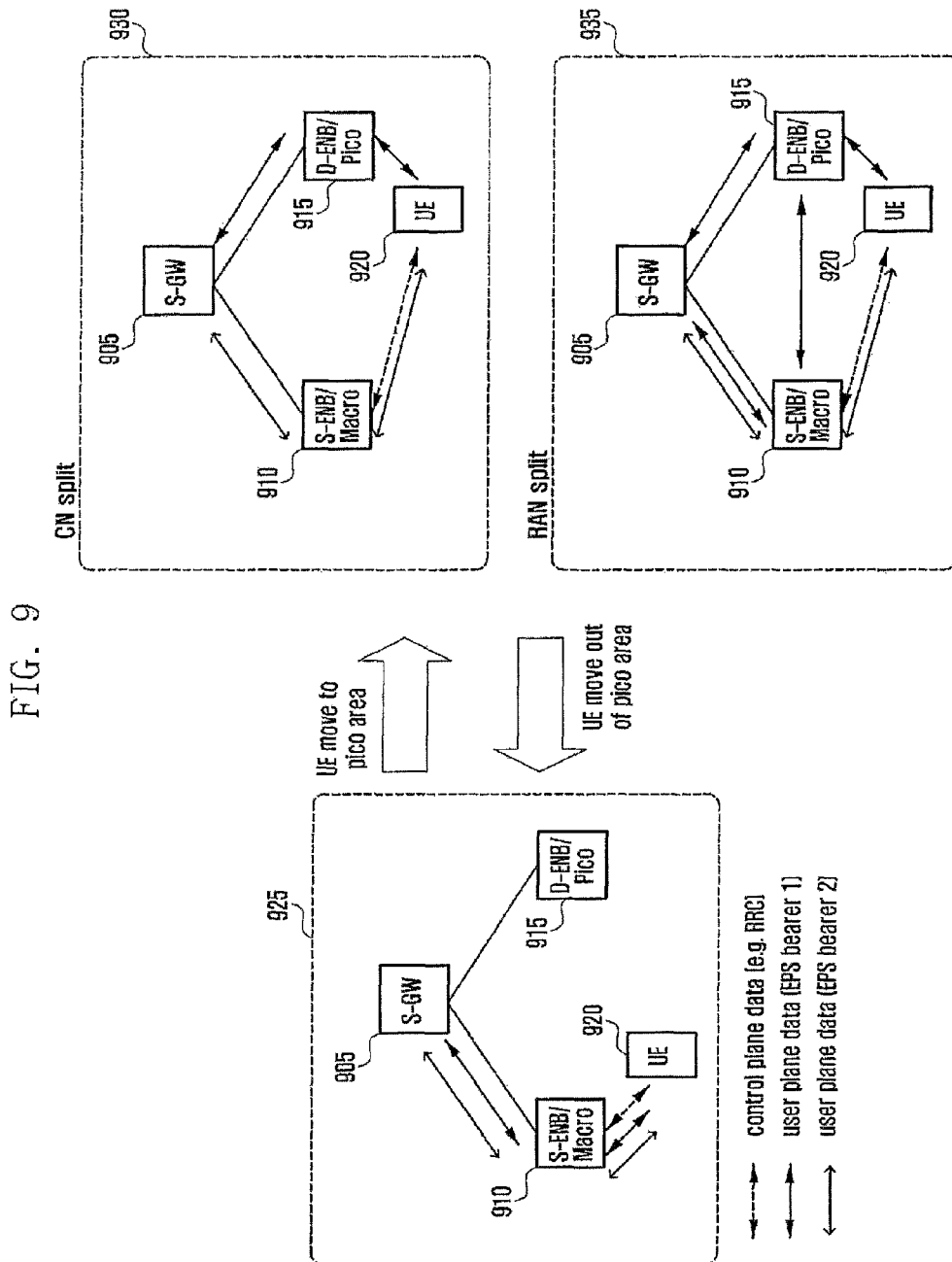
FIG. 9 is a mimetic diagram illustrating a split scheme according to an embodiment of the present invention.

FIG. 9 is a mimetic diagram illustrating a split scheme according to an embodiment of the present invention.

In the case that the UE 920 is located in the area of the macro cell but out of the range of the electric wave of the pico cell as denoted by reference number 925, the UE 920 communicates both the control plane data and user plane data with the eNB controlling the macro cell (i.e. serving eNB) 910. The user plane data 925 is processed by the S-GW 905, and the bearers for transmitting/receiving the user plane data, i.e. EPS bearers 1 and 2, are all established between the S-GW 905 and the serving eNB 910. In the following description, it is assumed that the EPS bearers 1 and 2 are NP-EPS bearer and P-EPS bearer respectively for explanation convenience.

At a certain time, the UE 920 moves to a position to which the electric waves of the pico and macro cells reach. In the case of using the CN split scheme, the EPS bearer 1 is reconfigured between the S-GW 905 and the drift eNB 915 as denoted by reference number 930. The EPS bearer 2 is maintained between the S-GW and the serving eNB. The serving eNB 910 communicates the EPS bearer 2 data with the UE 905, and the drift eNB 915 communicate the EPS bearer 1 data with the UE 905. In the case of using the RAN split scheme, both the EPS bearers 1 and 2 are maintained between the S-GW 905 and the serving eNB 910 as denoted by reference number 935. The serving eNB 910 communicates the EPS bearer 2 data with the UE 905 and forwards the EPS bearer 1 data to the EPS bearer eNB 915. The drift eNB 915 communicates the EPS bearer 1 data with the UE 920.

For explanation convenience in the following description, the paths of the data transmitted/received through the primary set serving cell are referred to as primary set EPS bearer (P-EPS bearer), primary set DRB (P-DRB), and primary set logical channel (P-LCH); and the paths of data transmitted/received through a non-primary set serving cell are referred to as non-primary set EPS bearer (NP-EPS bearer), non-primary set DRB (NP-DRB), and non-primary set logical channel (NP-LCH).

Figure 10:
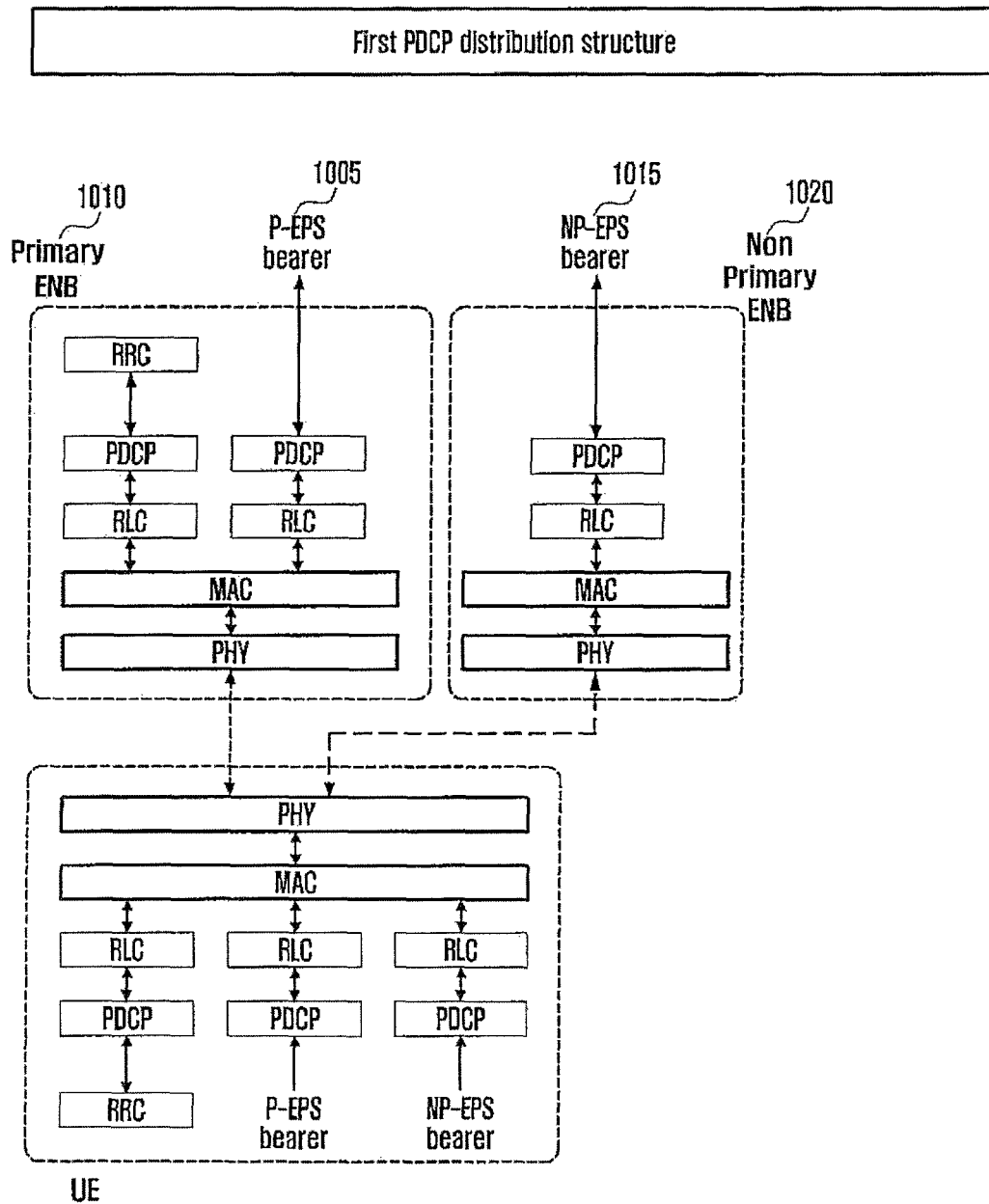
FIG. 10 is a diagram illustrating the first PDCP distribution structure according to an embodiment of the present invention.

FIG. 10 is a diagram illustrating the first PDCP distribution structure according to an embodiment of the present invention.

In the case of using the CN split, the P-EPS bearer 1005, P-DRB, and P-LCH are configured to the primary eNB 1010; the NP-EPS bearer 1015, NP-DRB, and NP-LCH are configured at the non-primary eNB 1020. The UE communicates the P-EPS bearer data with the primary set serving cell and communicates the NP-EPS bearer data with the non-primary set serving cell.

In the case of using the RAN split, the P-DRB is configured to the primary eNB, but the NP-DRB or NP-LCH may be configured to the primary or non-primary eNB selectively.

The present invention proposes a first PDCP distribution structure, a second PDCP distribution structure, a first MAC distribution structure, a second MAC distribution structure, and a second RLC distribution structure. Particularly, each structure is described in association with the operation of the network and UE and signaling mechanism in the configuration procedure.

The first PDCP distribution structure is characterized in that the NP-EPS bearer is established between the S-GW and the non-primary eNB 1010 and the NP-DRB and NP-LCH are configured to the non-primary eNB 1010 in the case of applying the CN split as described with reference to FIG. 10.

Figure 11:
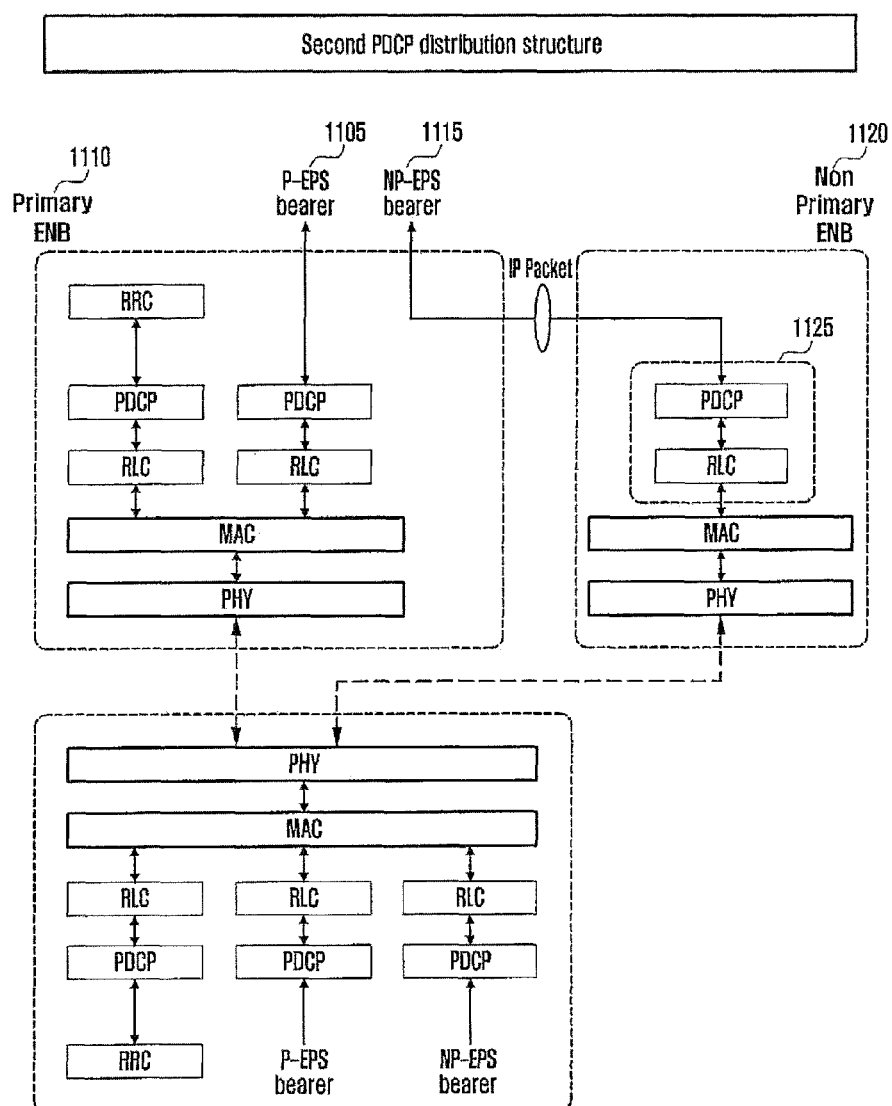
FIG. 11 is a diagram illustrating the second PDCP distribution structure according to an embodiment of the present invention.

FIG. 11 is a diagram illustrating the second PDCP distribution structure according to an embodiment of the present invention.

The second PDCP distribution structure is characterized in that the NP-EPS bearer 1115 is established between the S-GW and the primary eNB 1110, the NP-DRB 1125 is configured at the non-primary eNB 1120. The second PDCP distribution structure also includes a P-EPS bearer 1105. In the second PDCP distribution structure, a GPRS Tunnel Protocol (GTP) tunnel is established between the primary eNB 1110 and the non-primary eNB 1120 for data forwarding such that the IP packet of the NP-EPS bearer 1115 is forwarded from the P-ENB 1110 to the NP-ENB 1120 through the GTP tunnel or vice versa. The second PDCP distribution structure has the characteristics as follows.

- The PDCP status report control message (PDCP STATUS REPORT; control message for reporting PDCP PDU transmission/reception status) is forwarded from NP-ENB to P-ENB through GTP tunnel.
- The RLC PDU size of the NP-DRB is determined by a MAC scheduler of the NP-ENB. Since both the RLC and MAC entities of the NP-DRB are located in the NP-ENB, the RLC PDU size may be determined dynamically by reflecting the channel condition of the current time.
- The NP-EPS bearer data is transmitted/received through only the non-primary set serving cells. The UE transmits the NP-EPS bearer data using only the transmission resource allocated in the non-primary set serving cell.

Figure 12:
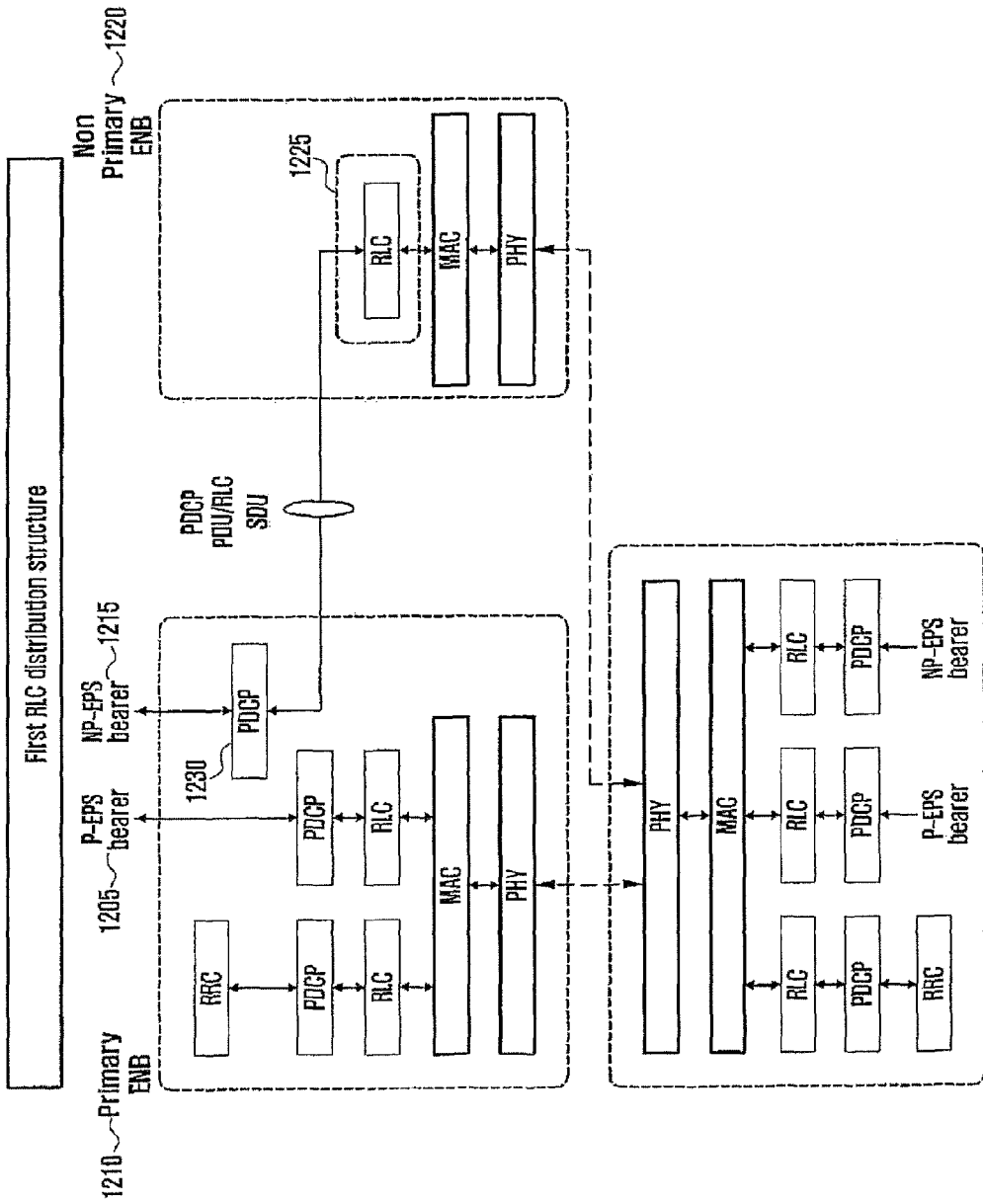
FIG. 12 is a diagram illustrating the first RLC distribution structure according to an embodiment of the present invention.

FIG. 12 is a diagram illustrating the first RLC distribution structure according to an embodiment of the present invention.

The first RLC distribution structure is characterized in that the NP-EPS bearer 1215 is established between the S-GW and the P-ENB 1210 and a part of the NP-DRB, i.e. PDCP entity 1230 is configured at the P-ENB and the RLC entity 1225 is configured at the NP-ENB 1220. In the first RLC distribution structure, the GPRS Tunnel Protocol (GTP) tunnel is established between the primary eNB 1210 and the non-primary eNB for data forwarding such that the PDCP PDU (or RLC SDU) of the NP-EPS bearer is forwarded from the P-ENB to the NP-ENB through the GTP tunnel or vice versa. The first RLC distribution structure also includes a P-EPS bearer 1205. The first RLC distribution structure has the same characteristics as the second PDCP distribution structure.

Figure 13:
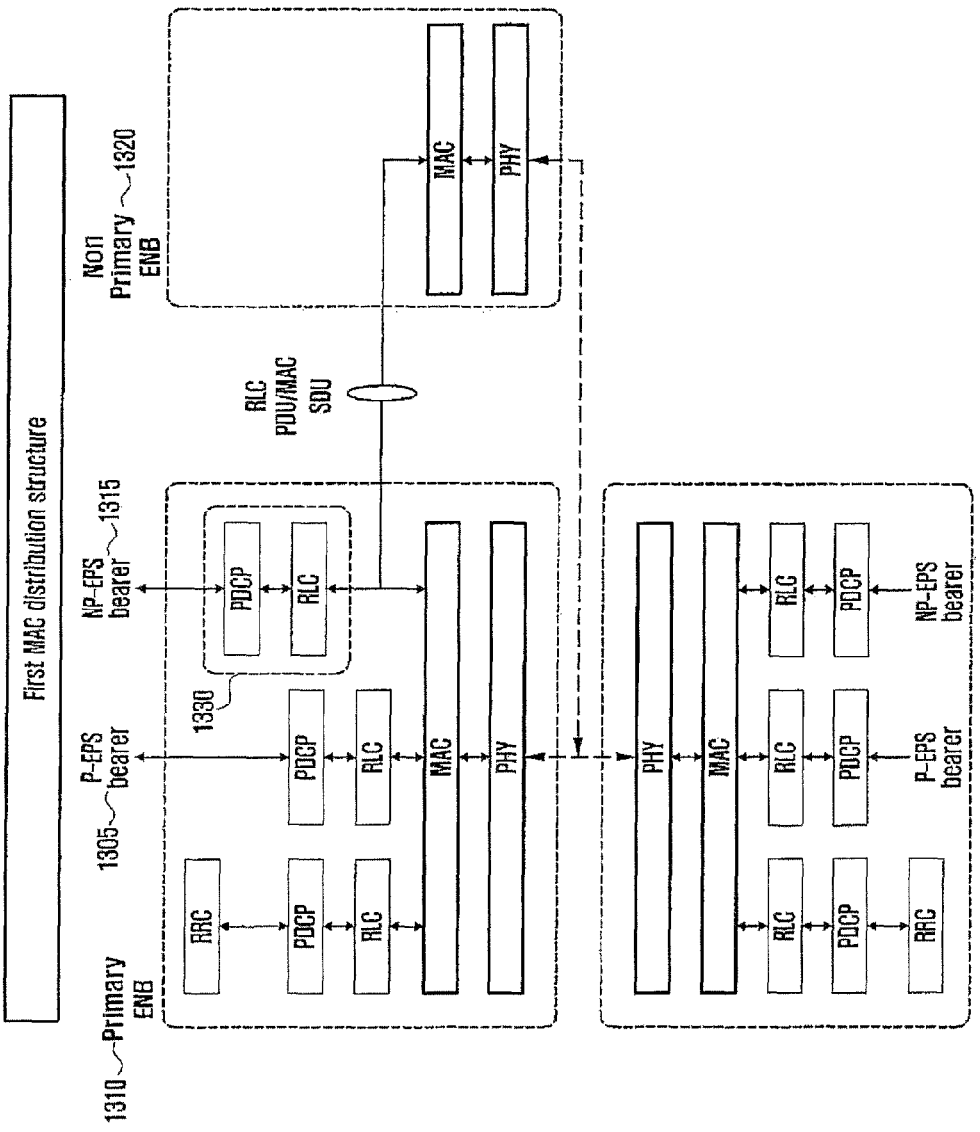
FIG. 13 is a diagram illustrating the first MAC distribution structure according to an embodiment of the present invention.

FIG. 13 is a diagram illustrating the first MAC distribution structure according to an embodiment of the present invention.

The first MAC distribution structure is characterized in that the NP-EPS bearer 1315 is established between the S-GW and the P-ENB 1310 and the NP-DRB 1330 is configured at the P-ENB 1310. In the first MAC distribution structure, only the MAC and PHY layers entities are configured at the N-eNB. In the first MAC distribution structure, the GPRS Tunnel Protocol (GTP) tunnel is established between the primary eNB and the non-primary eNB for data forwarding such that the RLC PDU (or MAC SDU) of the NP-EPS bearer is forwarded from the P-ENB to the NP-ENB 1320 through the GTP tunnel or vice versa. The first MAC distribution also includes a P-EPS bearer 1305. The first MAC distribution structure has the characteristics as follows.

- The RLC status report control message (RLC STATUS PDU; control information reporting RLC PDU transmission/reception status, i.e. containing RLC ACK/NACK information) is forward from the NP-ENB 1320 to the P-ENB through the GTP tunnel.
- The MAC scheduler of the NP-ENB 1320 notifies the RLC entity of the P-ENB 1310 of the RLC PDU size. The RLC PDU size is determined by reflecting the long term channel status of the non-primary set serving cell and updated periodically.
- The NP-EPS bearer data are transmitted/received through both the primary and non-primary sets serving cells. The UE transmits the NP-EPS bearer data using the transmission resource allocated in both the primary and non-primary sets serving cells.

Figure 14:
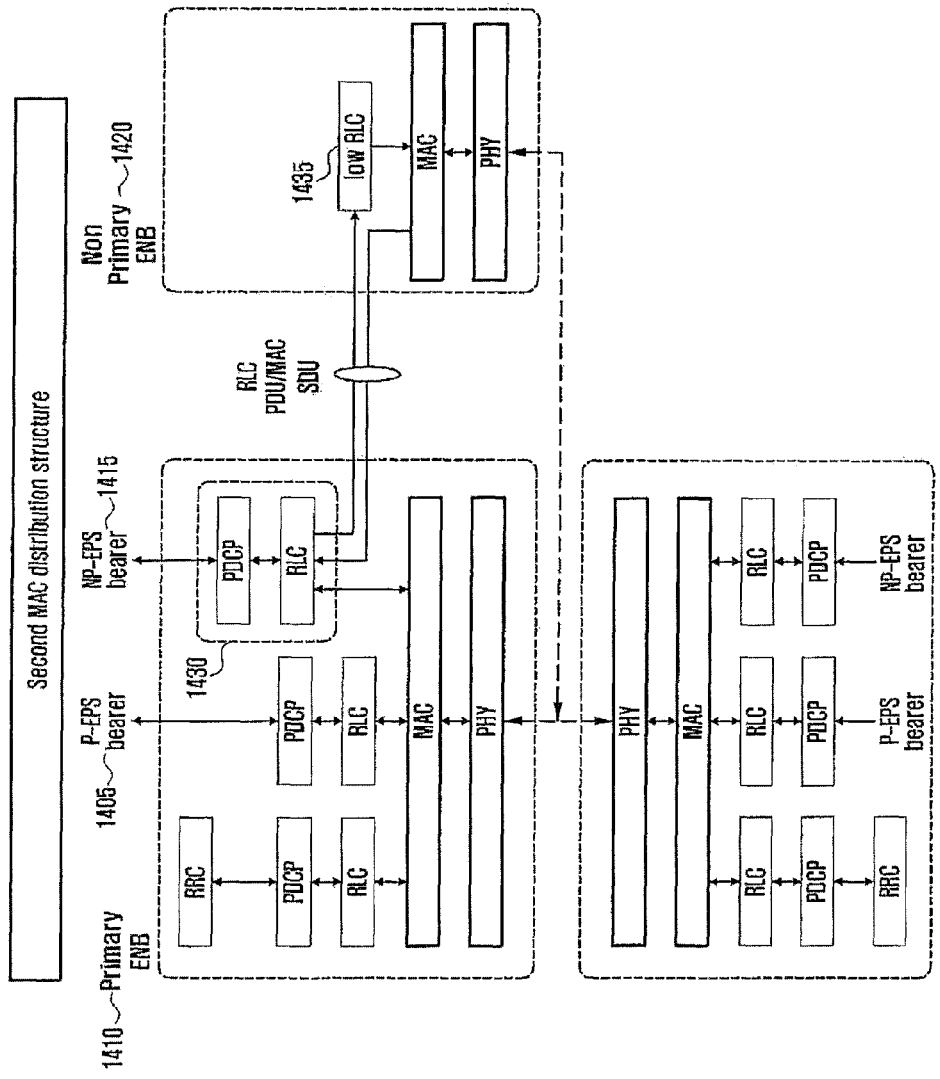
FIG. 14 is a diagram illustrating the second MAC distribution structure according to an embodiment of the present invention.

FIG. 14 is a diagram illustrating the second MAC distribution structure according to an embodiment of the present invention.

The second MAC distribution structure is characterized in that the NP-EPS bearer 1415 is established between the S-GW and the P-ENB. The NP-DRB 1430 is configured at the P-ENB 1410. The entity 1435 which is responsible for a partial function of the RLC entity (hereinafter, referred to as low RLC entity) is configured at the NP-ENB 1420. In the second MAC distribution structure too, the GPRS Tunnel Protocol (GTP) tunnel is established between the primary eNB 1410 and the non-primary eNB 1420 for data forwarding such that the RLC PDU (or MAC SDU) of the NP-EPS bearer 1415 is forwarded from the P-ENB 1410 to the NP-ENB 1420 through the GTP tunnel or vice versa. The low RLC entity 1435 of the NP-ENB 1420 re-segments the RLC PDU from the P-ENB to a size in adaptation to the current channel condition. The first MAC distribution also includes a P-EPS 1405.

Figure 15:
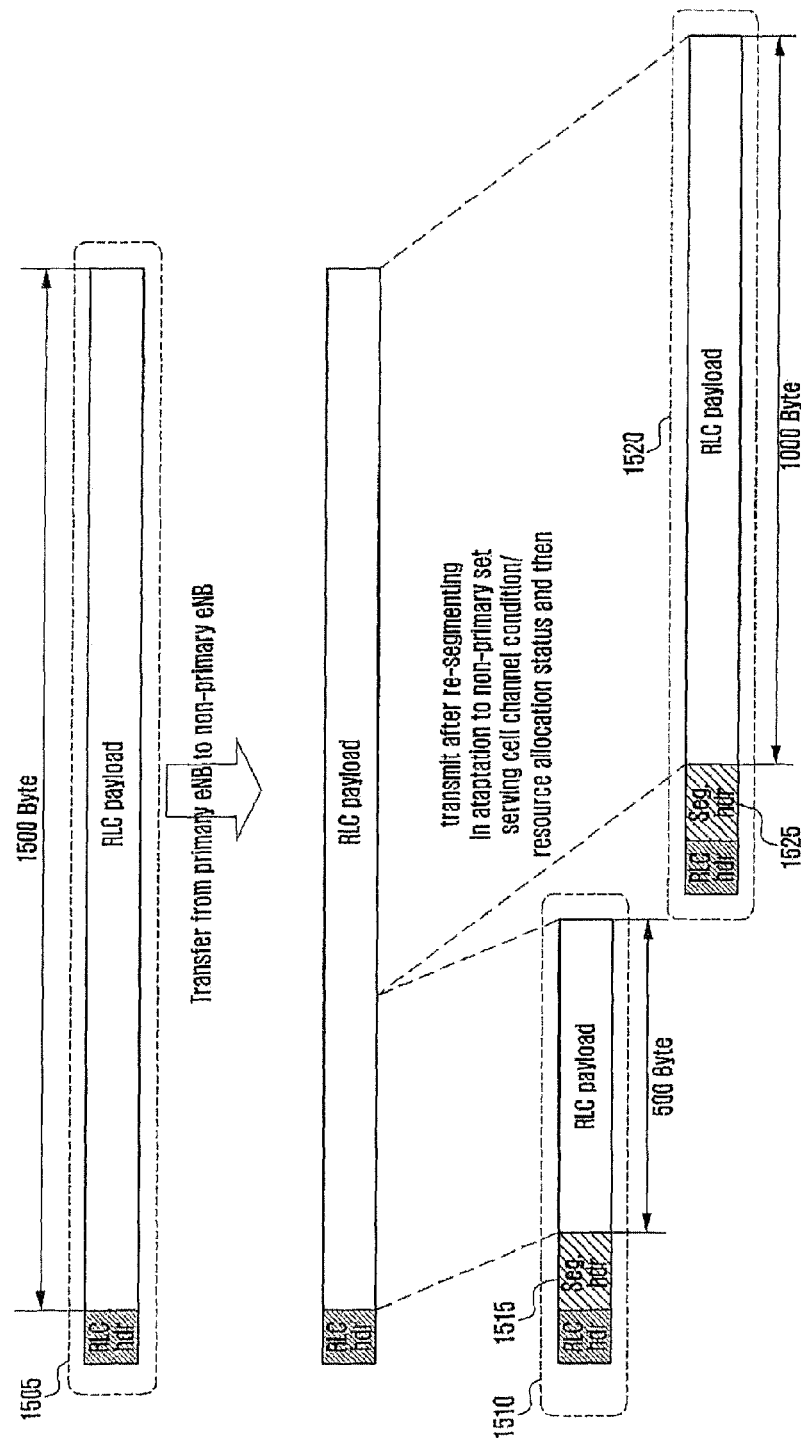
FIG. 15 is a diagram illustrating a structure of a data unit according to an embodiment of the present invention.

FIG. 15 is a diagram illustrating a structure of a data unit according to an embodiment of the present invention.

The RLC PDU segmentation process aforementioned in association with FIG. 14 is described in more detail with reference to FIG. 15. The low RLC entity 1435 of the P-ENB 1410 sends the NP-ENB 1420 the RLC PDU 1505 having a pre-negotiated size (e.g. having the payload of 1500 bytes). The low RLC entity 1435 of the NP-ENB 1420 stores the received RLC PDU 1505 in a buffer. The scheduler of the NP-ENB 1420 determines to transmit the data at certain timing and select a size of the data to be transmitted. The data size is determined based on the channel condition and scheduling status at the corresponding time point. The low RLC entity 1435 re-segments the RLC PDU 1505 in adaptation to the determined size and transfers the re-segmented RLC PDUs 1510 and 1520 to the MAC layer entity. The re-segmented RLC PDUs 1510 and 1520 may include segment headers 1515 and 1520 having an offset and a last segment indicator. Here, the offset is the information indicating what byte of the original RLC PDU corresponds to the $0^{th}$ byte of the re-segmented RLC PDU payload, and the last segment indicator is the information indicating whether the re-segmented RLC PDU is the last segment. For example, since the $0^{th}$ byte of the payload of the first re-segmented RLC PDU 1510 corresponds to the $0^{th}$ byte of the original RLC PDU 1505, the offset included in the segment header 1515 of the first re-segmented RLC PDU 1510 may be set to 0. Also, since the first re-segmented RLC PDU 1510 is not the last segment, the last segment indicator of the segment header 1515 may be set to 'NO.' Since the $0^{th}$ byte of the payload of the second re-segmented RLC PDU 1520 is the $500^{th}$ byte of the payload of the original RLC PDU 1505, the offset of the segment header 1525 of the second re-segmented RLC PDU 1520 may be set to 500. Since the second re-segmented RLC PDU 1520 is the last segment, the last segment indicator of the segment header 1525 is set to 'YES.' As described above, the low RLC entity 1435 may re-segment the RLC PDU while inserting the segment header as described above. Afterward, these segments are transferred to another entity or component of assembling the segments so as to be assembled based on the segment headers 1515 and 1525.

The low RLC entity 1435 processes only the downlink data. The uplink data is delivered from the MAC layer of the NP-ENB 1420 to the RLC entity of the P-ENB 1410 directly bypassing the low RLC entity 1435.

In the second MAC distribution structure, the data of the NP-EPS bearer 1415 are transmitted/received through all the serving cells, i.e. primary and non-primary sets serving cells. The RLC PDU size of the downlink data communicated through the primary set serving cell is determined dynamically in consideration of the channel condition and scheduling status of the corresponding serving cell, and the RLC PDU size of the downlink data communicated through the non-primary set serving cell is determined by reflecting the long term channel status of the non-primary set serving cell. Once determined, the size value is not changed for relatively long duration. Hereinafter, the RLC PDU size determined dynamically is referred to as dynamic RLC PDU size, and the RLC PDU size reflecting the long term channel status so as to be applied for relatively long time is referred to as static RLC PDU size. For uplink data transmission, the dynamic PDU size is applied in both the primary and non-primary sets serving cells.

Figure 16:
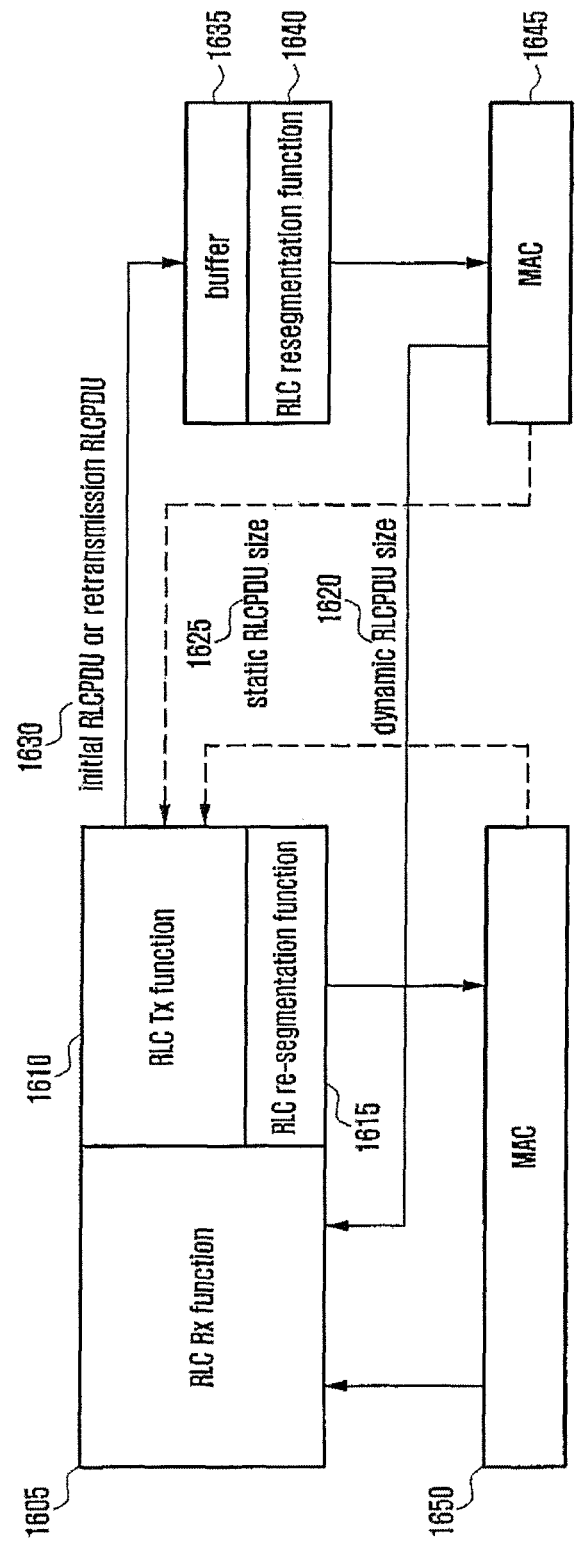
FIG. 16 is a diagram illustrating the configuration of RLC and MAC entities in the second MAC distribution structure according to an embodiment of the present invention.

FIG. 16 is a diagram illustrating the configuration of RLC and MAC entities in the second MAC distribution structure according to an embodiment of the present invention.

The RLC entity of the P-ENB has both the RLC reception function 1605 and RLC transmission function 1610. The RLC transmission function includes the RLC re-segmentation function 1615. The RLC re-segmentation function 1640 is of adjusting the size of the RLC PDU in RLC retransmission 1630 in a buffer 1635, and the size of the RLC PDU which is transmitted first is set to the dynamic RLC PDU size 1620 determined according to the channel condition/scheduling status at the RLC PDU transmission timing.

The MAC entity 1650 of the P-ENB determines the dynamic RLC PDU size 1620 before transmitting the RLC PDU and notifies the RLC transmission function of the dynamic RLC PDU size. The MAC entity 1645 of the NP-ENB determines the static RLC PDU size 1625 in the SCell configuration step or flow control step and notifies the RLC transmission function of the static RLC PDU size 1625. The RLC transmission function sets the size of the RLC PDU to be transmitted through the primary set serving cell in adaptation to the dynamic RLC PDU size 1620 and the size of the RLC PDU to be transmitted through the non-primary set serving cell in adaptation to the static RLC PDU size 1625.

The RLC transmission function 1610 determines the RLC SDU to be transmitted through the primary set serving cell and the RLC SDU to be transmitted through the non-primary set serving cell by applying a predetermined scheme. For example, the RLC PDUs may be sorted according to the ratio of reflections of the primary set serving cell load status and the non-primary set serving cell load status. Also, the ratio of the RLC SDUs to be transmitted through the non-primary set serving cell to the total RLC SDUs may be determined based on the data occurrence amount of the NP-EPS bearer and estimated data rate of the non-primary set. The estimated data rate of the non-primary set is the information which the scheduler of the non-primary set determines in consideration of the load status of the cells, channel condition of the UE, priority/weight of the NP-EPS bearer, data occurrence amount of the NP-EPS bearer and notifies to the primary eNB. The RLC transmission function processes the RLC SDUs to be transmitted through the primary set serving cell into the RLC PDUs fit to the dynamic RLC PDU size and transmits them through the primary set serving cell, and processes the RLC SDUs to be transmitted through the non-primary set serving cell into the RLC PDUs fit to the static RLC PDU size and transmits them through the non-primary eNB. The RLC transmission function may transfer the retransmission RLC PDUs to the non-primary eNB in any case. In this case, the transferred RLC PDUs are marked to indicate that they are the retransmission RLC PDUs such that the non-primary eNB transmits the retransmission RLC PDUs with priority. The retransmission RLC PDU may be indicated with one of reserved bits of the GTP header and implicitly by setting the size of the retransmission RLC PDU which differs from that of the static RLC PDU. The non-primary eNB transmits the retransmission RLC PDUs with priority.

The second MAC distribution structure is characterized as follows.

The RLC status report control message (RLC STATUS PDU; control message including transmission/reception status of RLC PDU, i.e. RLC ACK/NACK information) is transmitted from the NP-ENB to the P-ENB through the GTP tunnel.

The MAC scheduler of the NP-ENB instructs the RLC entity of the P-ENB to use the static RLC PDU size, and the MAC scheduler of the P-ENB instructs the RLC entity of the P-ENB to use the dynamic RLC PDU. The static RLC PDU size is determined by reflecting the long term channel status of the non-primary set serving cell and may be updated periodically.

The NP-EPS bearer data are communicated through both the primary and non-primary sets serving cells. The UE transmits the np-eps bearer data using the transmission resources allocated in both the primary and non-primary sets serving cells.

The downlink data of the NP-EPS bearer is re-segmented into appropriate size pieces by the low RLC entity of the NP-ENB and then transmitted to the UE.

Figure 17:
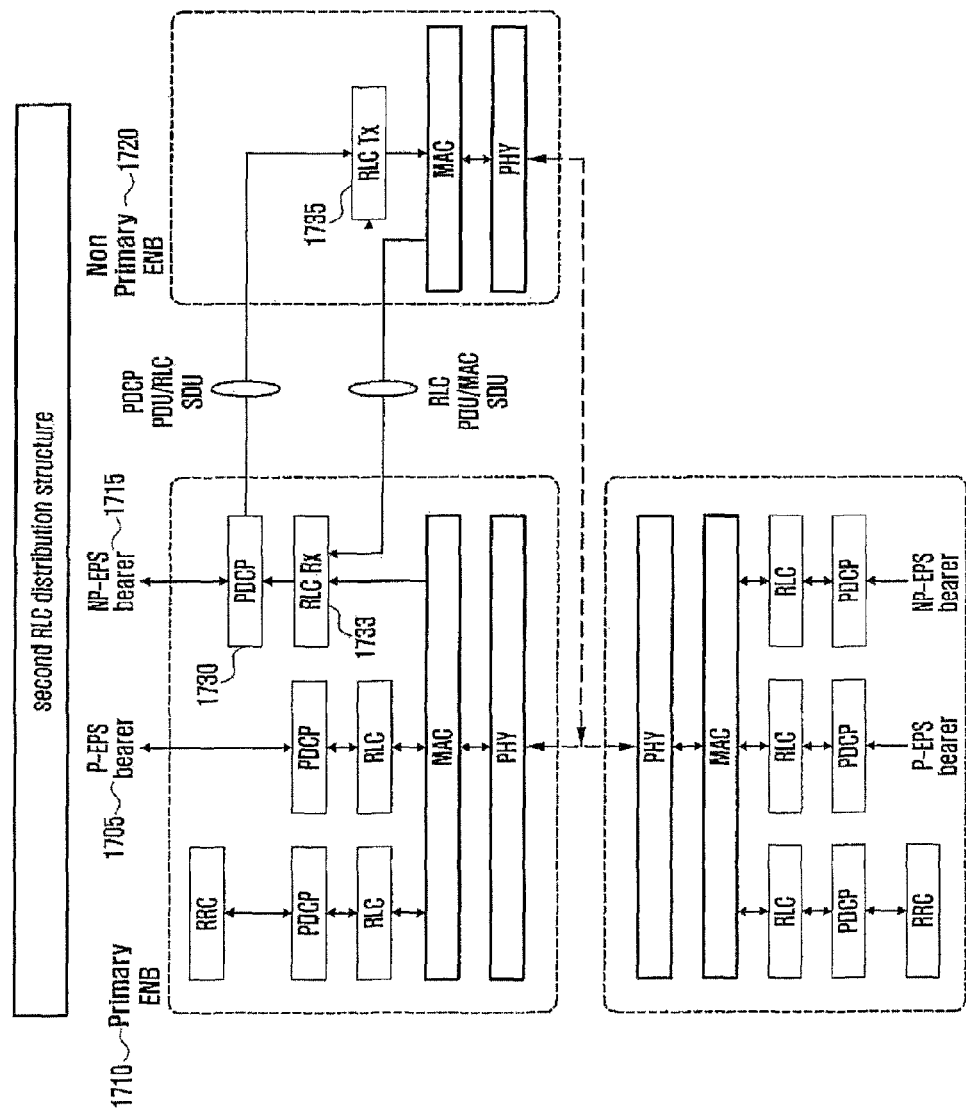
FIG. 17 is a diagram illustrating the second RLC distribution structure according to an embodiment of the present invention.

FIG. 17 is a diagram illustrating the second RLC distribution structure according to an embodiment of the present invention.

In the second RLC distribution structure, the NP-EPS bearer 1715 is established between the SGW and the P-ENB 1710 and part of the NP-DRB, i.e. PDCP entity 1730 and RLC Rx entity 1733, is configured at the NP-ENB 1720. The RLC Rx entity 1733 and RLC Tx 1735 entity are separated for the following reason. In order to determine the RLC PDU size for downlink data of the NP-EPS bearer by reflecting the channel condition and scheduling status of the non-primary set serving cell, the RLC transmission entity is located at the NP-ENB. In order for the UE to use both the primary and non-primary sets serving cells to transmit uplink data of the NP-EPS, the RLC Rx entity is located at the P-ENB 1710. If the RLC Rx entity is configured at the NP-ENB and if the UE transmits RLC PDUs to the primary set serving cell, the RLC PDUs has to be transferred from the P-ENB 1710 to the NP-ENB and then transferred back after a necessary measure has to be taken for the RLC Rx, and this problem can be avoided by placing the RLC Rx entity at the P-ENB 1710. The second RLC distribution structure also includes a P-EPS bearer 1705.

In the second RLC distribution structure, a GTP tunnel is established between the primary and non-primary eNBs through which the DL PDCP PDU (or RLC SDU) of the NP-EPS bearer is forwarded from the P-ENB 1710 to the NP-ENB and the UL RLC PDU (or MAC SDU) is transferred from the NP-ENB to the P-ENB 1710.

The RLC status report control message (RLC STATUS PDU; control message reporting RLC PDU transmission/reception status, i.e. including RLC ACK/NACK information) is transferred from the NP-ENB to the P-ENB 1710 through the GTP tunnel.

The NP-EPS bearer DL data is transmitted through the non-primary set serving cell. The NP-EPS bearer UL data are transmitted through the primary and non-primary sets serving cells.

Figure 32:
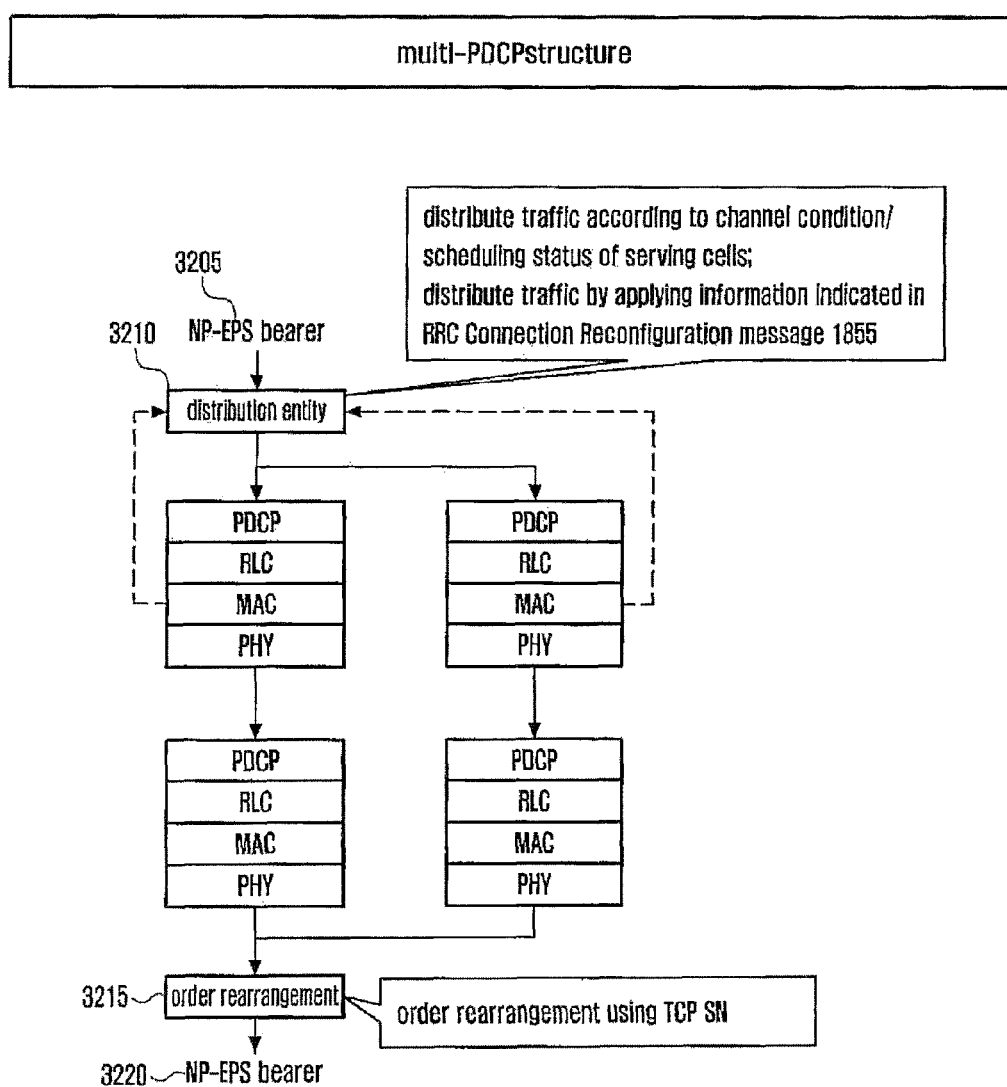
FIG. 32 is a diagram illustrating a multi-PDCP structure according to an embodiment of the present invention.

FIG. 32 is a diagram illustrating a multi-PDCP structure according to an embodiment of the present invention. In the multi-PDCP structure, multiple DRBs are configured to the NP-EPS bearers 3205 and 3220. It is possible to increase the peak data rate of the EPS bearer using the multi-PDCP structure. FIG. 32 is directed to the Tx entity and Rx entity. Each of the UE and the eNB is provided with both the transmission device and the reception device. In downlink, the distribution entity 3210 is configured at the P-ENB, and the order rearrangement entity 3215 is configured at the UE. In uplink, the distribution entity 3210 is configured at the UE, and the order rearrangement entity 3215 is configured at the P-ENB. In downlink, one of two DRBs is configured at the P-ENB, and the other is configured at the NP-ENB 3230. In uplink too, one DRB is configured at the P-ENB and the other at the NP-ENB.

The distribution entity 3210 distributes the NP-EPS bearer traffic to the NP-DRBs linked to the NP-EPS bearer. Since the distribution entity has no buffer, it distributes, if the NP-ENB bearer traffic arrives, the traffic to one of the two DRBs. The distribution entity of the P-ENB distributes the traffic in consideration of the channel conditions and scheduling statuses of the primary and non-primary sets serving cells. In more detail, the distribution entity receives the estimated throughput information from the MAC schedulers of the P-ENB and NP-ENB. It distributes the traffic according to the ratio between the estimated throughputs of the P-ENB and NP-ENB.

The distribution entity of the UE distributes the traffic according to the instruction from the eNB. The eNB sends the UE a non-primary set configuration control message, e.g. RRC Connection Reconfiguration message 1855 including the distribution information. The distribution information is the information related to the ratio between the data amount to be transmitted through the primary set serving cell (or data amount to be transmitted on the P-DRB) and the data amount to be transmitted through the non-primary set serving cell (or data amount to be transmitted on the NP-DRB). This information may be the information of indicating the ratio of the data to be transmitted through the non-primary set serving cell, and the ratio of the data to be transmitted through the primary set serving cell may be analogized out of the this information. For example, if the distribution information is 90, this means that the 90% of the data occurring on the NP-EPS bearer during a predetermined period has to be transmitted over the DRB of the non-primary set serving cell. As a consequence, the ratio of the data to be transmitted over the DRB of the primary set serving cell is 10%.

The order rearrangement operation is of determining whether there is any missing NP-EPS bearer packet and, if so, waiting until the missing NP-EPS bearer packet is received during a predetermined period. The packet occurring later than the missing packet is retained in the order rearrangement buffer until the missing packet is acquired. In order to perform the order rearrangement operation, there is a need of sequence number. In the present invention, the order rearrangement operation is performed with the TCP sequence number.

In the multi-PDCP structure too, a GTP tunnel for data forwarding is established between the primary and non-primary eNBs through which the DL PDCP SDU of the NP-EPS bearer is forward from the P-ENB to the NP-ENB and the UL PDCP SDU from the NP-ENB to the P-ENB.

Figure 33:
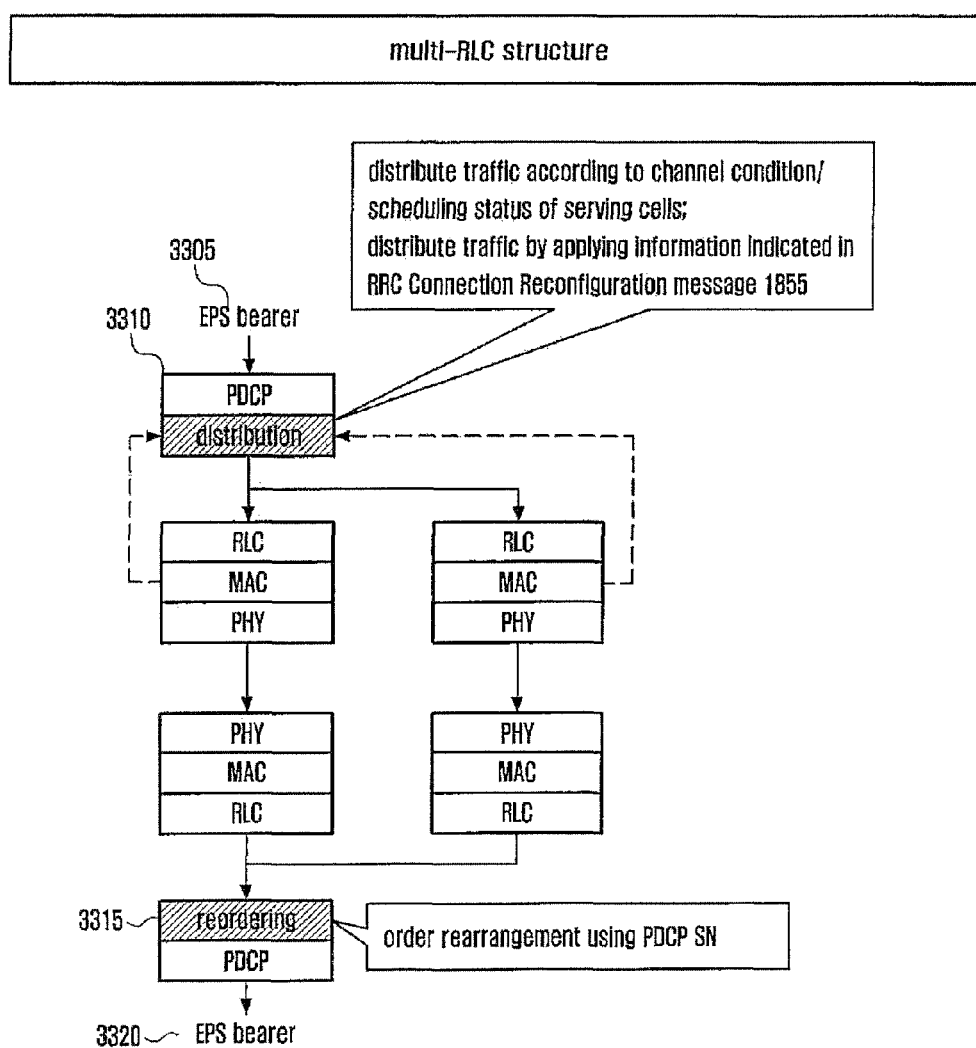
FIG. 33 is a diagram illustrating a multi-RLC structure according to an embodiment of the present invention.

FIG. 33 is a diagram illustrating a multi-RLC structure according to an embodiment of the present invention. In the multi-RLC structure, multiple RLC entities are configured to the NP-EPS bearers 3305 and 3320. Using the multi-RLC structure, it is possible to increase the peak data rate of the EPS bearer. FIG. 33 is directed to the Tx entity and Rx entity. Each of the UE and the eNB is provided with both the transmission device and the reception device. In downlink, the distribution entity 3310 is configured at the P-ENB, and the order rearrangement entity 3315 is configured at the UE. In uplink, the distribution entity 3310 is configured at the UE, and the order rearrangement entity 3315 is configured at the P-ENB. In downlink, one of two DRBs is configured at the P-ENB, and the other is configured at the NP-ENB. In uplink too, one DRB is configured at the P-ENB and the other at the NP-ENB. The distribution entity is configured between the PDCP entity and the RLC entity. In more detail, the distribution entity is configured below the PDCP entity, particularly an entity of adding the PDCP header. Also, the distribution entity is configured as a part of the PDCP entity or the last processing entity of the PDCP entity.

The distribution entity 3310 is responsible for distributing the PDCP PDU to the RLC entities connected to the PDCP entity. Since the distribution entity has no buffer, it distributes, if any PDCP PDU is generated, to one the two RLC entities in real time. The distribution entity of the P-ENB distributes the traffic in consideration of the channel conditions and scheduling statuses of the primary and non-primary sets serving cells. In more detail, the distribution entity receives the estimated throughput information from the MAC schedulers of the P-ENB and NP-ENB periodically. The distribution entity distributes the traffic according to the ratio between the estimated throughputs of the p-eNB and NP-ENB.

The distribution entity of the UE distributes the traffic according to the instruction from the eNB. The eNB sends the UE a non-primary set configuration control message, e.g. RRC Connection Reconfiguration message 1855 including the distribution information. The distribution information is the information related to the ratio between the data amount to be transmitted through the primary set serving cell (or data amount to be transmitted on the P-DRB) and the data amount to be transmitted through the non-primary set serving cell (or data amount to be transmitted on the NP-DRB). This information may be the information of indicating the ratio of the data to be transmitted through the non-primary set serving cell, and the ratio of the data to be transmitted through the primary set serving cell may be analogized out of the this information. For example, if the distribution information is 90, this means that the 90% of the data occurring on the NP-EPS bearer during a predetermined period has to be transmitted over the DRB of the non-primary set serving cell. As a consequence, the ratio of the data to be transmitted over the DRB of the primary set serving cell is 10%.

The order rearrangement operation is of determining whether there is any missing NP-EPS bearer packet and, if so, waiting until the missing NP-EPS bearer packet is received during a predetermined period. The packet occurring later than the missing packet is retained in the order rearrangement buffer until the missing packet is acquired. In order to perform the order rearrangement operation, there is a need of sequence number. In the present invention, the order rearrangement operation is performed with the TCP sequence number. The missing packet waiting time period is set by the eNB and then notified to the UE.

The order rearrangement entity is configured between the RLC entity and the PDCP entity. It is also possible to configure the order rearrangement entity as a part of the PDCP entity. At this time, the order rearrangement entity may be configured as the first processing entity of the PDCP Rx entity. The PDCP entity performs two types of order arrangement operations. The first order rearrangement operation is executed only when a lower layer entity such as handover is established, and the second order rearrangement operation is running constantly. The first order rearrangement operation is applicable to only the AM bearer, and the second order rearrangement operation is applicable to both the RLC AM and UM bearers. The eNB configures a bearer in such a way of determining whether to apply the first order rearrangement operation, the second order rearrangement operation, or both the order rearrangement operations to the bearer, and notifies the UE of the determination result using predetermined control information. Whether to apply the first order rearrangement operation is determined in association with whether to generate a PDCP status report. The UE applies the first order rearrangement only to the DRB configured to generate the PDCP status report. The first order rearrangement operation is performed in such a way of storing the PDCP packets required to be arranged in order among the PDCP packets received after the reconfiguration of the low layer entity and determining the packets to be delivered to the upper layer among the stored PDCP packets by referencing the sequence numbers of the received PDCP packets. In the first order rearrangement operation, if a packet with a sequence number of n is received, the packets of which sequence numbers are lower than n are delivered to the upper layer although the order rearrangement has not been completed yet. Whether to apply the second order rearrangement operation is determined depending on whether an order rearrangement timer is configured. That is, if an order rearrangement timer is configured to a certain bearer, the UE applies the second order rearrangement operation to the bearer always. In the second order rearrangement operation, if a mission packet occurs, a timer starts and, if the packet is not received before the expiry of the timer, delivers the packets having the sequence numbers lower than that of the mission packet to the upper layer. In the case of the bearer to which both the first and second order rearrangements are configured, the UE applies the first order rearrangement and then the second order rearrangement. Or, the second order rearrangement is not applied during the period in which the first order rearrangement is applied, i.e. during a predetermined period after the lower layer is reconfigured.

In the multi-PDCP structure too, a GTP tunnel for data forwarding is established between the primary and non-primary eNBs through which the DL PDCP SDU of the NP-EPS bearer is forward from the P-ENB to the NP-ENB and the UL PDCP SDU from the NP-ENB to the P-ENB.

Figure 18:
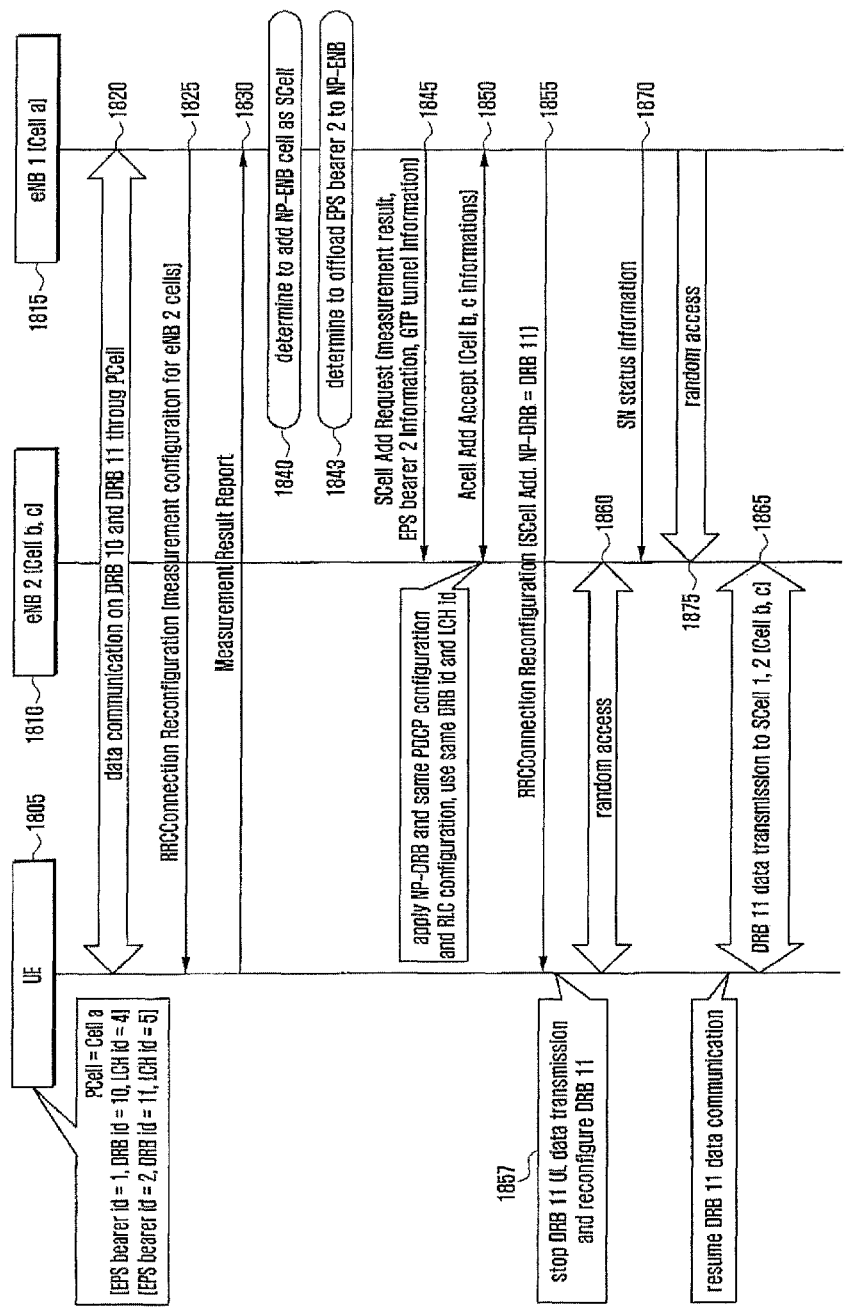
FIG. 18 is a signal flow diagram illustrating the operation of adding primary set and non-primary sets serving cells and configuring DRB according to an embodiment of the present invention.

FIG. 18 is a signal flow diagram illustrating the operation of adding primary set and non-primary sets serving cells and configuring DRB according to an embodiment of the present invention.

In the mobile communication system composed of a UE 1805, eNB 1 1815, and eNB 2 1810; cell a is controlled by the eNB 1, and cells b and c are controlled by the eNB 2. The cell a is a macro cell, and the cells b and c are pico cells. The PCell of the UE is the cell a. The UE is configured with two EPS bearers. The DRB identifier (DRB id) of the EPS bearer 1 is 10, the logical channel identifier (LCH id) is 4, and the delay-sensitive real time service, e.g. VoIP service, is provided. The DRB id of the EPS bearer 2 is 11, the LCH id of the EPS bearer 2 is 5, and a burst data communication service, e.g. file download service, is provided. The UE transmits/receives data on DRB 10 and DRB 11 through the PCell at step 1820.

The P-ENB, i.e. the eNB 1, instructs the UE to measure the cells b and c to configure the pico cells to the UE at step 1825. The UE performs measurement as instructed and, if the channel qualities of the cells fulfil a predetermined condition, reports the measurement result to the eNB at step 1830. The eNB may notify the UE of the frequencies to be measured instead of the cells. That is, the eNB may instruct the UE to measure the frequencies of the cells b and c at step 1825. The measurement result report is carried in a predetermined RRC control message. The condition of triggering the measurement result report is that the channel quality of a neighboring cell operating on the frequency indicated for measurement which is better than a predetermined threshold is maintained during a predetermined period or that the channel quality of a neighboring cell operating on the frequency indicated for measurement which is better than that of the PCell is maintained during a predetermined period The P-ENB adds the pico cell of the eNB 2 as a SCell based on the measurement result reported by the UE at step 1840 and determines to communicate (or transmit) the EPS bearer 2 data through the added SCell at step 1843.

The P-ENB sends the NP-ENB a control message requesting for adding the SCell at step 1845. The control message may include at least part of the informations listed in table 5.

TABLE 5

| Name | Description |
| --- | --- |
| SCell candidate info. | Identifiers of cells that can be configured as SCell among cells of NP-ENB and measurement results on the cells. The NP-ENB may determine the cells to be configured SCell in |

TABLE 5-continued

| Name | Description |
| --- | --- |
|  | consideration of the measurement result and load statuses of the cells. If the coverages of the pico cells controlled by one eNB are similar to each other, the NP-ENB may configure a cell which is not the SCell candidate cell recommended by the P-ENB as the SCell. |
| TAG id info. | Information on the identifier of the TAG to be configured at the drift eNB. In order to prevent the identifiers in use in the serving eNB from being reused, the identifier is determined by the serving cell and notified to the drift eNB. |
| Offload bearer info. | Information on the EPS bearer to be offloaded in the non-primary set serving cell. This includes required information, EPS bearer identifier, and others as follows. The first PDCP distribution structure: PDCP configuration information, RLC configuration information, DRB id, and LCH information. The second PDCP distribution structure: identical with the first PDCP distribution structure. The first RLC distribution structure: RLC configuration information, DRB id, and LCH information. The second RLC distribution structure: RLC Tx entity configuration information DRB id, and LCH information. The first MAC distribution structure: LCH information. The second MAC distribution structure: LCH information. The LCH information includes LCH id. The RLC and PDCP configuration information and LCH information are defined in RLC-config, PDCP-config, and logicalChannelConfig of TS36.331, respectively. The RLC Tx entity configuration information is the information on the transmission of the RLC-config. |
| Call Admission Control info. | The serving eNB provides the drift eNB with reference information in order to the drift eNB to determine whether to accept or reject the SCell add request. For example, the reference information may include the required data rate, estimated UL data amount, expected DL data amount, etc. |
| GTP Tunnel info. | GTP Tunnel information for use in UL data forwarding. |

The NP-ENB performs Call Admission Control. If it is determined to accept the SCell Add Request, the NP-ENB determines the cell to be added as SCell and configures an NP-DRB. The NP-ENB reuses the LCH id of the P-ENB in order for the UE to use only one MAC entity. For example, the NP-ENB allocates the LCH id of 5 in configuring part or whole of the DRB for the EPS bearer 2.

One of the important functions of the MAC entity at UE is to multiplex the RLC PDUs of multiple DRBs into one MAC PDU and demultiplex the MAC PDU into the RLC PDUs. For multiplexing and demultiplexing, it is necessary to insert the LCH id in the MAC PDU header appropriately. Accordingly, if the P-ENB and NP-ENB allocate LCH id inconsistently, e.g. if the same LCH id is allocate to different DRBs, the UE has to configure the MAC entities for the P-ENB and NP-ENB independently. In the present invention, the NP-ENB allocates the LCH id to the NP-DRB which the P-ENB has not allocated to other DRB in order to avoid the above problem. For example, the NP-ENB may allocate the LCH which has been used by the P-ENB already for the corresponding DRB.

The NP-ENB allocates the DRB id of the NP-DRB which has been used by the P-ENB. This is because, if a new DRB id is allocated to the NP-DRB, the UE may determine that a new DRB is configured and thus malfunction, e.g. discard the data stored in the DRB buffer or deliver the data to the upper layer.

The NP-ENB configures the PDCP and RLC entities of the NP-DRB by applying the PDCP and RLC configurations used in the P-ENB. If a different configuration is used, the UE releases the current DRB and reconfigures a DRB in adaptation to the new configuration to avoid functioning.

In detail, the NP-ENB configures part or whole of the np-DRB as follows.

In the first or second PDCP distribution structure, all of the PDCP entity, the RLC entity, and the LCH are configured. In the RLC distribution structure, the RLC entity and the LCH are configured. In the second RLC distribution, the RLC Tx entity and the LCH are configured. In the MAC distribution structure, the LCH is configured. In the second MAC distribution structure, the low RLC Tx entity and the LCH are configured.

The NP-ENB sends the P-ENB a control message of accepting the SCell Add Request at step 1850. This control message may include at least part of the informations listed in table 6.

TABLE 6

| Name | Description |
| --- | --- |
| SCellToAddMod | This is the information on the SCells (e.g. cells b and c) configured by the drift eNB and includes sCellIndex-r10, cellIdentification-r10, radioResourceConfigCommonSCell-r10, radioResourceConfigDedicatedSCell-r10, and TAG information. |
| PUCCH configuration info. | At least one of the SCells belonging to the non-primary set is configured with Physical Uplink Control Channel (PUCCH). |

TABLE 6-continued

| Name | Description |
| --- | --- |
| for PUCCH SCell | The UL control information such as HARQ feedback, Channel Status Information (CSI), Sounding Reference Signal (SRS), and Scheduling Request (SR) is transmitted on the PUCCH. Hereinafter, the SCell in which PUCCH is transmitted is referred to as PUCCH SCell. This information includes the sub-information such as PUCCH SCell identifier and PUCCH configuration information. |
| GTP Tunnel info. | Information on the GTP Tunnel to be used for DL data forwarding. |
| UE identifier | C-RNTI to be used by UE in the SCells of the non-primary set. Hereinafter, referred to as C-RNTI_NP. |
| Bearer configuration info. | Information on the bearer to be offloaded. This includes a list of bearers accepted to be offloaded and per-bearer configuration information. If the bearer configurations are identical with each other, this information may include only the list of the accepted bearers. The following informations are included depending on the structure. The first MAC distribution structure: RLC PDU size which is configured in consideration of channel condition at the corresponding time and may be updated by the NP-ENB. The second MAC distribution structure: RLC PDU size which is adjusted by the low RLC entity through re-segmentation so as to be set to relatively large value and not changed after the initial configuration. |
| MAC configuration info. | Various MAC configuration informations to be applied to the non-primary set serving cells. For example, DRX information, PHR configuration information, and BSR configuration information. |

If the control message is received, the P-ENB sends the UE an RRC control message instructing to add a serving cell at step 1855. The RRC control message may include at least part of the informations listed in table 7. The P-ENB stops the NP-DRB data communication as follows.

The first/second PDCP distribution structure, the first/second RLC distribution structure: Stop NP-DRB DL data transmission.

The first/second MAC distribution structure: Continue NP-DRB DL data transmission.

If the RRC Connection Reconfiguration control message is received, the UE configures SCell, PHR and BSR using the various informations included in the control message at step 1857. If the offload bearer information is included, the UE stops data communication as follows.

The first or second PDCP distribution structure, the first RLC distribution structure: Stop UL data transmission of NP-DRB The second RLC distribution structure, the first or second MAC distribution structure: Continue UL data transmission of NP-DRB

TABLE 7

| Name | Description |
| --- | --- |
| SCellAddMod | This is the information transmitted by the drift eNB without modification. That is, this is identical with SCellAddMod in table 6. This includes one SCellAddMod per SCell and is a sub-information of the SCellAddModList. |
| PUCCH configuration info. for PUCCH SCell | This is the information transmitted by the drift eNB without modification. That is, this is identical with the PUCCH information for PUCCH SCell in table 6. |
| Non-primary set serving cell info. | This is the information on the SCells belonging to the non-primary set among the SCells to be configured. This may include SCell identifiers and identifiers of TAGs belonging to the non-primary set. |
| UE identifier | C-RNTI to be used by UE in the SCells of the non-primary set, i.e. C-RNTI_NP. |
| Offload bearer info. | This is the information on the bearer to be processed by the drift eNB. From the view point of the UE, this is the information on the bearer for communication through the serving cells of the non-primary set and includes the bearer list and bearer configuration information. If the bearer configurations are identical with each other, the bearer configuration information may be omitted. The bearer identifier of the bearer list may be the EPS bearer identifier, DRB id, or LCH id. If DRB id, the value, e.g. 11, is signaled. |
| MAC configuration info. | Various MAC configuration informations related to the non-primary set serving cell. For example, DRX information, PHR configuration information, and BSR configuration information. |

In the case of the first or second PDCP distribution structure or the first or second RLC distribution structure, the first reconfiguration procedure is performed for the NP-DRB.

The UE establishes DL synchronization with the PUCCH SCell and performs random access in the PUCCH SCell at step 1860. In more detail, the UE transmits a random access preamble using a predetermined frequency resource during a predetermined time period of the PUCCH SCell and waits for receiving a random access response message during a predetermined period determined according to the preamble transmission time. If a valid random access response message is received, the UE adjusts the uplink transmission timing based on the UL transmission Timing Advance Command included in the message. The UE transmits the MAC PDU through the PUCCH SCell using the UL transmission resource indicated in the UL grant of the message. The MAC PDU includes the C-RNTI MAC CE and BSR MAC CE, and the C-RNTI MAC CE includes the C-RNTI_NP. The BSR MAC CE includes the buffer status information indicating the transmittable data amount stored in the offload bearer. The C-RNTI MAC CE and the BSR MAC CE are specified in section 6.1.3 of TS 36.321. The UE determines whether the PDCCH of the PUCCH SCell which indicates initial transmission addressed to the C-RNTI_NP. If the PDCCH fulfilling this condition is received during a predetermined period, the UE determines that the random access has completed successfully and thus resumes data transmission as follows.

In the first or second PDCP distribution structure or the first or second RLC distribution structure, the PDCP STATUS REPORT generated to the NP-DRB is transmitted to the non-primary set serving cell.

The UE performs NP-DRB data communication through the newly configured SCell at step 1865. In the first or second PDCP distribution structure or the first or second RLC distribution structure, the UE applies the set-specific logical channel prioritization. In the first or second MAC distribution structure, the UE applies the normal logical channel prioritization.

Upon receipt of the SCell Add Accept control message, the P-ENB starts forwarding the DRB data to be offloaded to the NP-ENB. The P-ENB sends the NP-ENB an SN Status message which may include at least part of the informations listed in table 8 in association with the NP-DRB fulfilling condition 1 at step 1870.

TABLE 8

| Name | Description |
| --- | --- |
| UL PDCP PDU reception status info. | Bitmap having a predetermined size. The nth bit indicates reception status of PDCP SDU having PDCP SN of m. m = PDCP SN of first missing PDCP SDU + n) modulo (Max PDCP SN + 1) |
| UL COUNT | COUNT of first missing PDCP SDU. The COUNT is a 32-bit integer and increments by 1 for every PDCP SDU. The COUNT is a value obtained by concatenating HFN and PDCP SN. |
| DL COUNT | COUNT to be granted to the first PDCP SDU among the PDCP SDU to which no PDCP SN is allocated yet. |

[Condition 1]

The corresponding DRB operates in RLC AM mode and is configured to generate PDCP STATUS REPORT.

The PDCP STATUS REPORT is a control message exchanged between the PDCP Tx/Rx entities to avoid packet loss in the case where the RLC cannot perform ARQ temporarily due to the RLC entity reconfiguration.

The P-ENB forwards data to the NP-ENB at step 1875 as follows.

First or second PDCP distribution structure
DL data: Among the PDCP SDUs stored in the buffer, the PDCP SDUs of which successful transmissions are not sure are delivered.
The PDCP SDUs which have allocated PDCP SNs already are transmitted to the NP-ENB along with the GTP header including the allocated PDCP SN information.
The PDCP SDUs which have not allocated PDCP SN yet are transmitted to the NP-ENB along with the GTP header having no PDCP SN information
UL data
The PDCP SDUs received successfully but not arranged in order are transmitted to the NP-ENB. At this time, the GTP header includes the PDCP SN information.
First or second RLC distribution structure
DL data: Among the PDCP SDUs stored in the buffer, the PDCP SDUs of which successful transmissions are not sure are processed into PDCP PDUs, which are transferred.
The PDCP PDUs which have allocated the PDCP SN already are transmitted to the NP-eNB along with the GTP header including the information indicating that the PDCP PDUs are included.
The PDCP SDUs which have not allocated PDCP SN yet are processed into PDCP PDUs, which are transmitted to the NP-ENB along with the GTP header including the information indicating that the PDCP PDUs are included.
The UL data is not transferred.

The operations related to data communication in the respective structures are summarized.

The first or second PDCP distribution structure
The NP-ENB receives the SCell Add Request message at step 1845 and, if the SCell add request is accepted, configures NP-DRB.
If the RRC Connection Reconfiguration control message is transmitted to the UE at step 1885, the P-ENB stops DL data transmission on NP-DRB and establishes an RLC entity. As a consequence, the UL RLC packets stored in the RLC entity are reassembled into the PDCP PDUs, which are transferred to the PDCP entity.
If the RRC Connection Reconfiguration control message is received at step 1885, the UE stops uplink data transmission on the NP-DRB and reestablishes RLC transmission/reception entity. As a consequence, the DL RLC packets stored in the RLC reception entity are reassembled into PDCP PDUs, which are transferred to the PDCP entity.
The P-ENB sends the NP-ENB the SN status information at step 1870. The SN status information includes the information on the DL PDCP SDUs stored in the PDCP transmission buffer and the UL PDCP SDUs stored in the reception buffer.
The P-ENB sends the NP-ENB the DL PDCP SDUs through the GTP tunnel established for DL data forwarding and the UL PDCP SDUs through the GTP tunnel established for UL data forwarding at step 1875.
The UE acquires DL synchronization with the non-primary set serving cell and, if the random access completes in the PUCCH SCell, transmits a PDCP Status Report through the non-primary set serving cell. The PDCP Status Report is generated by referencing the DL PDCP SDUs stored in the PDCP reception buffer.

The PDCP Status Report is generated by referencing the UL PDCP SDUs stored in the UL PDCP reception buffer or the SN status information.

The UE and the NP-ENB resume NP-DRB data communication using the transmission resource of the non-primary set serving cell.

The first RLC distribution structure

The NP-ENB receives the SCell Add Request message at step 1845 and, if the SCell add request is accepted, configures an RLC entity of the NP-DRB.

If the RRC Connection Reconfiguration control message is transmitted to the UE at step 1885, the P-ENB stops DL data transmission on NP-DRB and establishes an RLC entity. As a consequence, the UL RLC packets stored in the RLC entity are reassembled into the PDCP PDUs, which are transferred to the PDCP entity.

If the RRC Connection Reconfiguration control message is received at step 1885, the UE stops uplink data transmission on the NP-DRB and reestablishes RLC transmission/reception entity. As a consequence, the DL RLC packets stored in the RLC reception entity are reassembled into PDCP PDUs, which are transferred to the PDCP entity.

The P-ENB sends the NP-ENB the SN status information at step 1870. The SN status information includes the information on the DL PDCP SDUs stored in the PDCP transmission buffer and the UL PDCP SDUs stored in the reception buffer.

The P-ENB sends the NP-ENB the DL PDCP SDUs through the GTP tunnel established for DL data forwarding and the UL PDCP SDUs through the GTP tunnel established for UL data forwarding at step 1875.

The UE acquires DL synchronization with the non-primary set serving cell and, if the random access completes in the PUCCH SCell, transmits a PDCP Status Report through the non-primary set serving cell. The PDCP Status Report is generated by referencing the DL PDCP SDUs stored in the PDCP reception buffer.

The P-ENB sends the UE a PDCP STATUS REPORT. The PDCP STATUS REPORT is generated by referencing the UL PDCP SDUs stored in the UL PDCP reception buffer or SN status information.

The UE and the NP-ENB resume data communication of NP-DRB using the transmission resource of the non-primary set serving cell.

The second RLC distribution structure

The NP-ENB receives the SCell Add Request message at step 1845 and, if the SCell add request is accepted, configures an RLC entity of the NP-DRB.

If the RRC Connection Reconfiguration control message is transmitted to the UE at step 1885, the P-ENB stops DL data transmission on NP-DRB and establishes an RLC entity. As a consequence, the UL RLC packets stored in the RLC entity are reassembled into the PDCP PDUs, which are transferred to the PDCP entity.

If the RRC Connection Reconfiguration control message is received at step 1885, the UE stops uplink data transmission on the NP-DRB and reestablishes RLC transmission/reception entity. As a consequence, the DL RLC packets stored in the RLC reception entity are reassembled into PDCP PDUs, which are transferred to the PDCP entity.

The P-ENB sends the NP-ENB the SN status information at step 1870. The SN status information includes the information on the DL PDCP SDUs stored in the PDCP transmission buffer and the UL PDCP SDUs stored in the reception buffer.

The P-ENB sends the NP-ENB the DL PDCP PDUs through the GTP tunnel established for DL data forwarding at step 1875.

The UE acquires DL synchronization with the non-primary set serving cell and, if the random access completes in the PUCCH SCell, transmits a PDCP Status Report through the non-primary set serving cell. The PDCP Status Report is generated by referencing the DL PDCP SDUs stored in the PDCP reception buffer.

The NP-ENB resumes np-DRB DL data communication using the transmission resource of the non-primary set serving cell.

The first or second MAC distribution structure

The NP-ENB receives the SCell Add Request message at step 1845 and, if the S Cell add request is accepted, configures the logical channel of the NP-DRB.

The P-ENB continues DL data transmission of NP-LCH without pause in the SCell add/release procedure.

The UE continues UL data transmission of NP-LCH without pause in the SCell add/release procedure.

The SN status report message and PDCP STATUS REPORT are not used.

Figure 19:
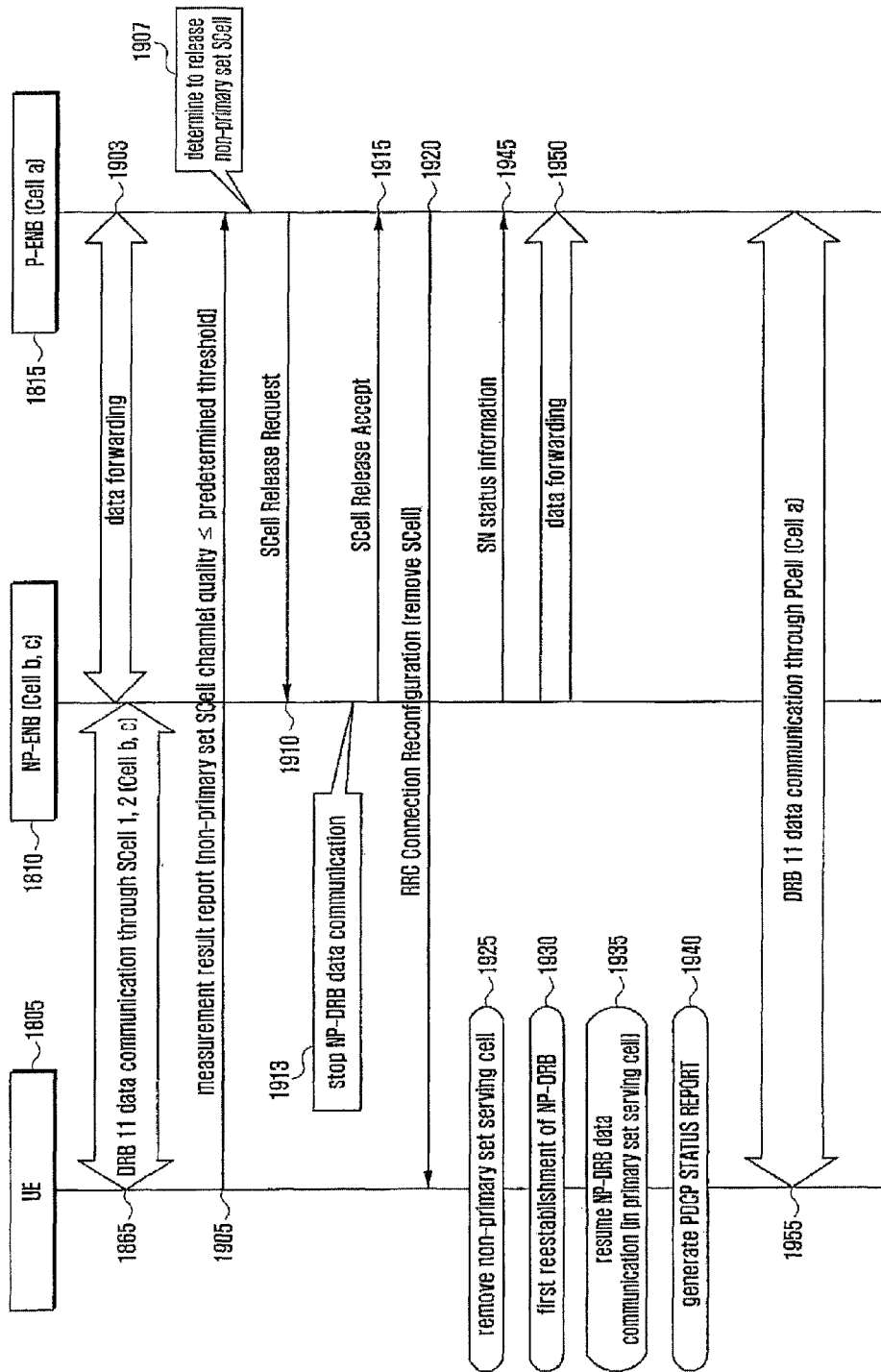
FIG. 19 is a signal flow diagram illustrating the procedure of releasing SCell and transmitting/receiving data according to an embodiment of the preset invention.

FIG. 19 is a signal flow diagram illustrating the procedure of releasing SCell and transmitting/receiving data according to an embodiment of the preset invention.

The UE transmits/receives data of the NP-DRB through the non-primary set serving cell at step 1865.

The P-ENB 1815 forwards the NP-DRB DL data to the NP-ENB 1810, and the NP-ENB forwards the UL data to the P-ENB at step 1903.

The UE reports the measurement result notifying that the channel quality of the non-primary set serving cell is less than a predetermined threshold at step 1905. If the channel quality of part of the non-primary set serving cell, e.g. channel quality of the PUCCH SCell, is less than a predetermined threshold, the P-ENB determines to release all the non-primary set serving cells at step 1907.

The P-ENB sends the NP-ENB a control message request for release of the SCell of the UE 1905 at step 1910. Upon receipt of the control message, the NP-ENB performs the following operations at step 1913.

If part of non-primary set serving cells are released and the released cells include no PUCCH SCell The NP-ENB transmits a predetermined MAC CE (Activation/Deactivation MAC CE, see TS 36.321) to deactivate the released SCells.

The NP-ENB releases the SCells instructed to release.

In the case that part of non-primary set serving cells is released but the PUCCH SCell is not included among the released serving cells (or PUCCH SCell is absent due to the release of SCell) or all the non-primary set serving cells are released The NP-ENB transmits a MAC CE (hereinafter, referred to as first MAC CE) to deactivate the SCells and prohibits UL transmission in the PUCCH SCell.

The NP-ENB releases all the non-primary set serving cells.

The NP-ENB stops NP-DRB data transmission/reception

The NP-ENB reestablishes RLC and PDCP entities.

The NP-ENB transmits SN status information at step 1945.

The first MAC CE is made up of a MAC sub-header without payload to instruct the UE to perform the following operations.

To deactivate the serving eNBs with the exception of the PUCCH SCell among the non-primary set serving cells in the active state currently.

To prohibit UL transmission in the PUCCH SCell (e.g. Channel Quality Indicator (CQI), Scheduling Request, and random access preamble)

The NP-ENB sends the P-ENB a control message for accepting SCell release at step 1915.

The P-ENB sends the UE a control message instructing to release the SCell at step 1920. The control message includes the identifier of the SCell to be released. Upon receipt of the control message, the UE performs the operations as follows.

If part of the non-primary set serving cells is released and if the released serving cells include no PUCCH SCell
  release the SCell indicated to release
  maintain data transmission/reception on NP-DRB
if part of non-primary set serving cells is released and if the released serving cells include the PUCCH SCell (i.e. the PUCCH SCell is absent due to the SCell release) or if all the non-primary set serving cells are released,
  release all the primary set serving cells at step 1925
  stop NP-DRB data transmission/reception and perform the first reestablishment at step 1930
  resume NP-DRB data transmission/reception. At this time, use only the primary set serving cell transmission resource at step 1935.
generate PDCP STATUS REPORT for NP-DRB at step 1940

Afterward, the UE transmits/receives NP-DRB data through the primary set serving cell at step 1955.

The NP-ENB sends the P-ENB an SN status information message at step 1945 and forwards the data at step 1950.

The P-ENB performs NP-DRB communication with the UE using the forwarded data at step 1955.

Figure 20:
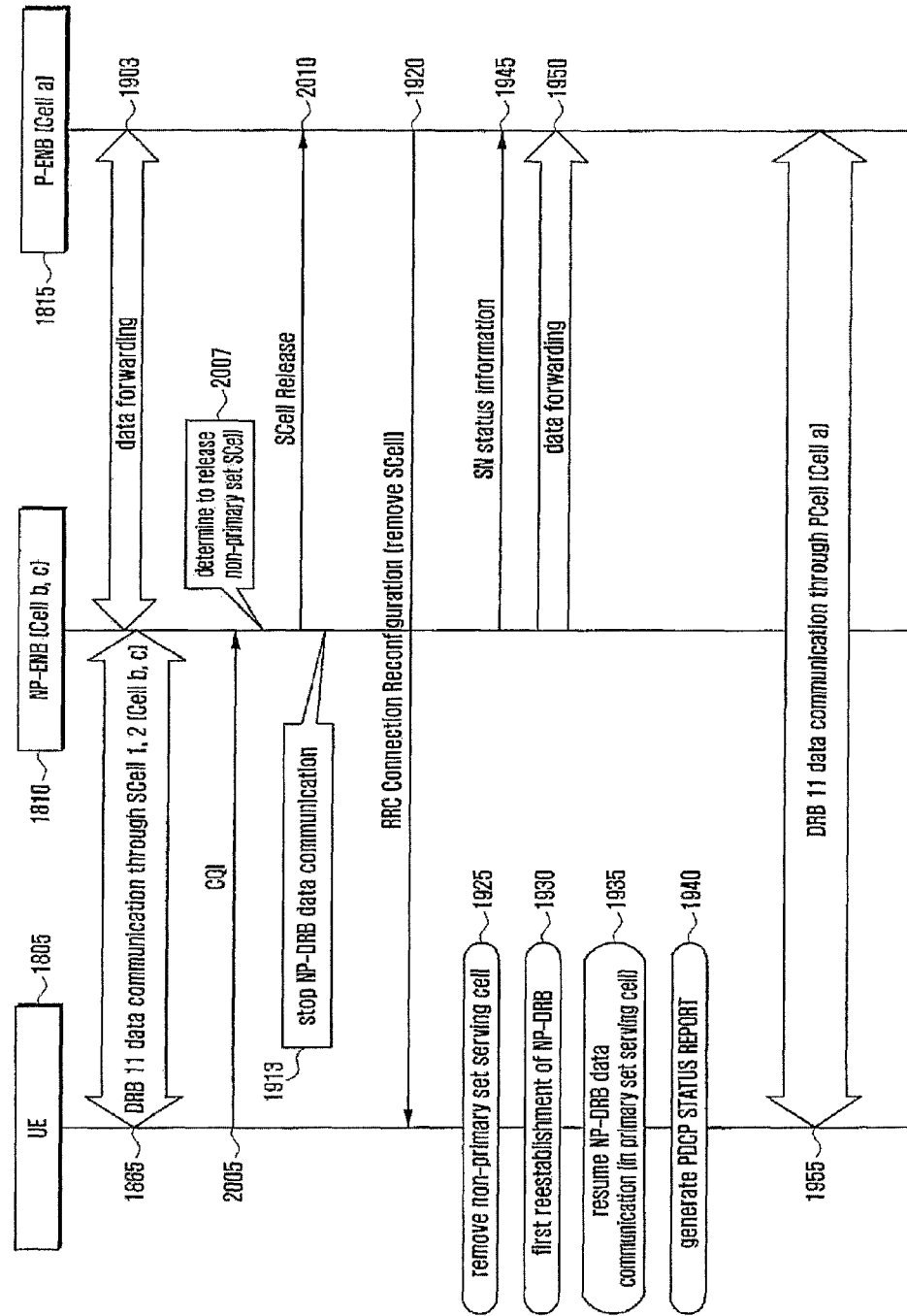
FIG. 20 is a signal flow diagram illustrating a procedure of releasing the SCell and transmitting/receiving data according to another embodiment of the present invention.

FIG. 20 is a signal flow diagram illustrating a procedure of releasing the SCell and transmitting/receiving data according to another embodiment of the present invention.

For example, the NP-ENB may determine whether to release the SCell by referencing the CQI of the non-primary set serving cell.

The UE reports the CQIs of the non-primary set serving cells in the active state currently using the PUCCH transmission resource of the PUCCH SCell at step 2005.

If CQIs of the non-primary set serving cells are maintained in a bad state over a predetermined period or if the CQI of the PUCCH SCell is maintained in a bad state over the predetermined period, the NP-ENB determines to release the non-primary set serving cell at step 2007. The NP-ENB sends the P-ENB a control message instructing to release the SCell. Part or whole of the configured SCells may be released according to the control message. The NP-ENB performs the operation of step 1913. The subsequent steps are identical with those of FIG. 19.

The data communication operation in the respective structures can be summarized as follows.

The first or second PDCP distribution structure
If a control message related to the release of all the SCells, e.g. SCell Release Accept message 1915 or SCell Release message 2010 is transmitted, the np-eNB stops transmitting the NP-DRB DL data and reestablishes the RLC entity. As a consequence, the UL RLC packets stored in the RLC reception entity are reassembled into the PDCP PDUs, which are transferred to the PDCP entity.
If the RRC Connection Reconfiguration control message 1920 is received, the UE stops transmitting the NP-DRB UL data and reestablishes the RLC transmission/reception entity. As a consequence, the DL RLC packets stored in the RLC reception entity are reassembled into the PDCP PDUs, which are transferred to the PDCP entity.
The UE resumes the NP-DRB UL data transmission immediately and transmits the PDCP STATUS REPORT through the primary set serving cell.
The NP-ENB sends the P-ENB an SN Status information at step 1945. The SN status information includes the information on the DL PDCP SDUs stored in the PDCP Tx buffer and the UL PDCP SDUs stored in the Rx buffer.
The NP-ENB forwards to the P-ENB the DL PDCP SDUs through the GTP tunnel established for the DL data forwarding and the UL PDCP SDUs through the GTP tunnel established for the UL data forwarding at step 1950.
The P-ENB sends the UE a PDCP STATUS REPORT. The PDCP STATUS REPORT is generated by referencing the UL PDCP SDUs stored in the UL PDCP Rx buffer or the SN status information.
The UE and the P-ENB resume the NP-DRB DL data communication using the transmission resource of the primary set serving cell.
The first RLC distribution structure
If a control message related to the release of all the SCells, e.g. SCell Release Accept message 1915 or the SCell Release message 2010, is transmitted, the NP-ENB stops transmitting the NP-DRB DL data and reestablishes the RLC entity. As a consequence, the UL RLC packets stored in the RLC Rx entity are reassembled into the RLC SDUs, which are transferred to the PDCP entity of the P-ENB.
If the RRC Connection Reconfiguration control message is received at step 1920, the UE stops transmitting the NP-DRB UL data and reestablishes the RLC Tx/Rx entity. As a consequence, the DL RLC packets stored in the RLC Rx entity are reassembled into the PDCP PDUs, which are transferred to the PDCP entity.
The UE resumes the NP-DRB UL data transmission immediately and transmits a PDCP STATUS REPORT through the primary set serving cell.
The NP-ENB sends the P-ENB the SN status information at step 1945. The SN status information includes the information on the DL PDCP SDUs stored in the PDCP Tx buffer and the UL PDCP SDUs stored in the Rx buffer.
The NP-ENB forwards the DL RLC SDUs to the P-ENB through the GTP tunnel established for DL data forwarding and the UL RLC PDUs through the GTP tunnel established for UL data forwarding at step 1950.
The P-ENB sends the UE a PDCP STATUS REPORT. The PDCP STATUS REPORT is generated by referencing the UL PDCP SDUs stored in the UL PDCP Rx buffer or the SN status information.
The UE and the P-ENB resume the NP-DRB DL data communication using the primary set serving cell transmission resource.
The second RLC distribution structure
If a control message related to the release of all the SCells, e.g. SCell Release Accept message 1915 or the SCell Release message 2010, is transmitted, the NP-ENB stops transmitting the NP-DRB DL data and reestablishes the RLC entity. As a consequence, the UL RLC packets stored in the RLC Rx entity are reassembled into the RLC SDUs, which are transferred to the PDCP entity of the P-ENB.

Although the RRC Connection Reconfiguration control message is received at step 1920, the UE continues the NP-DRB UL data transmission. The UE reestablishes the Rx entity while maintaining the RLC Tx entity. As a consequence, the DL RLC packets stored in the RLC Rx entity are reassembled into PDCP PDUs, which are transferred to the PDCP entity.

The NP-ENB sends the P-ENB an SN status information at step 1945. The SN status information includes the information on the DL PDCP SDUs stored in the PDCP Tx buffer, i.e. DL COUNT.

The NP-ENB forwards the DL RLC SDUs to the P-ENB through the GTP tunnel established for DL data forwarding at step 1950.

The UE and the P-ENB resume the NP-DRB DL data communication using the transmission resource of the primary set serving cell.

The first or second MAC distribution structure

If a control message related to the release of all the SCells, e.g. SCell Release Accept message 1915 or the SCell Release message 2010, is transmitted, the NP-ENB releases the logical channel of the NP-DRB.

The P-ENB continues the DL data transmission of NP-LCH without pause in the SCell add/release procedure.

The UE continues UL data transmission of the NP-LCH without paus in the SCell add/release procedure.

The SN status report message and the PDCP STATUS REPORT are not used.

Figure 21:
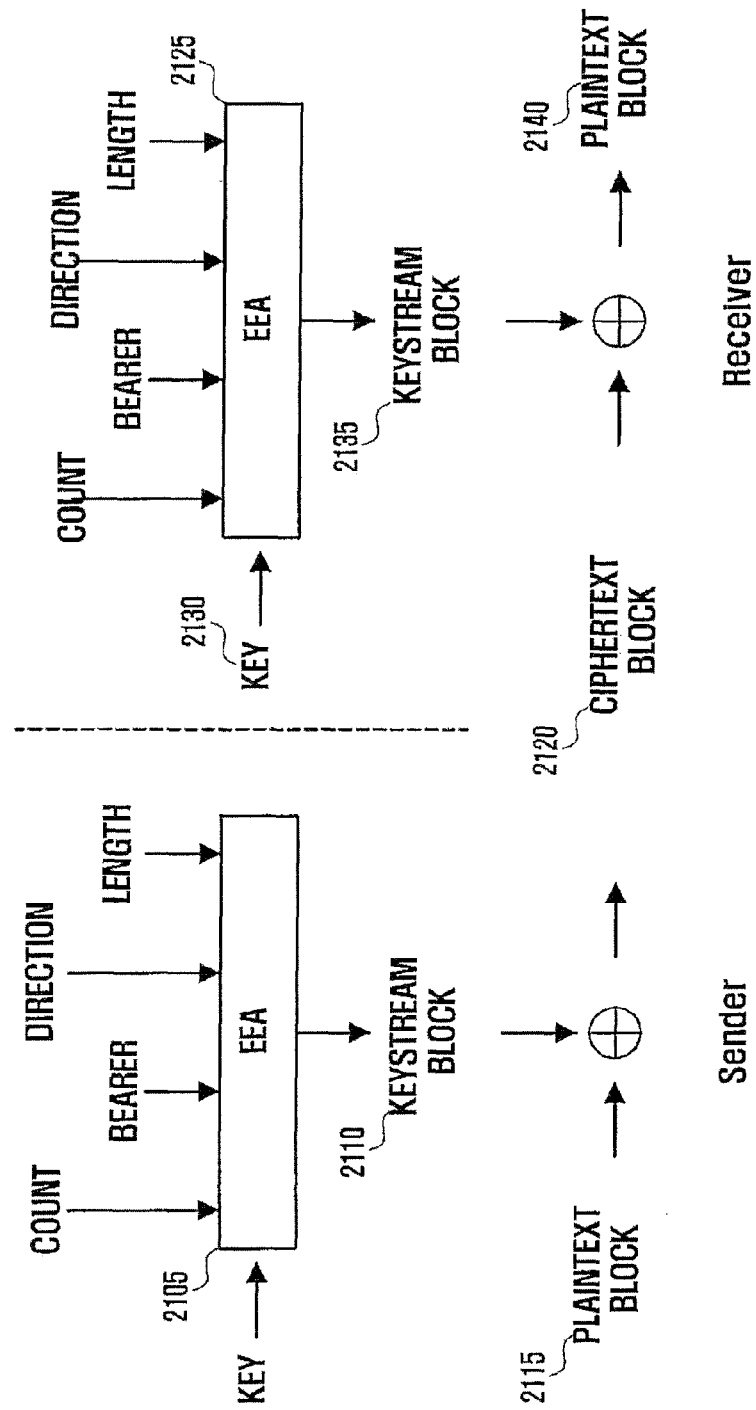
FIG. 21 is a diagram illustrating a ciphering/deciphering procedure according to an embodiment of the present invention.

FIG. 21 is a diagram illustrating a ciphering/deciphering procedure according to an embodiment of the present invention.

In the first PDCP and second distribution structures, the NP-ENB performs ciphering/deciphering on the NP-DRB data. In the ciphering/deciphering procedure, the PDCP Tx entity enters the following inputs to a ciphering engine 2105 in which the EPS Encryption Algorithm (EEA) is installed to generate the keystream block 2110 having the same size as the plain text 2115 to be ciphered.

COUNT denotes a 32-bit integer obtained by concatenating HFN and PDCP SN. It is initialized to 0 and increments by 1 for every PDCP SDU. BEARER relates to DRB id and acquired by subtracting 1 from the id of the DRB related to the PDCP SDU. DIRECTION is a 1-bit information which is determined depending on whether the data is of DL or UL. LENGTH denotes the length of the required keystream lock. KEY 2130 denotes a ciphering key derived from the keNB by means of a predetermined algorithm and expressed as $K_{UPenc}$.

By performing a predetermined operation, e.g. exclusive OR operation, on the keystream block 2110 and the PDCP SDU 2115, the ciphered text 2120 is generated. The PDCP Rx entity performs a predetermined operation in a ciphering engine 2125 on the ciphered text (payload of PDCP PDU) and the keystream block 2135 generated with the same process and inputs to recover the original plain text 2140.

In the PDCP distribution structure, the NP-ENB ciphers the DL PDCP SDU and decipher the UL PDCP SDU, and the NP-ENB has the KEY too. If the NP-ENB and the P-ENB manage the KEY independently, this increases the complexity of the UE and thus, in order to solve this problem, the P-ENB provides the NP-ENB the information for use in generating KEY and thus the NP-ENB generates KEY using this information in the present invention.

In more detail, the P-ENB generates the KEY using the keNB, a kind of root key. The UE and the eNB share the KeNB through the call setup procedure or handover procedure so as to generate the KEY based on the KeNB and perform ciphering/deciphering on the DRB data.

If a certain DRB, e.g. DRB 11, is offloaded to the NP-ENB at certain timing, the P-ENB provides the NP-ENB with the information necessary for ciphering/deciphering. Examples of this information are as follows.

KeNB: Root key used for generating KEY in use currently

BEARER: Value obtained by decrementing DRB id of NP-DRB by 1. In above example, this is 10. It is also possible to notify of the DRB id to be allocated to the NP-DRB instead of BEARER.

COUNT: COUNT value used currently for NP-DRB. Both the DL COUNT and UL COUNT are signaled.

The KeNB and BEARER (or DRB id) may be transmitted to the NP-ENB through the SCELL Add Request control message 1845.

The COUNT may be transmitted to the NP-ENB through the SN status information control message 1870.

The NP-ENB generates the KEY by inputting the KeNB to a predetermined key generation function (Key Delivery Function (KDF)). The KEY is used to cipher the NP-DRB DL data and decipher the NP-DRB UL data.

The NP-ENB performs ciphering/deciphering on the NP-DRB data using the BEARER value carried in the SCELL Add Request control message other than the DRB id of the NP-DRB.

The NP-ENB determines the COUNT to be applied to the NP-DRB DL PDCP SDU using the DL COUNT provided in the SN status information control message. The COUNT is incremented by 1 whenever a PDCP SDU is transmitted or ciphered.

The NP-ENB determines the COUNT to be applied to the NP-DRB UL PDCP SDU using the UL COUNT provided in the SN status information control message.

If it is determined to release the non-primary set serving cell and moves the NP-DRB from the NP-ENB to the P-ENB at certain timing, the NP-ENB sends the NP-eNB an SN status control message 1945. The SN status control message includes the DL COUNT and UL COUNT. The NP-ENB sets the DL count to the COUNT to be applied to the first DL PDCP SDU to which any PDCP SN is not applied yet. The NP-ENB sets the UL COUNT to the COUNT to be applied to the first missing PDCP SDU.

In the LTE mobile communication system, the mobility of the UE in the connected state is controlled by the eNB. As far as the eNB does not command handover, the UE performs the normal operation, e.g. PDCP monitoring and PUCCH transmission. If the serving radio link state goes bad such that the normal communication is impossible before transmitting handover command to the UE due to an unexpected error, the UE falls into the deadlock state. In order to avoid this problem, the UE monitors the channel condition of the current serving cell and, if a predetermined condition is fulfilled, controls its mobility by itself. This is referred to as radio link monitoring.

The UE performs the radio link monitoring to the primary set and the non-primary set independently. The UE monitors the channel conditions of predetermined primary and non-primary sets serving cells, e.g. PCell and PUCCH SCell. If the channel conditions which are equal to or less than a predetermined threshold lasts over a predetermined period, the UE determines that a radio link problem is detected.

The radio link problem detection condition is as follows.

<PCell Radio Link Problem Detection Condition>

The out-of-sync indicator for the PCell occurs as many as first N310 times successively. The out-of-sync indicator for the PCell occurs when the PDCCH error rate calculated based on the reception quality of a predetermined channel or signal (e.g. Cell Reference Signal) of the PCell is equal to or greater than a predetermined threshold, e.g. 10%, lasts over a predetermined period, e.g. 200 ms.

The UE acquires the first N310 from the SIB2 of the PCell.

<PUCCH SCell Radio Link Problem Detection Condition>

The out-of-sync indicator for the PUCCH SCell occurs as man as second N310 times successively. The out-of-sync indicator for the PUCCH SCell occurs when the PDCCH error rage calculated based on the reception quality of a predetermined channel or signal (e.g. Cell Reference Signal) of the PUCCH SCell is equal to or greater than a predetermined threshold, e.g. 10%, lasts over a predetermined period, e.g. 200 ms.

The UE acquires and uses the second N310 as follows.

<Second N-310 Acquisition/Utilization Method>

A certain second N310 is transmitted to the UE in the RRC Connection Reconfiguration message 1920 for configuring the PUCCH SCell.

The UE uses the second N310 to a predetermined time point. The predetermined time point is the time when the UE receives the system information of the PUCCH SCell and acquires the second N310 from the system information of the PUCCH SCell.

The UE uses the second N310 from a predetermined time point.

The UE may use a PUCCH SCell radio link problem detection condition 2.

<PUCCH SCell Radio Link Problem Detection Condition>

If the pathloss calculated based on a predetermined channel or signal (e.g. Cell Reference Signal) of the PUCCH SCell and the transmission power of the signal is equal to or greater than a predetermined threshold, it is determined that the radio link problem is detected. The UE may apply the layer 3 filtering (TS 36.331 5.5.3.2) to the pathloss calculation.

The radio link problem detection threshold value may be transmitted to the UE in the RRC Connection Reconfiguration message 1920 for configuring the PUCCH SCell.

Figure 22:
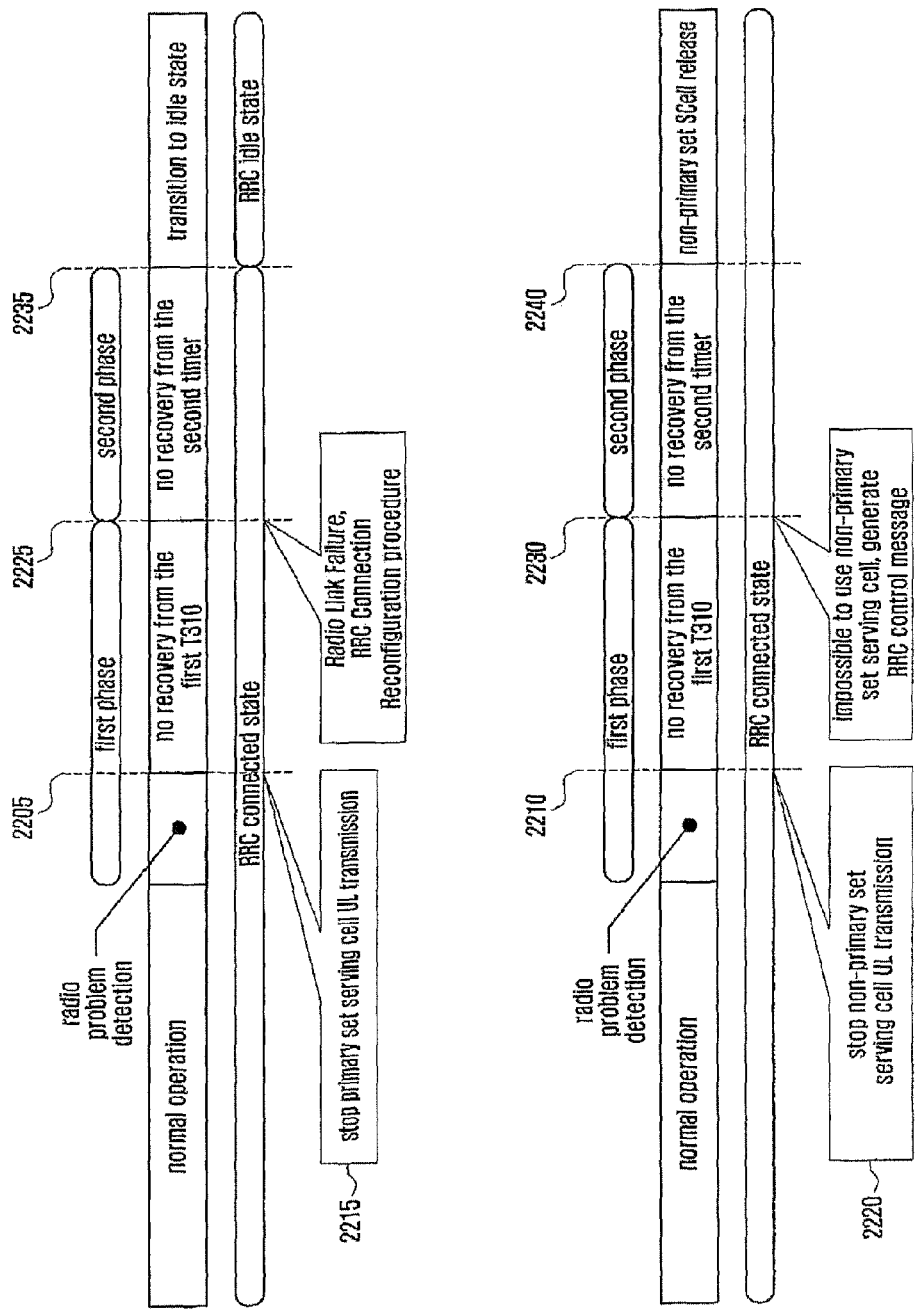
FIG. 22 is a diagram illustrating the radio link monitoring procedure according to an embodiment of the present invention.

FIG. 22 is a diagram illustrating the radio link monitoring procedure according to an embodiment of the present invention.

If a radio link problem is detected as denoted by reference numbers 2205 and 2210, the UE determines whether the serving cell in which the radio link problem has been detected is the PCell or the PUCCH SCell to operate as follows.

If the serving cell in which the radio link problem has been detected is the PCell, the UE stops the UL transmission in the primary set serving cell 2215 and starts the first T310 timer. The first T310 timer is broadcast in the SIB2 of the PCell.

If the serving cell in which the radio link problem has been detected is the PUCCH SCell, the UE stops the UL transmission in the non-primary set serving cell 2220, e.g. PUCCH transmission in the PUCCH SCell and the SRS transmission in the non-primary set serving cell, and deactivates the non-primary set serving cells. At this time, the UE keeps running sCellDeactviationTimer of the serving cells deactivated. The UE starts the second T310 timer, and the second T310 timer is acquired and used as follows.

<Second T310 Acquisition/Utilization Method>

The second T310 is transmitted to the UE in the RRC Connection Reconfiguration message 1920 for configuring the PUCCH SCell.

The UE uses the second T310 to a predetermined time point. The predetermined time point is the time when the UE receives the system information of the PUCCH SCell and acquires the second T310 from the system information of the PUCCH SCell.

The UE uses the second T310 to a predetermined time point.

While the T310 is running, the UE monitors to determine whether the related serving is recovered.

<PCell Radio Link Recovery Condition>

The in-sync indicator for the PCell occurs as many as first N311 times successively. The in-sync indicator for the PCell occurs when the PDCCH error rate calculated based on the reception quality of a predetermined channel or signal (e.g. Cell Reference Signal) of the PCell is equal to or greater than a predetermined threshold, e.g. 5%, lasts over a predetermined period, e.g. 100 ms.

The UE acquires the first N311 from the SIB2 of the PCell

<PUCCH SCell Radio Link Recovery Condition>

The in-sync indicator for the PUCCH SCell occurs as many as second N311 times successively. The in-sync indicator for the PUCCH SCell occurs when the PDCCH error rate calculated based on the reception quality of a predetermined channel or signal (e.g. Cell Reference Signal) of the PUCCH SCell is equal to or greater than a predetermined threshold, e.g. 5%, lasts over a predetermined period, e.g. 100 ms.

The second N311 acquisition and utilization method is identical with the second N310 acquisition and utilization method.

If the radio link recovery condition is fulfilled, the UE determines whether the cell in which the radio link recovery is detected is the PCell or the PUCCH cell to operate as follows.

If the serving cell in which the radio link recovery is detected is the PCell, the UE resumes UL transmission of the primary set serving cell and maintains the current RRC connection. If the serving cell in which the radio link recovery is detected is the PUCCH SCell, the UE resumes the UL transmission of the non-primary set serving cell, e.g. PUCCH transmission of PUCCH SCell and SRS transmission of the non-primary set serving cell and activates the SCells for of which sCellDeactivationTimer is running yet among the non-primary set SCells in the active state before starting the T310.

If the serving cell is not recovered until the T310 expires at time 2225 and 2230, the UE determines whether the serving cell of which T310 has expired is the PCell or the PUCCH SCell to operate as follows. If the serving cell of which T310 has expired is the PCell, the UE declares radio link failure and starts the first T311. The UE stops UL transmission of the non-primary set serving cell too and starts the RRC connection reestablishment procedure. The RRC connection reestablishment procedure is of searching for the cell in which the UE resumes communication and exchanges predetermined RRC control messages with the cell to resume the RRC connection as specified in TS 36.331 5.3.7. The first T311 timer is broadcast in the SIB2 of the PCell. If the serving cell of which T310 has expired is the PUCCH SCell, the UE determines that the non-primary set serving cells cannot be used anymore and generates a predetermined RRC control message. The RRC control message may include the measurement result for the PUCCH SCell or the information notifying that radio link problem has occurred in the PUCCH SCell.

If the serving cell is recovered before expiry of the T311, the UE stops T311 and determines whether the recovered serving cell is the PCell or the PUCCH SCell to operate as follows. If the serving cell recovered before expiry of the T311 is the PCell, i.e. if any cell for resuming communication is found before the expiry of the T311, the UE initiates RRC Connection Reestablishment procedure with the sell. If the serving cell recovered before expiry of the T311 is the PUCCH SCell, the UE sends the eNB an RRC control message including the information indicating that the PUCCH SCell has been recovered through the primary set serving cell.

If the T311 expires at the time 2235 and 2240, the UE determines whether the serving cell of which T311 has expired is the PCell or the PUCCH SCell to operate as follows. If the serving cell of which T311 has expired is the PCell, the UE transitions to the idle state and notifies the upper layer that the RRC connection has been released due to radio channel problem. If the serving cell of which T311 has expired is the PUCCH SCell, the UE releases the corresponding non-primary set serving cells and sends the eNB an RRC control message including the information indicating that the non-primary set serving cells have been released through a primary set serving cell.

A modified PUCCH SCell radio link monitoring operation may be taken.

<Modified PUCCH SCell Radio Link Monitoring Operation>

If radio link problem is detected, the UE stops UL transmission but monitors PDCCH in the non-primary set serving cell. If PDSCH is scheduled, the UE receives and processes PDSCH. However, the UE does not transmit HARQ feedback. If the PUCCH SCell is not recovered until the T310 expires, the UE start T311 and deactivates the non-primary set serving cells. The UE monitors to detect when the PUCCH SCell is recovered while the T311 is running. If there is no serving cell recovered among the non-primary set serving cells until the T311 expires, the UE releases the non-primary set serving cells. If there is at least one cell recovered before expiry of the T311, the UE stops the T311 and transmits an RRC control message to report the recovery.

The radio link failure may be declared due to various events as well as expiry of T310. The UE declares radio link failure differently depending on whether any non-primary set serving cell is configured or not.

Figure 23:
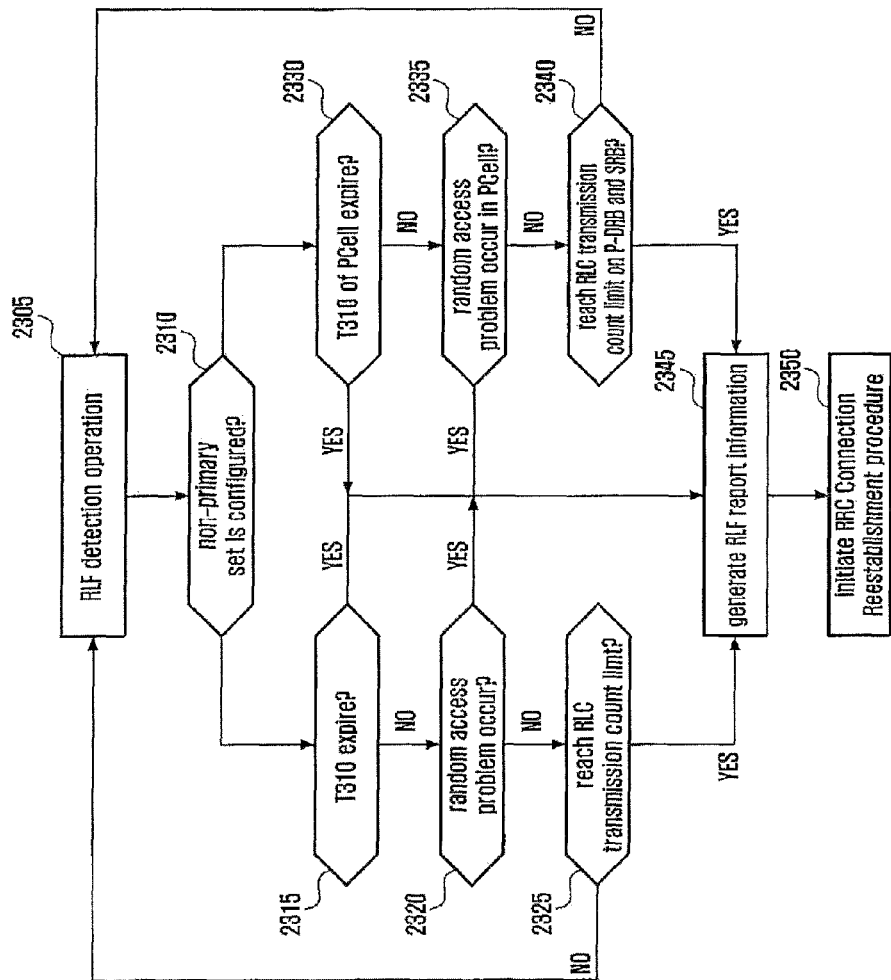
FIG. 23 is a flowchart illustrating an RLF detection procedure according to an embodiment of the present invention.

FIG. 23 is a flowchart illustrating an RLF detection procedure according to an embodiment of the present invention.

Referring to FIG. 23, the UE starts RLF detection operation at step 2305. The RLF detection operation starts upon the RRC connection is configured to the UE and continues until the RRC connection is released.

The UE determines whether any non-primary set serving cell is configured currently at step 2310. If so, the procedure goes to step 2330 and, otherwise, step 2315.

At step 2315, the UE determines whether the T310 has expired currently and, if so, the procedure goes to step 2345 and, otherwise, step 2320. At step 2320, the UE determines whether any random access problem has occurred and, if so, the procedure goes to step 2345 and, otherwise, step 2325.

As described above, if the random access fails in the PCell (in detail, if the random access fails in spite of transmitting the preamble PreambleTransMax times in the PCell), the UE determines that the RLF has occurred. At step 2325, the UE determines whether there is any bearer of which RLC maximum transmission (or retransmission) count has reached the limit among all the radio bearers configured currently. If there is any bearer of which RLC maximum transmission count has reached the limit, this means that a significant error has occurred on in UL and thus the procedure goes to step 2345. If there is no bearer of which RLC maximum transmission count has reached the limit, the UE returns the procedure to step 2305. In summary, if at least one of the above three conditions is fulfilled, the UE determines that the RLF has occurred and thus the procedure goes to step 2345 and, otherwise none of the three conditions is fulfilled, step 2305 to continue the RLF detection operation.

If any non-primary set is configured at step 2310, the procedure goes to step 2330. At step 2330, the UE determines whether the T310 of the PCell has expired and, if so, the procedure goes to step 2345 and, otherwise, step 2335. The UE does not consider the expiry of the T310 of a cell other than PCell, e.g. PUCCH SCell. At step 2335, the UE determines whether any problem has occurred in the random access in the PCell. If so, the procedure goes to step 2345 and, otherwise, step 2340. At step 2340, the UE determines whether there is any bearer of which RLC maximum transmission (or retransmission) count has reached the limit among the P-DRB and SRB (Signaling Radio Bearer; radio bearer carrying RRC messages). If so, the procedure goes to step 2345 and, otherwise, step 2305 to continue the RLF monitoring operation. Although there is any bearer of which RLC maximum transmission (retransmission) count has reached the limit among the NP-DRBs, this is not determined that any condition of step 2340 has been fulfilled. In summary, if at least one of the above three conditions is fulfilled, the procedure goes to step 2345 and, otherwise none of the three conditions is fulfilled, step 2305 to continue the RLF monitoring operation.

Whether the RLC maximum transmission (or retransmission) count has reached the limit may be considered only when any non-primary set serving cell is not configured. That is, when the condition is fulfilled at step 2335, the UE may skip step 2340 and return the procedure to step 2305 immediately.

At step 2345, the UE generates the information to be included in the RLF report. The RLF report is an RRC control message which includes the information on the situation when the RFL has occurred and which is transmitted from the UE to the eNB after the RLC connection is reconfigured in order to check the network problem afterward. The RLF report includes the information as follows: identifier of Registered PLMN (RPLMN) at the time when the RLF has occurred, DL channel measurement result for serving cell (or PCell) at the time when the RLF has occurred or the last serving cell (or PCell) at the time when the RLF has occurred, DL channel measurement result for the neighboring cell at the time when the RLF has occurred, and GPS coordinates information at the time when the RLF has occurred.

At step 2350, the UE starts the RRC Connection Reestablishment procedure.

In the PDCP distribution structure or the RLC distribution structure, the UE performs set-specific logical channel prioritization or Component Carrier-specific logical channel prioritization. The set-specific logical channel prioritization is to determining the data to be transmitted depending on the serving cell through which the UL grant has been received.

Figure 24:
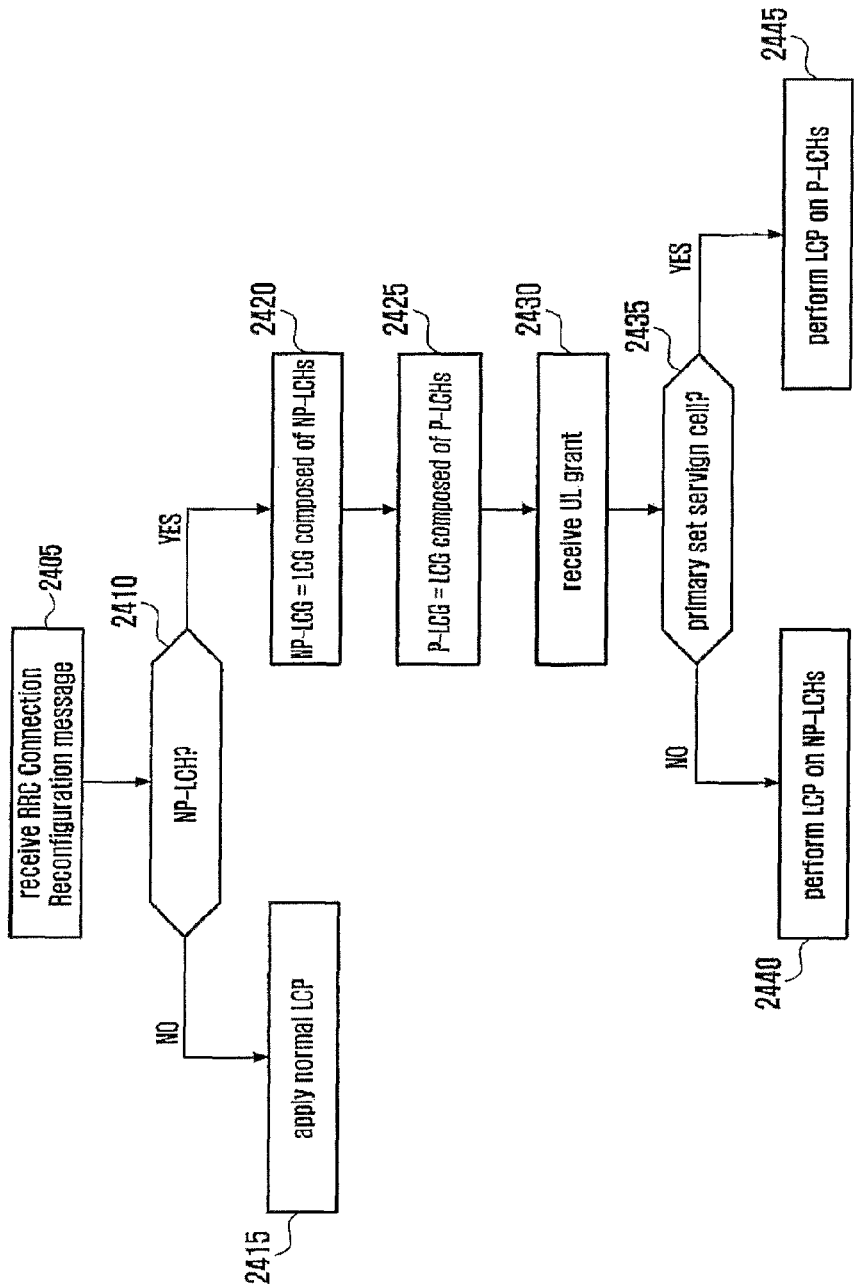
FIG. 24 is a flowchart illustrating the LCP procedure according to an embodiment of the present invention.

FIG. 24 is a flowchart illustrating the LCP procedure according to an embodiment of the present invention.

The UE receives an RRC Connection Reconfiguration message at step 2405. The RRC Connection Reconfiguration message may be of configuring non-primary set serving cells. The UE determines whether there is any NP-LCH as a result of the RRC connection reconfiguration at step 2410 and, if so, the procedure goes to step 2420 and, otherwise, step 2415. As a result of the RRC Connection Reconfiguration, the NP-LCH may be changed for the P-LCH or the P-LCH to the NP-LCH; and the whether the logical channel is the P-LCH or NP-LCH is indicated by a b-bit indicator in the case of DRB, and the P-LCH is used always in the case of SRB. At step 2415, the UE determines the data to be transmitted with eh application of the normal LCP when a UL grant is received afterward. The normal LCP is of determining the data to be transmitted in consideration of the priority and amount of the transmission data without consideration of the serving cell through which the UL grant has been received or to which the UL grant has been addressed.

At step 2420, the UE determines the NP-LCG. The LCG is a unit of the buffer status report and a set of one or more LCHs. The eNB sorts the LCHs having similar priorities into an LCG and signals the LCHs and the LCG including the LCHs to the UE using a predetermined control message. The UE determines the LCG including only the NP-LCHs as the NP-LCH among the LCGs.

The UE determines the P-LCH at step 2425. The P-LCH is the LCG made up of only the P-LCHs.

If a UL grant is received through a certain serving cell at step 2430, the procedure goes to step 2435. At step 2435, the UE determines whether the serving cell through which the UL grant has been received is a primary set serving cell. Or, the UE may determine whether the UL grant is associated with a primary set serving cell. If the UL grant is associated with a primary set serving cell, the UE performs primary set LCP on the P-LCH at step 2445. If the UL grant is not associated with a primary set serving cell (i.e. associated with a non-primary set serving cell), the UE performs non-primary set LCP on the NP-LCH at step 2440.

<Primary Set LCP>

The UE determines the data to be transmitted in consideration of the priority among the data to be transmitted through the primary set serving cells. The priority is as follows.

1. Common Control Channel Service Data Unit (CCCH SDU) such as C-RNTI MAC CE or RRC Connection Request message or RRC Connection Reestablishment Request message
2. Regular BSR or periodic BSR including buffer status of P-LCG (or BSR which is not padding BSR)
3. Power Headroom Report (PHR) for primary set serving cells
4. Data transmittable through P-LCH with the exception of CCCH If there is data corresponding to the case of 1/2/3, the UE determines whether to transmit the data as follows.

The UE compares the amount of the allocated transmission resource in the order from case 1 or transmittable data amount with the amount of the data to be transmitted. If there is any data to be transmitted and if the amount of the data to be transmitted is greater than the transmittable data amount, the UE checks the next priority and, otherwise, allocates the transmission resource fit for the data to be transmitted and updates the transmittable data amount.

If there is transmission data remained after the resource allocation for the case 1/2/3, the UE allocates the remained transmission resource for the data corresponding to case 4 according to the priority until the transmission resource exhausts.

<Non-Primary Set LCP>

The UE determines the data to be transmitted among the data to be transmitted through the primary set serving cells in consideration of priority. The priority is as follows.

1. Regular BSR or periodic BSR including buffer status of NP-LCG (or BSR which is not padding BSR)
2. Power Headroom Report (PHR) for non-primary set serving cells
3. Data transmittable through NP-LCH If the data of case 1/2 exist, the UE determines whether to transmit the data as follows.

The UE compares the amount of the allocated transmission resource in the order from case 1 or transmittable data amount with the amount of the data to be transmitted. If there is any data to be transmitted and if the amount of the data to be transmitted is greater than the transmittable data amount, the UE checks the next priority and, otherwise, allocates the transmission resource fit for the data to be transmitted and updates the transmittable data amount.

If there is transmission data remained after the resource allocation for the case 1/2, the UE allocates the remained transmission resource for the data corresponding to case 3 according to the priority until the transmission resource exhausts.

The PHR is reported for the eNB to check the UL transmission power status of the UE in scheduling the UL transmission in a certain serving cell. The PHR includes the information on the maximum transmission power of the UE allowed for the serving cell and difference between the maximum allowed power and the current transmission power (power headroom). The primary set serving cells are scheduled by the P-ENB, and the non-primary set serving cells are scheduled by the NP-ENB. Accordingly, the PHRs for the primary and non-primary sets serving cells have to be transmitted to the p-eNB and the NP-ENB respectively. In the present invention, if PHR is triggered at a certain time point, the UE operates in consideration of whether the PHR is the PHR for the primary set serving cells (P-PHR) or the PHR for the non-primary set serving cells (NP-PHR).

Figure 25:
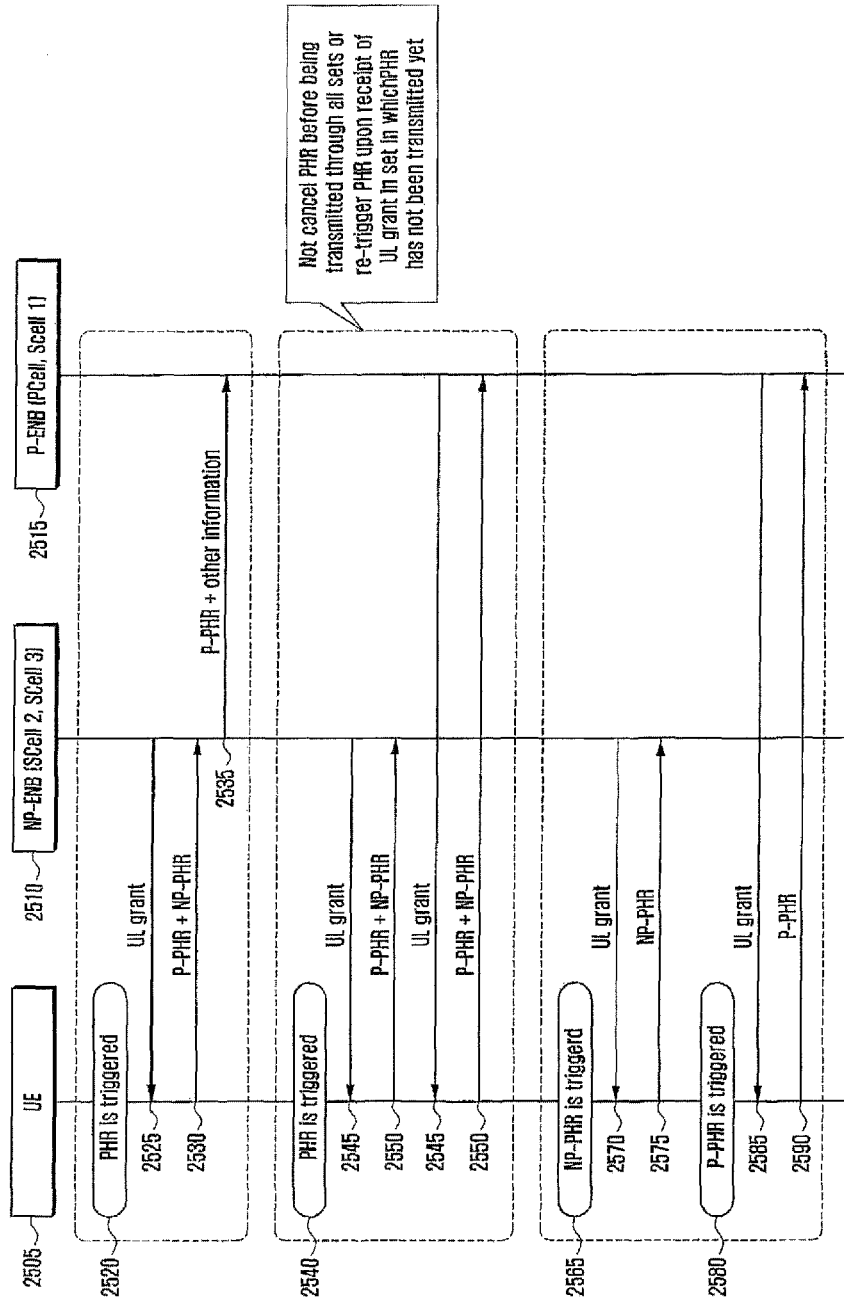
FIG. 25 is a signal flow diagram illustrating the PHR trigger and transmission procedure according to an embodiment of the present invention.

FIG. 25 is a signal flow diagram illustrating the PHR trigger and transmission procedure according to an embodiment of the present invention.

Referring to FIG. 25, if PHR is triggered at step 2520, the UE 2505 generates and transmits the PHR at step 2530 at the first transmission time, i.e. upon receipt of UL grant of allocating the transmission resource amble enough to transmit the PHR from the NP-ENB 2510 or the P-eNB 2515 at step 2525. The UE transmits both the primary set serving cell PHR (P-PHR) and the non-primary set serving cell PHR (NP-PHR) and, if the PHR is received, the eNB transmits the PHR necessary for the other eNB, e.g. P-PHR, to the eNB, e.g. P-ENB 2515, at step 2535. At this time, the NP-ENB 2510 may send the counterpart eNB the information on the time related to the PHR, e.g. the SFN of the subframe in which the P-PHR has been received successfully and the subframe number or the SFN of the subframe at which the first transmission of the MAC PDU including the P-PHR has started and the subframe number. Upon receipt of the PHR information, the P-ENB 2515 checks the channel condition of the UE using the received information. If the PHR is transmitted to the P-ENB 2515 through the primary set serving cell, the P-ENB 2515 sends the NP-ENB 2510 the NP-PHR along with the time information.

In another scheme, if the PHR is triggered, the UE generates and transmits the PHR through the primary set serving cell one time and then transmits the PHR one more time through the non-primary set serving cell. If the PHR is triggered, the UE waits until a UL grant for allocating the transmission resource amble enough to transmit the PHR. If the UL grant fulfilling the above condition is received at step 2545, the UE generates the PHR including both the P-PHR and the NP-PHR and transmits the PHR at step 2550. If no non-primary set serving cell is configured, the UE transmits the PHR and cancels the triggered PHR. If any non-primary set serving cell is configured, the UE transmits the PHR but does not cancel the triggered PHR immediately; and only when the PHR has been transmitted through both the primary and non-primary sets serving cells during a predetermined period, the UE cancels the PHR. If the PHR is cancelled but not transmitted through both the two types of sets and if the UL grant is received through the set through which the PHR has not been transmitted, the PHR is triggered again. Since the PHR has been transmitted to only the NP-ENB 2510, or through only the non-primary set serving cell, the UE waits without cancelling the PHR and, if the UL grant allocating transmission resource ample enough to transmit the PHR is received from the p-eNB 2515 at step 2555, the UE cancels the PHR after transmitting the P-PHR and NP-PHR to the primary set serving cell.

In another scheme, the UE manages the PHR trigger per set and, after transmitting the PHR to the serving cell of the set in which the PHR has been triggered, cancel the PHR.

For example, if the NP-PHR is triggered at step 2565 and if a UL grant allocating transmission resource ample enough to transmit the NP-PHR is received from the non-primary set serving cell at step 2570, the UE generates and transmits the NP-PHR at step 2575 and cancels the NP-PHR. Afterward, if the P-PHR is triggered at a certain time point at step 2580 and if a UL grant allocating transmission resource amble enough to transmit the P-PHR is received from the primary set serving cell at step 2585, the UE generates and transmits the P-PHR at step 2590 and cancels the P-PHR.

If PHR is triggered at step 2520 or 2540, this means that one of the following conditions is fulfilled.

<PHR Trigger Condition>
The displacement of the pathloss of the serving cell fulfilling the following conditions is equal to or greater than a predetermined threshold value.
Serving cell in active state
Serving cell configured as pathloss reference cell
Serving cell in which the UE has been allocated transmission resource for UL transmission.
PHR is triggered when a predetermined timer expires. The timer restarts whenever the PHR is transmitted.
The serving cell configured with UL is activated
If a certain cell A is configured as the pathloss reference cell of another cell B, this means that the pathloss of the cell A is referenced to set the UL transmission power of the cell B. The eNB may configure the pathloss relationship using a predetermined control message.

If the NP=PHR is triggered at step 2565, this means that one of the following conditions is fulfilled.
<NP-PHR Trigger Condition>
The displacement of the pathloss of the serving cell fulfilling the following conditions is equal to or greater than a predetermined threshold value. The predetermined threshold value is configured by the RRC Connection Reconfiguration message 1855.
Non-primary set serving cell in active state
Serving cell configured as pathloss reference cell
Serving cell in which the UE has been allocated transmission resource for UL transmission.
PHR is triggered when a predetermined timer expires. The timer restarts whenever the NP-PHR is transmitted. The timer is configured by the RRC Connection Reconfiguration message 1855.
The non-primary set serving cell configured with UL is activated If P-PHR is triggered at step 2580, this means that one of the following conditions is fulfilled.
<P-PHR Trigger Condition>
The displacement of the pathloss of the serving cell fulfilling the following conditions is equal to or greater than a predetermined threshold value.
Primary set serving cell in active state
Serving cell configured as pathloss reference cell
Serving cell in which the UE has been allocated UL transmission resource
PHR is triggered when a predetermined timer expires. The timer restarts whenever the P-PHR is transmitted. The timer is configured by the RRC Connection Reconfiguration message 1855.
The primary set serving cell configured with UL is activated The PHR is a kind of a MAC CE and consists of a MAC sub-header and the payload. The MAC sub-header includes a Logical Channel ID (LCID) indicating the type of the MAC CE, and the payload includes Power Headroom (PH) information and maxim transmit power (PCMAX) information.

The PHR is formed in one of a normal PHR format and an extended PHR format. The normal PHR format contains the PH information for one serving cell with 1-byte payload and defined as 11010. The extended PHR format contains PH informations of multiple serving cells and PCMAX information with the payload variable in length and defined as 11001.

In the present invention, the P-PHR and NP-PHR are discriminated based on the position of the PHR or the serving cell in which the PHR has been transmitted without use of extra LCID.

For example, if one MAC PDU includes two PHR, the first PHR is the P-PHR and the second the N-PHR. If the MAC PDU transmitted through a primary set serving cell includes one PHR, the PHR is the P-PHR. If the MAC PDU transmitted through a non-primary set serving cell, the PHR is the NP-PHR.

The P-PHR may be formed in the normal PHR format or the extended PHR format. Whether the P-PHR is formed in the normal format or the extended format is indicated in the RRC Connection Reconfiguration message 520 related to the primary set serving cell.

The NP-PHR may be formed in the normal PHR format or the extended PHR format. Whether the NP-PHR is formed in the normal format or the extended format is indicated in the RRC Connection Reconfiguration message 635 related to the non-primary set serving cell.

Figure 26:
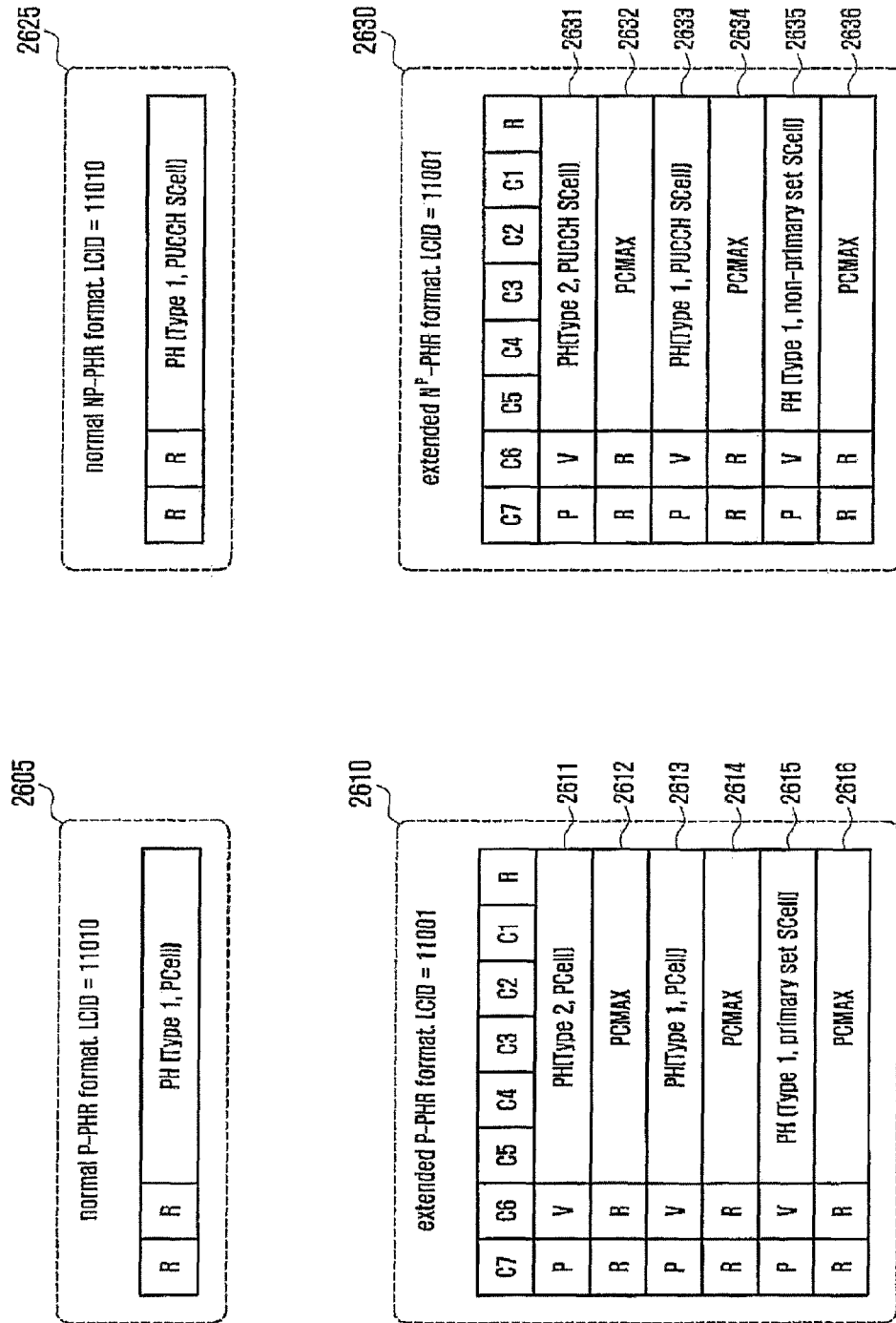
FIG. 26 is a diagram illustrating a PHR format according to an embodiment of the present invention.

FIG. 26 is a diagram illustrating a PHR format according to an embodiment of the present invention.

The normal P-PHR 2605 is defined by the LCID 11010 and contains 6-bit PH information. The 6-bit PH field contains the type 1 PH of PCell. The type 1 PH is a value indicating difference between the PCMAX of a certain serving cell and the PUSCH required transmit power for the corresponding cell and specified in table 6.1.3.6.-1 of TS 36.321.

The normal NP-PHR 2625 is defined by the LCID 11010 and contains 6-bit PH information. The 6-bit PH field contains the type 1 PH of PUCCH SCell. The type 1 PH contains a value indicating difference between the PUSCH required transmit power for the PUCCH SCell and the PCMAX of the PUCCH SCell.

The extended P-PHR 2610 is defined by the LCID 11001 and of which first byte contains a bitmap indicating the primary set SCells for which the PH informations are included. For example, if the C1 bit is set to 1, this means that the PH information for the SCell of which index is 3 is included.

If a predetermined condition is fulfilled, the type 2 PH 2611 of PCell is included. If the simultaneous transmission of PUSCH and PUCCH is configured for primary set, or PCell, this means that the condition is fulfilled. The simultaneous transmission of PUSCH and PUCCH may be possible or not depending on the hardware configuration of the UE. The UE reports its capability according to a command from the eNB, the capability information including the information on whether the simultaneous transmission of PUSCH and PUCCH is supported.

The type 2 PH is a value obtained by subtracting the sum of the PUSCH required transmit power and PUCCH required transmit power from the PCMAX for the PCell or PUCCH SCell.

The PCMAX 2612 is contained if the PUCCH transmission is scheduled in the PCell in the subframe supposed to carry the P-PHR and, otherwise, not contained. The presence/absence of the PCMAX is indicated by a V field associated therewith.

The type 1 PH 2613 of PCell is a field existing always and filled with the value obtained by subtracting the PUCCH transmit power from the PCMAX of the PCell.

The PCMAX 2614 is contained if the PUSCH transmission is scheduled in the PCell in the subframe supposed to carry the P-PHR and, otherwise, not contained.

Afterward, the PHs of the primary set SCells in the active state are contained in the subframe supposed to carry the P-PHR in an ascending order of the SCell index. If there is any PUSCH transmission scheduled in the corresponding SCell, the PCMAX occupies a byte following the byte occupied by the PHs.

The extended NP-PHR 2630 is defined by LCID 11001 and of which first type is contains a bitmap indicating the non-primary set SCells for which the PH informations are included. For example, if the C7 bit is set to 1, this means that the PH information for the SCell of which index is 7 is included.

If a predetermined condition is fulfilled, the type 2 PH 2631 of the PUCCH SCell is included. If the simultaneous transmission of PUSCH and PUCCH is configured for non-primary set, or PUCCH SCell, this means that the condition is fulfilled. The simultaneous transmission of PUSCH and PUCCH may be possible or not depending on the hardware configuration of the UE. The UE reports its capability according to a command from the eNB, the capability information including the information on whether the simultaneous transmission of PUSCH and PUCCH is supported.

The PCMAX 2632 is contained if the PUCCH transmission is scheduled actually in the PCell in the subframe supposed to carry the NP-PHR and, otherwise, not contained. The presence/absence of the PCMAX is indicated by a V field associated therewith.

The type 1 PH 2633 of PUCCH SCell is a field existing always and filled with the value obtained by subtracting the PUSCH transmit power from the PCMAX of the PUCCH SCell.

The PCMAX 2634 is contained if the PUSCH transmission is scheduled actually in the PUSCH SCell in the subframe supposed to carry the NP-PHR and, otherwise, not contained.

Afterward, the PHs of the non-primary set S Cells in the active state are contained in the subframe supposed to carry the NP-PHR in an ascending order of the SCell index. If there is any PUSCH transmission scheduled actually in the corresponding SCell, the PCMAX occupies a byte following the byte occupied by the PHs.

Each of the P-ENB and the NP-ENB cannot check the UL scheduling status of the counterpart eNB. This may cause a problem in that the total transmit power of the UE exceeds the maximum allowed transmit power in the case that the P-ENB and the NP-ENB schedule UL transmission in the same time duration. In order to avoid this problem, the present invention proposes a method for the NP-ENB and the P-ENB to use eNB-specific dedicated time periods and common time period.

Figure 27:
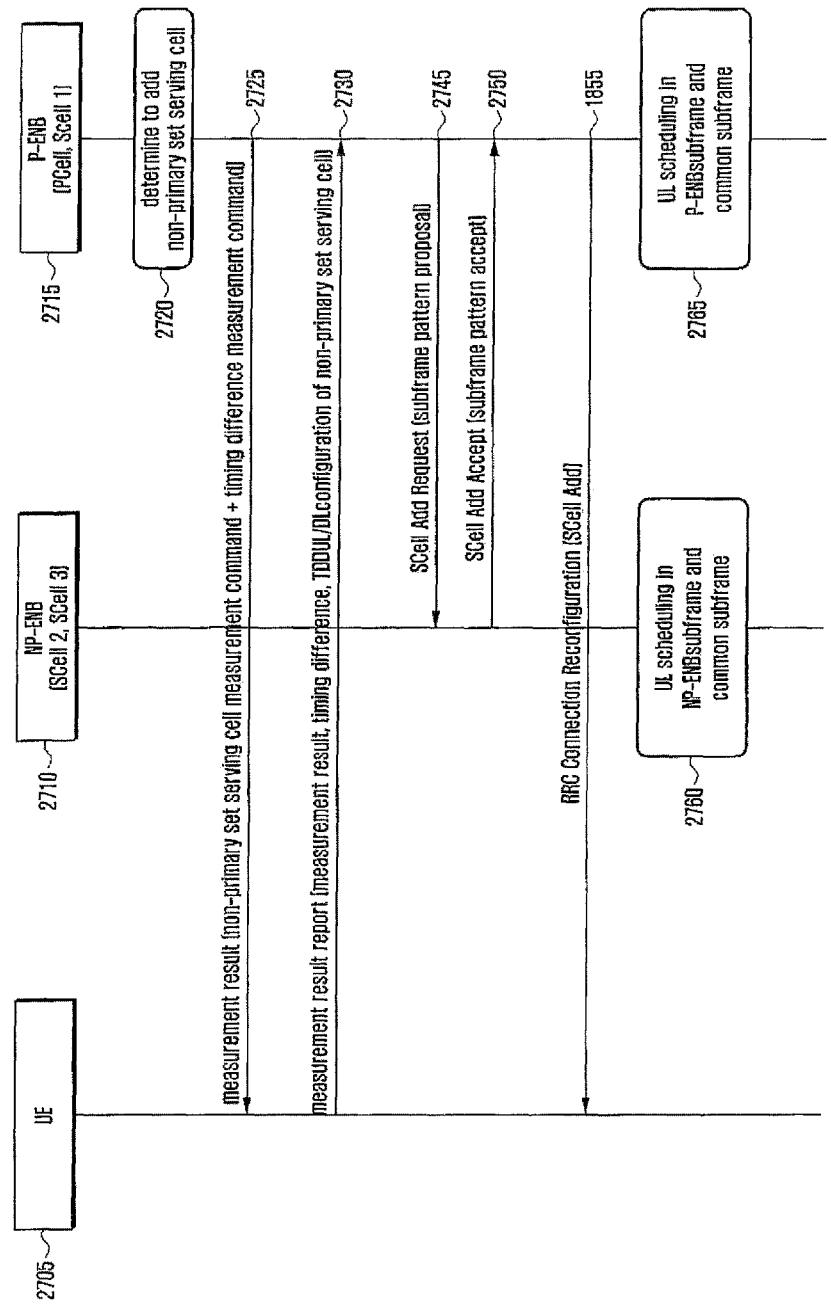
FIG. 27 is a signal flow diagram illustrating a procedure of determining a subframe pattern according to an embodiment of the present invention.

FIG. 27 is a signal flow diagram illustrating a procedure of determining a subframe pattern according to an embodiment of the present invention.

The P-ENB 2715 determines to add serving cells of the NP-ENB 2710 to the UE 2705 at a certain time point in step 2720. The P-ENB sends the UE 2705 a control message instructing to measure the non-primary set serving cell to check whether any NP-ENB serving cell around at step 2725. The control message is identical with the control message 1815 and may further include the information instructing to report the timing difference between a predetermined reference cell and the non-primary set serving cell. The reference cell may be the PCell.

Upon receipt of the control message, the UE 2705 performs measurement on the cell or frequency indicated by the P-ENB. If the measurement result of the best cell fulfils a predetermined condition, the UE 2705 checks the timing difference of the cells and acquires TDD UL/DL configuration information in operation 2730.

The TDD UL/DL configuration information is the information of specifying the pattern of the UL and DL subframes in the corresponding cell and specified in table 4.2-2 of TS 36.211.

Figure 28:
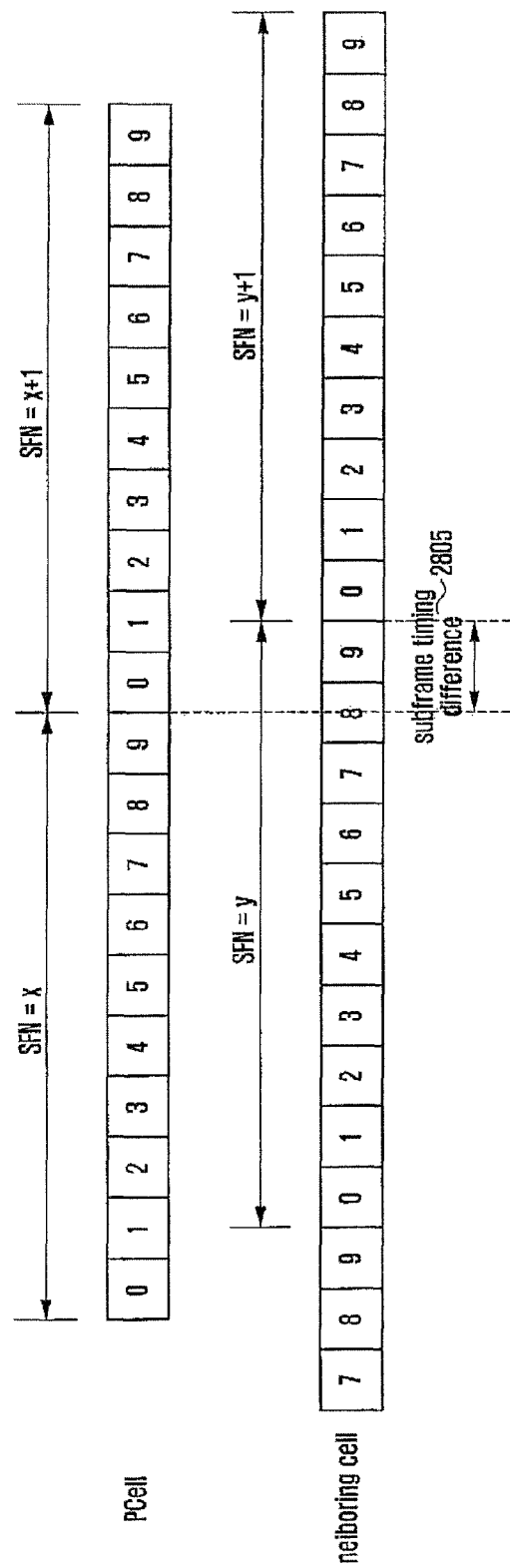
FIG. 28 is a diagram illustrating a timing difference according to an embodiment of the present invention.

FIG. 28 is a diagram illustrating a timing difference according to an embodiment of the present invention.

The timing difference between the reference cell and a certain neighbor cell is defined as a distance 2805 between a predetermined subframe, e.g. subframe 0, of the PCell and the same subframe of a neighbor cell or difference between SFNs to which the subframe belongs, e.g. {[x+1]−[y+1]}.

The UE sends the P-ENB the measurement result report message. This message is identical with the message 1820 and may further include the timing difference between the reference cell and a neighbor cell and the TDD UL/DL configuration information of the neighbor cell.

The P-ENB determines P-ENB-specific subframes, NP-ENB-specific subframes, and common subframes based on the above information. These informations may be formatted as a bitmap of 40 or 70 bits. The first bitmap informs of the P-ENB-specific subframes, and the second bitmap of the NP-ENB-specific subframes. The subframes which do not belonging to the P-ENB-specific and NP-ENB-specific subframes are the common subframes.

The P-ENB determines the type of a certain subframe according to the following rule.

- If a subframe is DL in the primary set serving cell and UL in the non-primary set serving cell, this subframe is determined as a NP-ENB subframe.
- If a subframe is UL in the primary set serving cell and DL in the non-primary set serving cell, this subframe is determined as a P-ENB subframe.
- Some of the subframes which are UL in both the primary and non-primary sets serving cells are determined as P-ENB subframes and the others as NP-ENB subframes.
- Some of the subframes which are DL in both the primary and non-primary sets serving cells are determined as P-ENB subframes and the other as NP-eNBs.

The P-ENB sends the NP-ENB a control message of requesting for adding SCells at step 2745. The control message is identical with the control message of step 1845 and may further include subframe pattern proposal information. The subframe pattern proposal information includes a bitmap indicating P-ENB subframes, a bitmap indicating NP-ENB subframes, and maximum transmit power value to be used by the p-eNB at the common subframe.

The NP-ENB sends the P-ENB a SCell Add Accept control message at step 2750. This control message is identical with the control message of step 1850 and may further include the information on whether to accept the frame pattern.

The P-ENB sends the UE 2705 an RRC Connection Reconfiguration message instructing to add SCells at step 1855. The NP-ENB schedules the UL transmission of the UE using the NP-ENB subframes with priority and, if necessary, uses the common subframe at a limited transmit power at step 2760. The P-ENB schedules the UL transmission of the UE using the P-ENB subframes with priority and, if necessary, uses the common subframes at a limited transmit power at step 2765.

Figure 29:
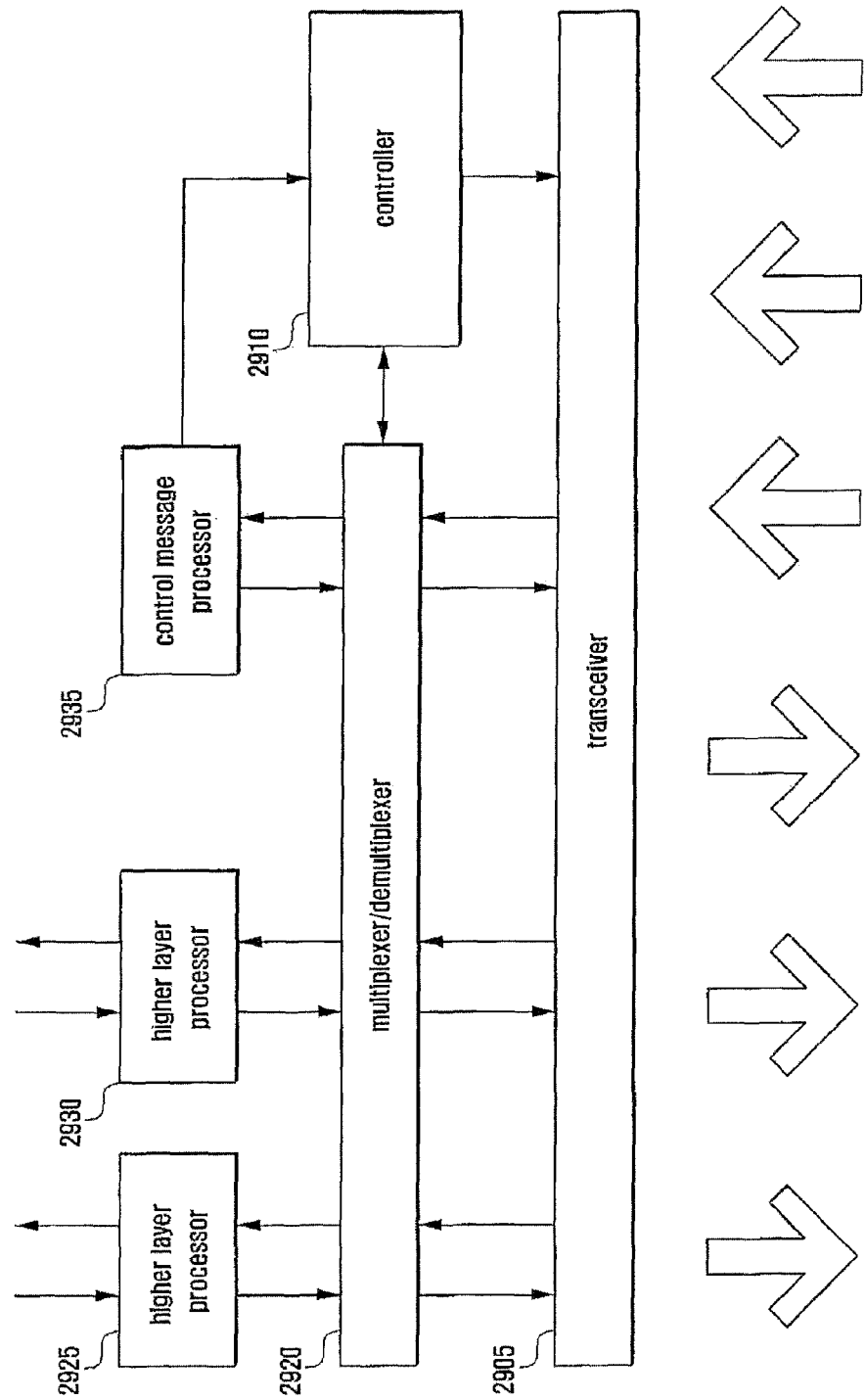
FIG. 29 is a block diagram illustrating a configuration of the UE according to an embodiment of the present invention.

FIG. 29 is a block diagram illustrating a configuration of the UE according to an embodiment of the present invention.

Referring to FIG. 29, the UE according to an embodiment of the present invention includes a transceiver 2905, a controller 2910, a multiplexer/demultiplexer 2920, a control message processor 2935, and higher layer processors 2925 and 2930.

The transceiver 2905 receives data and predetermined controls signals through the downlink channel of the serving cell and transmits data and control signals on the uplink channel. In the case that multiple serving cells are configured, the transceiver 2905 performs data and control signal communication through the multiple serving cells.

The multiplexer/demultiplexer 2915 multiplexes the data generated by the higher layer processors 2925 and 2930 and the control message processor 2935 and demultiplexes the data received by the transceiver 2905, the demultiplexed data being delivered to the higher layer processors 2925 and 2930. Although the P-ENB and np-eNB are configured with independent multiplexer/demultiplexer (or MAC entity), the UE is configured to have one multiplexer/demultiplexer (or MAC entity).

The control message processor 2930 is an RRC layer entity to process the control message received from the eNB and perform necessary operation. For example, the control message processor receives an RRC control message and transfers the random access information to the controller.

The higher layer processors 2935 and 2930 are established per service. The higher layer processor processes the data generated in association with the user service such as File Transfer Protocol (FTP) and Voice over Internet Protocol (VoIP) and transfers the processed data to the multiplexer/demultiplexer 2920 or processes the data from the multiplexer/demultiplexer 2920 and delivers the processed data to the higher layer serving application.

The controller 2910 checks the scheduling command, e.g. UL grants, received by the transceiver 2905 and controls the transceiver 2905 and the multiplexer/demultiplexer 2920 to perform UL transmission using appropriate transmission resource at an appropriate timing. The controller controls overall operations related to the SCell configuration. In detail, the controller controls the UE operations as described with reference to FIGS. 5 to 28.

Figure 30:
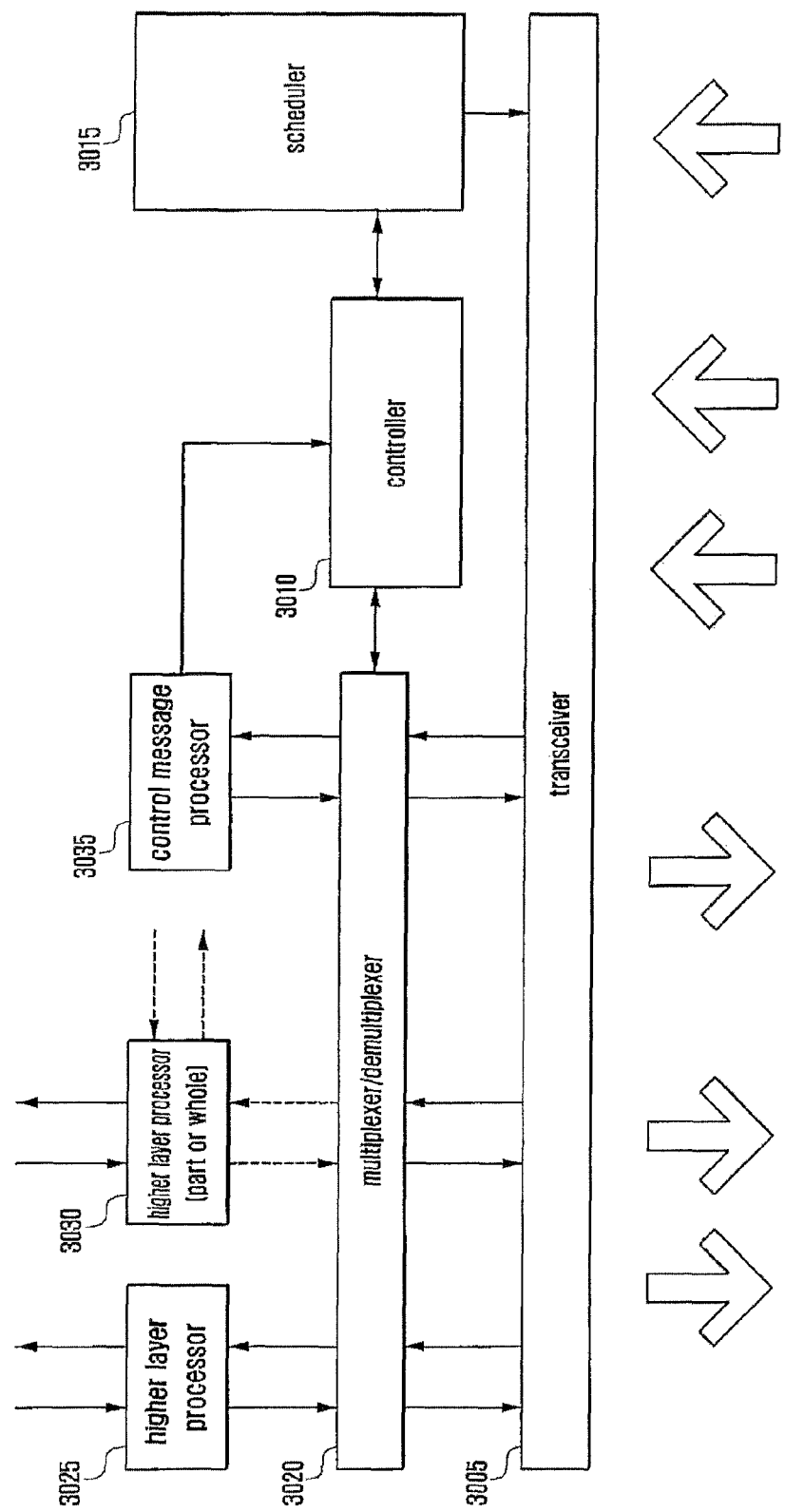
FIG. 30 is a block diagram illustrating a configuration of the P-ENB according to an embodiment of the present invention.

FIG. 30 is a block diagram illustrating a configuration of the P-ENB according to an embodiment of the present invention.

The NP-ENB according to an embodiment of the present invention includes a transceiver 3005, a controller 3010, a multiplexer/demultiplexer 3020, a control message processor 3035, higher layer processors 3025 and 3030, and a processor 3015.

The transceiver 3005 transmits data and predetermined control signals on a DL carrier and receives data and predetermined control signals on a UL carrier. In the case that multiple carriers are configured, the transceiver 3005 performs the data and controls signal communication on the multiple carriers.

The multiplexer/demultiplexer 3020 multiplexes the data generated by the higher layer processors 3025 and 3030 and the control message processor 3035 and demultiplexes the data received by the transceiver 3005, the demultiplexed data being delivered to the higher layer processors 3025 and 3030 or the controller 3010. The control message processor 3035 processes the control message transmitted by the UE and the control message to be transmitted to the UE to the lower layer.

The higher layer processor 3025 and 3030 are established per bearer and processes the data transmitted by the SGW or another eNB into RLC PDUs which are transferred to the multiplexer/demultiplexer 3020 or processes the RLC PDUs from the multiplexer/demultiplexer 3020 into PDCP SDUs which are transferred to the SGW or another eNB. The higher layer processor 3030 corresponding to whole or part of the NP-DRB is configured at the P-ENB.

The scheduler allocates transmission resource to the UE in consideration of the buffer status and channel condition of the UE and controls the transceiver to process the signal transmitted by the UE or the signal to be transmitted to the UE.

The controller controls overall operations related to SCell configuration. In detail, the controller controls the P-ENB operations as described with reference to FIGS. 5 to 28.

Figure 31:
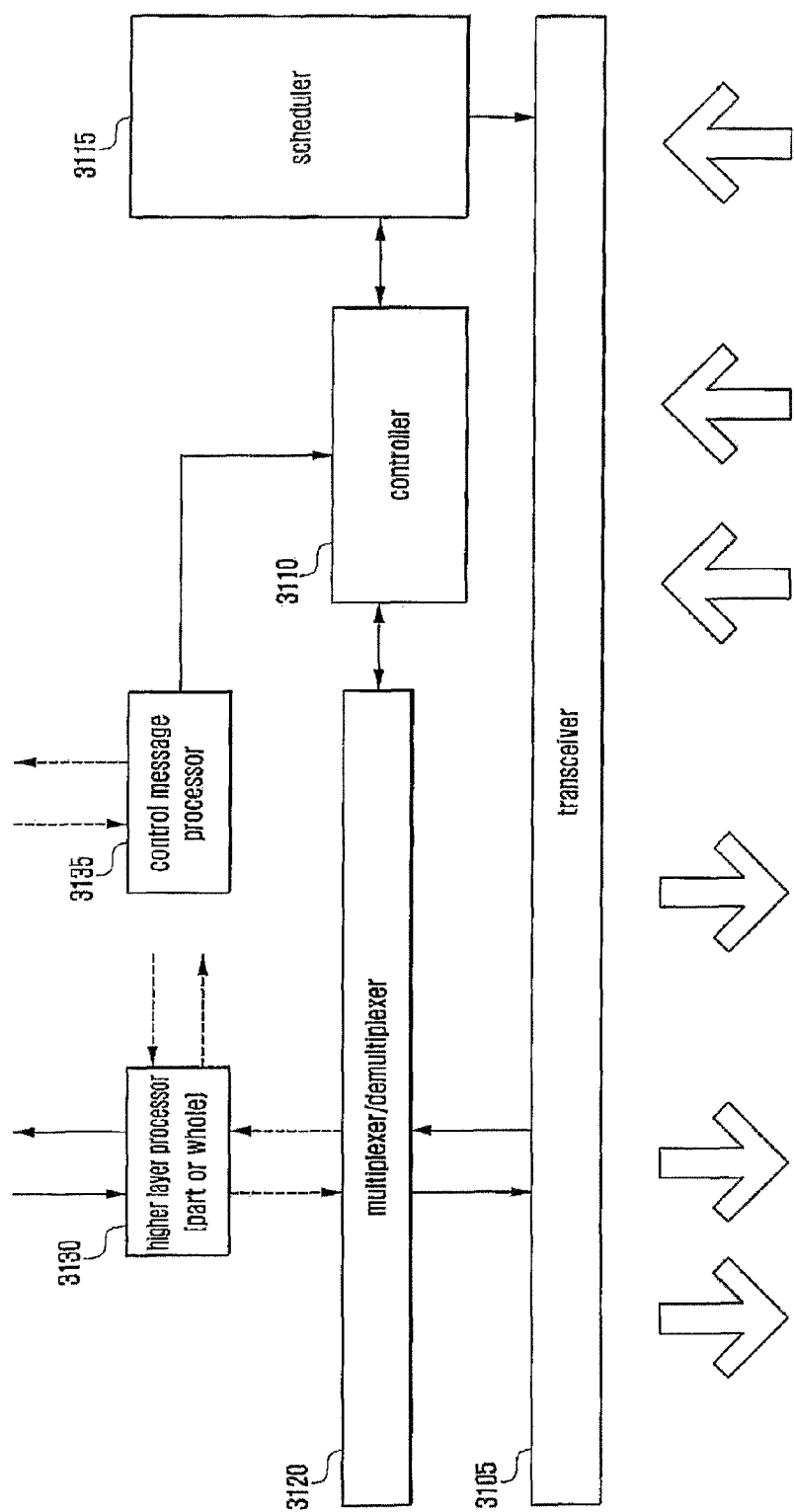
FIG. 31 is a block diagram illustrating a configuration of the NP-ENB according to an embodiment of the present invention.

FIG. 31 is a block diagram illustrating a configuration of the NP-ENB according to an embodiment of the present invention. The NP-ENB according to an embodiment of the present invention includes a transceiver 3105, a controller 3110, a multiplexer/demultiplexer 3120, a control message processor 3135, higher layer processor 3130, and a processor 3115.

The transceiver 3105 transmits data and predetermined control signals on a DL carrier and receives data and predetermined control signals on a UL carrier. In the case that multiple carriers are configured, the transceiver 3105 performs the data and controls signal communication on the multiple carriers.

The multiplexer/demultiplexer 3120 multiplexes the data generated by the higher layer processor 3130 and the control message processor 3135 and demultiplexes the data received by the transceiver 3105, the demultiplexed data being delivered to the higher layer processor 3130 or the controller 3110. The control message processor 3135 processes the control message transmitted by the P-ENB and takes an appropriate action.

The higher layer processor 3030 corresponding part or whole of the NP-DRB is configured at the NP-ENB.

The scheduler allocates transmission resource to the UE in consideration of the buffer status and channel condition of the UE and controls the transceiver to process the signal transmitted by the UE or the signal to be transmitted to the UE.

The controller controls overall operations related to SCell configuration. In detail, the controller controls the NP-ENB operations as described with reference to FIGS. 5 to 28.

The invention claimed is:

1. A method by a first node, the method comprises:
   transmitting, to a terminal, a message for configuring a first bearer with a second node;
   receiving a first packet;
   generating a packet data convergence protocol (PDCP) protocol data unit (PDU), from the first packet, with a PDCP header by a first PDCP entity of the first node; and
   transmitting the PDCP PDU to the second node using the first bearer based on a GPRS Tunnel Protocol (GTP), the first bearer being configured for transmitting downlink data between the first PDCP entity of the first node and a radio link control (RLC) entity of the second node.

2. The method of claim 1, wherein the PDCP PDU is transmitted from the second node to the terminal.

3. The method of claim 1, wherein the PDCP PDU is transmitted to the RLC entity of the second node via an X2 interface between the first node and the second node.

4. The method of claim 1, wherein the RLC entity of the second node performs at least transmission function.

5. The method of claim 1, further comprises:
   receiving an uplink data based on the GTP from the RLC entity of the second node.

6. The method of claim 1, further comprises:
   receiving a second packet;
   generating a PDCP PDU from the second packet by a second PDCP entity of the first node; and
   transmitting the PDCP PDU to the terminal using a second bearer including the second PDCP entity and a second RLC entity of the first node.

7. The method of claim 1, wherein the first bearer is further configured for transmitting uplink data between the first PDCP entity of the first node and a first RLC entity of the first node if the uplink data is received from the terminal.

8. The method of claim 7, wherein the first RLC entity of the first node performs at least a reception function.

9. A method by a second node, the method comprises:
   receiving, from a first node, a message for configuring a bearer with a terminal;
   receiving, by a radio link control (RLC) entity, a packet data convergence protocol (PDCP) protocol data unit (PDU) with a PDCP header from a PDCP entity of the first node using the bearer based on a GPRS Tunnel Protocol (GTP), the bearer being configured for transmitting downlink data between the PDCP entity of the first node and the RLC entity of a second node; and
   transmitting the PDCP PDU to the terminal.

10. The method of claim 9, wherein the PDCP PDU is received from the first node via an X2 interface between the first node and the second node.

11. The method of claim 9, further comprises:
    receiving an uplink data from the terminal; and
    transmitting the uplink data based on the GTP from the RLC entity of the second node to the first node.

12. The method of claim 9,
    wherein the RLC entity of the second node performs at least transmission function.

13. The method of claim 9, wherein the bearer is further configured for transmitting uplink data between the first PDCP entity of the first node and an RLC entity of the first node if the uplink data is received from the terminal.

14. A method by a terminal, the method comprises:
    receiving, from a first node, a message for configuring a second node and configuring a bearer based on a GPRS Tunnel Protocol (GTP), the bearer being for receiving downlink data between a first packet data convergence protocol (PDCP) entity of the first node and a second radio link control (RLC) entity of the second node and being for transmitting uplink data between the PDCP entity and a RLC entity of the first node;
    determining a node among the first node and the second node for transmitting an uplink data; and
    transmitting the uplink data to the determined node,
    wherein an RLC entity is respectively included in the first node and the second node, and
    wherein a downlink PDCP protocol data unit (PDU) with a PDCP header is transmitted from the first PDCP entity of the first node to the second RLC entity of the second node.

15. A first node comprises:
    a transceiver configured to transmit and receive a signal; and
    at least one processor coupled with the transceiver and configured to:
       control the transceiver to transmit, to a terminal, a message for configuring a first bearer with a second node,
       control the transceiver to receive a first packet, generate a packet data convergence protocol (PDCP) protocol data unit (PDU), from the first packet with a PDCP header by a first PDCP entity of the first node, and
       control the transceiver to transmit the PDCP PDU to the second node using the first bearer based on a GPRS Tunnel Protocol (GTP), the first bearer being configured for transmitting downlink data between the first PDCP entity of the first node and a radio link control (RLC) entity of the second node.

16. The first node of claim 15, wherein the PDCP PDU is transmitted from the second node to the terminal.

17. The first node of claim 15, wherein the PDCP PDU is transmitted to the RLC entity of the second node via an X2 interface between the first node and the second node.

18. The first node of claim 15, wherein the RLC entity of the second node performs at least transmission function.

19. The first node of claim 15, wherein the at least one processor is further configured to control the transceiver to receive an uplink data based on the GTP from the RLC entity of the second node.

20. The first node of claim 15, wherein the at least one processor further configured to:

control the transceiver to receive a second packet,
generate a PDCP PDU from the second packet by a second PDCP entity of the first node, and
control the transceiver to transmit the PDCP PDU to the terminal using a second bearer including the second PDCP entity and a second RLC entity of the first node.

21. The first node of claim 15, wherein the first bearer is further configured for transmitting uplink data between the first PDCP entity of the first node and a first RLC entity of the first node if the uplink data is received from the terminal.

22. The first node of claim 21, wherein the first RLC entity of the first node performs at least a reception function.

23. A second node comprises:
a transceiver configured to transmit and receive a signal; and
at least one processor coupled with the transceiver and configured to control the transceiver to:
receive, from a first node, a message for configuring a bearer with a terminal,
receive, by a radio link control (RLC) entity, a packet data convergence protocol (PDCP) protocol data unit (PDU) with a PDCP header from a PDCP entity of the first node using the bearer based on a GPRS Tunnel Protocol (GTP), the bearer being configured for transmitting downlink data between the PDCP entity of the first node and the RLC entity of the second node, and
transmit the PDCP PDU to the terminal.

24. The second node of claim 23, wherein the PDCP PDU is received from the first node via an X2 interface between the first node and the second node.

25. The second node of claim 23, wherein the at least one processor is further configured to control the transceiver to:
receive an uplink data from the terminal, and
transmit the uplink data based on the GTP from the RLC entity of the second node to the first node.

26. The second node of claim 23, wherein the RLC entity of the second node performs at least transmission function.

27. The second node of claim 23, wherein the bearer is further configured for transmitting uplink data between the first PDCP entity of the first node and an RLC entity of the first node if the uplink data is received from the terminal.

28. A terminal comprises:
a transceiver configured to transmit and receive a signal; and
at least one processor coupled with the transceiver and configured to:
control the transceiver to receive, from a first node, a message for configuring a second node and configure a bearer based on a GPRS Tunnel Protocol (GTP), the bearer being for receiving downlink data between a first packet data convergence protocol (PDCP) entity of the first node and a second radio link control (RLC) entity of the second node and being for transmitting uplink data between the PDCP entity and a RLC entity of the first node,
determine a node among the first node and the second node for transmitting an uplink data, and
control the transceiver to transmit the uplink data to the determined node,
wherein an RLC entity is respectively included in the first node and the second node, and
wherein a downlink PDCP protocol data unit (PDU) with a PDCP header is transmitted from the first PDCP entity of the first node to the second RLC entity of the second node.

* * * * *